(12) United States Patent
Iftinca et al.

(10) Patent No.: US 9,399,477 B2
(45) Date of Patent: Jul. 26, 2016

(54) STROLLERS WITH REMOVABLE CHILD SUPPORTS AND RELATED METHODS

(71) Applicants: Liviu Ioan Iftinca, Chicago, IL (US); Peter Rolicki, Wheeling, IL (US)

(72) Inventors: Liviu Ioan Iftinca, Chicago, IL (US); Peter Rolicki, Wheeling, IL (US)

(73) Assignee: KOLCRAFT ENTERPRISES, INC., Chicago, IL (US)

(*) Notice: Subject to any disclaimer, the term of this patent is extended or adjusted under 35 U.S.C. 154(b) by 357 days.

(21) Appl. No.: 13/800,852

(22) Filed: Mar. 13, 2013

(65) Prior Publication Data
US 2014/0183843 A1 Jul. 3, 2014

Related U.S. Application Data

(60) Provisional application No. 61/746,494, filed on Dec. 27, 2012.

(51) Int. Cl.
*B62B 7/14* (2006.01)
*B62B 7/06* (2006.01)
(Continued)

(52) U.S. Cl.
CPC . *B62B 7/06* (2013.01); *B62B 7/142* (2013.01); *B62B 7/147* (2013.01); *B62B 9/102* (2013.01); *B62B 9/104* (2013.01); *B62B 9/245* (2013.01)

(58) Field of Classification Search
CPC .............. B62B 7/06; B62B 7/04; B62B 7/08; B62B 7/14; B62B 7/142; B62B 7/145; B62B 7/147; B62B 9/102; B62B 9/104; B62B 9/12; B62B 9/24; B62B 9/245
USPC ................. 280/642–644, 647, 648, 650, 657, 280/47.38, 47.39, 47.4, 658; 16/110.1; 297/183.3
See application file for complete search history.

(56) References Cited

U.S. PATENT DOCUMENTS 1,204,416 A 11/1916 Doser
2,277,406 A 3/1942 Mahr
(Continued)

FOREIGN PATENT DOCUMENTS

BE 1014755 3/2004
CN 2190912 3/1995
(Continued)

OTHER PUBLICATIONS

The State Intellectual Property Office of China, "First Notification of Office Action", issued in connection with application No. 201310757264.7 on Aug. 27, 2015, 15 pages, (English translation provided).

*Primary Examiner* — John Walters
(74) *Attorney, Agent, or Firm* — Hanley, Flight & Zimmerman, LLC.

(57) ABSTRACT

Strollers with removable child supports and related methods are disclosed. An example stroller and child support assembly disclosed herein includes a stroller frame comprising a front support, a rear support, and a handle. The example stroller and child support assembly also includes a front wheel coupled to the front support and a rear wheel coupled to the rear support. The example stroller and child support assembly also includes a first joint disposed on a first side of the stroller frame and a second joint disposed on a second side of the stroller frame. The stroller and child support assembly example also includes a child support having a first connector releasably coupled to the first joint and a second connector releasably coupled to the second joint, where the child support is removable from the stroller frame and independently usable as a child carrier.

31 Claims, 38 Drawing Sheets

(51) Int. Cl.
  *B62B 9/10* (2006.01)
  *B62B 9/24* (2006.01)

(56) References Cited

U.S. PATENT DOCUMENTS

| | | | |
|---|---|---|---|
| 2,367,829 A | 1/1945 | Shinn | |
| 2,467,890 A | 4/1949 | Harvey | |
| 2,478,512 A | 8/1949 | Taylor | |
| 2,488,225 A | 11/1949 | Mover | |
| 2,646,286 A | 7/1953 | Troendle | |
| 2,649,533 A | 8/1953 | Meredith, Jr. et al. | |
| 2,689,135 A | 9/1954 | Toohey | |
| 2,751,232 A | 6/1956 | Sundberg | |
| 2,777,706 A | 1/1957 | Welsh | |
| 2,812,949 A | 11/1957 | Munro | |
| 2,872,203 A | 2/1959 | Hedstrom | |
| 2,967,059 A | 1/1961 | Goldberg | |
| 2,990,007 A | 6/1961 | Kessler | |
| 3,084,949 A | 4/1963 | Forster et al. | |
| 3,094,339 A | 6/1963 | Hurvitz | |
| 3,146,028 A | 8/1964 | Grosfillex | |
| 3,184,249 A | 5/1965 | Shone | |
| 3,311,934 A | 4/1967 | Goldberg | |
| 3,330,575 A | 7/1967 | Boudreau | |
| 3,402,939 A | 9/1968 | Falco | |
| 3,421,774 A | 1/1969 | Patterson | |
| 3,459,435 A | 8/1969 | Garner | |
| 3,550,998 A | 12/1970 | Boudreau et al. | |
| 3,763,509 A | 10/1973 | Mittendorf | |
| 3,873,116 A | 3/1975 | Perego | |
| 3,901,528 A | 8/1975 | Miyagi | |
| 4,019,751 A | 4/1977 | Nakao | |
| 4,065,177 A | 12/1977 | Hyde et al. | |
| 4,191,397 A | 3/1980 | Kassai | |
| 4,216,974 A * | 8/1980 | Kassai | B62B 7/062 280/42 |
| 4,272,100 A | 6/1981 | Kassai | |
| 4,371,206 A | 2/1983 | Johnson, Jr. | |
| 4,391,453 A * | 7/1983 | Glaser | B62B 7/06 280/47.4 |
| 4,426,113 A | 1/1984 | Schutz | |
| 4,435,012 A | 3/1984 | Kassai | |
| 4,529,219 A | 7/1985 | Shamie | |
| 4,540,216 A * | 9/1985 | Hassel, Sr. | B60N 2/3084 297/112 |
| 4,545,613 A | 10/1985 | Martel et al. | |
| 4,597,116 A | 7/1986 | Kassai | |
| 4,614,454 A | 9/1986 | Kassai | |
| 4,620,711 A | 11/1986 | Dick | |
| 4,632,421 A | 12/1986 | Shamie | |
| 4,634,177 A | 1/1987 | Meeker | |
| 4,641,844 A | 2/1987 | Mar et al. | |
| 4,678,196 A | 7/1987 | Van Steenburg | |
| 4,685,688 A | 8/1987 | Edwards | |
| 4,712,833 A | 12/1987 | Swanson | |
| 4,725,071 A | 2/1988 | Shamie | |
| 4,736,959 A | 4/1988 | Van Steenburg | |
| 4,741,056 A | 5/1988 | Kassai | |
| 4,756,573 A * | 7/1988 | Simin | B60N 2/3084 297/117 |
| 4,786,064 A | 11/1988 | Baghdasarian | |
| 4,832,354 A | 5/1989 | LaFreniere | |
| 4,832,361 A | 5/1989 | Nakao et al. | |
| 4,834,403 A | 5/1989 | Yanus et al. | |
| 4,836,573 A | 6/1989 | Gebhard | |
| 4,896,894 A | 1/1990 | Singletary | |
| 4,900,087 A * | 2/1990 | Crisp | B60N 2/3084 297/112 |
| 5,052,750 A | 10/1991 | Takahashi et al. | |
| 5,096,260 A | 3/1992 | Hagerstrom | |
| 5,104,134 A | 4/1992 | Cone | |
| 5,121,940 A | 6/1992 | March | |
| 5,133,567 A | 7/1992 | Owens | |
| 5,161,273 A | 11/1992 | Deck | |
| 5,193,238 A | 3/1993 | Clute | |
| 5,201,535 A | 4/1993 | Kato et al. | |
| 5,216,772 A | 6/1993 | Clute | |
| 5,230,523 A | 7/1993 | Wilhelm | |
| 5,244,228 A | 9/1993 | Chiu | |
| 5,244,292 A | 9/1993 | Wise | |
| D340,140 S | 10/1993 | Cunningham et al. | |
| 5,257,799 A | 11/1993 | Cone et al. | |
| 5,269,587 A | 12/1993 | Cunningham et al. | |
| 5,272,780 A | 12/1993 | Clute | |
| 5,288,098 A | 2/1994 | Shamie | |
| D347,328 S | 5/1994 | Efthimiou | |
| 5,339,470 A | 8/1994 | Shamie | |
| D353,493 S | 12/1994 | Schwartzkopf et al. | |
| 5,375,869 A * | 12/1994 | Hsiao | A47D 1/02 280/31 |
| 5,393,122 A | 2/1995 | Andrisin, III | |
| 5,409,292 A * | 4/1995 | Kain | A47D 13/02 16/430 |
| 5,409,411 A | 4/1995 | Schrieber | |
| 5,431,478 A | 7/1995 | Noonan | |
| 5,441,328 A | 8/1995 | Snyder | |
| 5,448,790 A | 9/1995 | Saro et al. | |
| 5,454,584 A | 10/1995 | Haut et al. | |
| 5,460,398 A | 10/1995 | Huang | |
| 5,478,135 A | 12/1995 | Kain | |
| 5,499,831 A | 3/1996 | Worth et al. | |
| 5,513,864 A | 5/1996 | Huang | |
| 5,516,190 A * | 5/1996 | Kain | A47D 13/02 297/183.3 |
| 5,524,503 A | 6/1996 | Ishikura | |
| 5,535,483 A | 7/1996 | Jane Cabagnero | |
| 5,536,033 A | 7/1996 | Hinkston | |
| 5,542,732 A | 8/1996 | Pollman | |
| 5,544,904 A | 8/1996 | Maher | |
| 5,553,336 A | 9/1996 | Mariol | |
| 5,590,896 A | 1/1997 | Eichhorn | |
| 5,601,297 A | 2/1997 | Stein | |
| 5,605,409 A | 2/1997 | Haut et al. | |
| 5,622,377 A | 4/1997 | Shamie | |
| 5,645,293 A | 7/1997 | Cheng | |
| 5,660,430 A | 8/1997 | Clarke | |
| 5,709,400 A | 1/1998 | Bonnier et al. | |
| 5,722,594 A | 3/1998 | Farr et al. | |
| 5,765,958 A | 6/1998 | Lan | |
| 5,772,235 A | 6/1998 | Espenshade | |
| 5,778,465 A | 7/1998 | Myers | |
| 5,794,951 A | 8/1998 | Corley et al. | |
| 5,795,091 A | 8/1998 | Kakuda et al. | |
| 5,803,535 A * | 9/1998 | Jane Cabagnero | A47D 13/02 297/183.3 |
| 5,819,341 A | 10/1998 | Simantob et al. | |
| 5,833,261 A | 11/1998 | Brown et al. | |
| 5,842,739 A | 12/1998 | Noble | |
| 5,845,349 A | 12/1998 | Tharalson | |
| 5,845,924 A | 12/1998 | Huang | |
| 5,845,925 A | 12/1998 | Huang | |
| 5,863,061 A | 1/1999 | Ziegler et al. | |
| 5,865,460 A | 2/1999 | Huang | |
| 5,867,850 A | 2/1999 | Mariol | |
| 5,882,030 A | 3/1999 | Haut | |
| 5,918,933 A | 7/1999 | Hutchinson et al. | |
| 5,921,574 A | 7/1999 | Driessen et al. | |
| 5,947,552 A | 9/1999 | Wilkins et al. | |
| 5,961,180 A | 10/1999 | Greger et al. | |
| 5,964,470 A | 10/1999 | Syendsen et al. | |
| 5,988,669 A | 11/1999 | Freese et al. | |
| 5,988,670 A | 11/1999 | Song et al. | |
| 5,991,944 A | 11/1999 | Yang | |
| 6,017,088 A | 1/2000 | Stephens et al. | |
| 6,026,525 A | 2/2000 | Davis | |
| 6,036,263 A | 3/2000 | Gold | |
| 6,058,528 A | 5/2000 | Yang | |
| 6,073,945 A | 6/2000 | Cheng | |
| 6,095,548 A | 8/2000 | Baechler | |
| 6,099,022 A | 8/2000 | Pring | |
| 6,102,431 A | 8/2000 | Sutherland et al. | |
| 6,102,432 A | 8/2000 | Cheng | |
| 6,116,624 A | 9/2000 | Hu | |
| 6,120,041 A | 9/2000 | Gehr, Jr. et al. | |

(56) References Cited

U.S. PATENT DOCUMENTS

| | | | |
|---|---|---|---|
| D432,464 S | 10/2000 | Gehr, Jr. et al. | |
| 6,139,046 A | 10/2000 | Aalund et al. | |
| 6,152,477 A | 11/2000 | Hsin et al. | |
| 6,155,579 A | 12/2000 | Eyman et al. | |
| 6,155,740 A | 12/2000 | Hartenstine | |
| 6,164,721 A | 12/2000 | Latshaw et al. | |
| 6,183,001 B1 | 2/2001 | Ageneau | |
| 6,189,914 B1 | 2/2001 | Worth et al. | |
| 6,192,535 B1 | 2/2001 | Warner, Jr. et al. | |
| 6,196,571 B1 | 3/2001 | Chen et al. | |
| D441,967 S | 5/2001 | Reithmeier | |
| 6,233,759 B1 | 5/2001 | Warner, Jr. et al. | |
| 6,238,125 B1 | 5/2001 | Lin | |
| 6,257,659 B1 | 7/2001 | Wilkins et al. | |
| 6,267,405 B1 | 7/2001 | Chen | |
| 6,302,412 B1 | 10/2001 | Worth et al. | |
| 6,302,613 B1 | 10/2001 | Lan | |
| 6,322,098 B1 | 11/2001 | Lan | |
| 6,390,555 B2 | 5/2002 | Wilkins et al. | |
| 6,409,205 B1 | 6/2002 | Bapst et al. | |
| 6,421,856 B1 | 7/2002 | Furnback | |
| 6,430,762 B1 | 8/2002 | Cheng | |
| 6,446,990 B1 * | 9/2002 | Nania | B62B 7/145 280/47.371 |
| 6,454,352 B1 | 9/2002 | Konovalov et al. | |
| 6,478,327 B1 | 11/2002 | Hartenstine et al. | |
| 6,478,328 B1 | 11/2002 | Yeh et al. | |
| D467,093 S | 12/2002 | Brophy | |
| 6,508,605 B1 | 1/2003 | Cheng | |
| 6,513,827 B1 * | 2/2003 | Barenbrug | B62B 7/147 280/643 |
| 6,526,608 B1 | 3/2003 | Hsia | |
| 6,539,563 B1 | 4/2003 | Hsia | |
| 6,550,801 B1 | 4/2003 | Newhard | |
| 6,550,802 B2 | 4/2003 | Sheehan | |
| 6,557,885 B1 | 5/2003 | Kakuda | |
| 6,561,588 B1 | 5/2003 | Brady | |
| 6,572,134 B2 | 6/2003 | Barrett et al. | |
| 6,575,480 B2 * | 6/2003 | McKelvey | B62B 3/144 280/33.993 |
| 6,626,452 B2 | 9/2003 | Yang et al. | |
| 6,634,038 B2 | 10/2003 | Hsia | |
| 6,641,164 B2 | 11/2003 | Wood et al. | |
| 6,655,702 B2 | 12/2003 | Senger | |
| 6,666,473 B2 | 12/2003 | Hartenstine et al. | |
| 6,669,225 B2 | 12/2003 | Greger et al. | |
| 6,704,949 B2 | 3/2004 | Waldman et al. | |
| 6,708,356 B1 | 3/2004 | LaValle | |
| 6,722,690 B2 | 4/2004 | Lan | |
| 6,735,796 B2 | 5/2004 | Warner, Jr. et al. | |
| 6,752,413 B2 | 6/2004 | Yamazaki et al. | |
| 6,786,546 B2 | 9/2004 | McConnell et al. | |
| 6,802,514 B2 | 10/2004 | Worth et al. | |
| 6,824,161 B2 | 11/2004 | Iwata | |
| 6,848,128 B2 | 2/2005 | Verbovszky et al. | |
| 6,851,745 B2 | 2/2005 | Wilkins et al. | |
| D502,896 S | 3/2005 | Pullam | |
| 6,880,850 B2 | 4/2005 | Hsia | |
| 6,898,812 B2 | 5/2005 | Smart | |
| 6,910,708 B2 | 6/2005 | Sack et al. | |
| 6,910,709 B2 | 6/2005 | Chen | |
| 6,915,536 B2 | 7/2005 | Chen | |
| 6,923,467 B2 | 8/2005 | Hsia | |
| 6,961,968 B2 | 11/2005 | Clapper et al. | |
| 6,991,248 B2 | 1/2006 | Valdez et al. | |
| 7,003,821 B2 | 2/2006 | DeHart et al. | |
| 7,011,316 B1 * | 3/2006 | Peridon | B60N 2/2848 280/30 |
| 7,017,203 B2 | 3/2006 | Chen | |
| 7,017,921 B2 | 3/2006 | Eros | |
| 7,021,650 B2 | 4/2006 | Chen | |
| 7,032,922 B1 * | 4/2006 | Lan | B62B 7/08 280/643 |
| 7,044,497 B2 | 5/2006 | Hartenstine et al. | |
| 7,055,191 B1 | 6/2006 | Chen | |
| 7,059,000 B2 | 6/2006 | Verbovszky | |
| 7,070,197 B2 | 7/2006 | Chen | |
| 7,077,420 B1 | 7/2006 | Santoski | |
| 7,090,291 B2 | 8/2006 | Birchfield | |
| 7,111,339 B2 | 9/2006 | Chen | |
| 7,117,553 B2 | 10/2006 | Fairchild et al. | |
| D535,506 S | 1/2007 | Wilson | |
| 7,175,231 B2 * | 2/2007 | Gallo | A47C 7/38 297/218.1 |
| 7,188,858 B2 | 3/2007 | Hartenstine et al. | |
| 7,228,575 B2 | 6/2007 | Chen | |
| 7,237,795 B2 | 7/2007 | Wu | |
| 7,263,729 B2 | 9/2007 | Paesang et al. | |
| 7,273,225 B2 | 9/2007 | Yeh | |
| 7,278,652 B2 | 10/2007 | Riedl et al. | |
| 7,296,820 B2 | 11/2007 | Valdez et al. | |
| 7,311,357 B2 | 12/2007 | Gold et al. | |
| 7,326,120 B2 | 2/2008 | Bellows et al. | |
| 7,364,183 B2 | 4/2008 | Lee | |
| 7,377,537 B2 | 5/2008 | Li | |
| 7,396,039 B2 | 7/2008 | Valdez et al. | |
| 7,401,803 B1 | 7/2008 | Lai | |
| 7,404,569 B2 | 7/2008 | Hartenstine et al. | |
| 7,410,186 B2 | 8/2008 | Hartenstine et al. | |
| 7,410,187 B2 | 8/2008 | Hartenstine et al. | |
| 7,418,745 B2 | 9/2008 | Paesang et al. | |
| 7,419,181 B2 | 9/2008 | Kassai et al. | |
| 7,422,278 B2 | 9/2008 | McConnell et al. | |
| 7,455,353 B2 | 11/2008 | Favorito et al. | |
| 7,455,354 B2 | 11/2008 | Jane Santamaria | |
| 7,458,114 B2 | 12/2008 | Troutman | |
| 7,464,957 B2 | 12/2008 | Worth et al. | |
| D591,996 S | 5/2009 | Green et al. | |
| 7,543,342 B2 | 6/2009 | Zhao et al. | |
| 7,568,242 B2 | 8/2009 | Troutman | |
| 7,584,985 B2 * | 9/2009 | You | B62B 7/06 280/47.38 |
| 7,600,775 B2 | 10/2009 | Chen et al. | |
| 7,614,641 B2 | 11/2009 | Hartenstine et al. | |
| 7,625,043 B2 | 12/2009 | Hartenstine et al. | |
| 7,632,035 B2 | 12/2009 | Cheng | |
| 7,651,115 B1 | 1/2010 | Hartenstine et al. | |
| 7,658,399 B2 * | 2/2010 | Van Dijk | B62B 7/142 280/30 |
| 7,661,158 B2 | 2/2010 | Daeseleire | |
| 7,694,995 B2 | 4/2010 | Dotsey et al. | |
| 7,694,996 B2 | 4/2010 | Saville et al. | |
| 7,695,374 B2 | 4/2010 | Bellows et al. | |
| 7,712,765 B2 | 5/2010 | Chen et al. | |
| 7,726,683 B2 | 6/2010 | Moriguchi et al. | |
| 7,739,759 B2 | 6/2010 | Mendes et al. | |
| 7,753,398 B2 | 7/2010 | Yang | |
| 7,798,500 B2 | 9/2010 | Den Boer | |
| 7,798,515 B2 | 9/2010 | Valdez et al. | |
| 7,832,744 B2 | 11/2010 | Chen et al. | |
| 7,832,755 B2 | 11/2010 | Nolan et al. | |
| 7,832,756 B2 | 11/2010 | Storm | |
| 7,871,099 B2 | 1/2011 | Gilbertson et al. | |
| 7,882,579 B2 | 2/2011 | Jackson et al. | |
| 7,938,435 B2 | 5/2011 | Sousa et al. | |
| 8,028,358 B2 | 10/2011 | Fiore, Jr. | |
| 8,042,828 B2 | 10/2011 | Ageneau et al. | |
| 8,083,240 B2 | 12/2011 | Jacobs et al. | |
| 8,087,689 B2 | 1/2012 | Fritz et al. | |
| 8,092,111 B2 | 1/2012 | Wu | |
| 8,141,895 B2 | 3/2012 | Haut et al. | |
| 8,157,286 B2 | 4/2012 | Lai | |
| 8,186,706 B2 | 5/2012 | Dotsey | |
| 8,201,291 B2 | 6/2012 | Burns et al. | |
| 8,205,906 B2 | 6/2012 | Kretschmer et al. | |
| 8,205,907 B2 | 6/2012 | Chicca | |
| 8,226,110 B2 | 7/2012 | Liao | |
| 8,226,111 B2 | 7/2012 | Valdez et al. | |
| 8,282,120 B2 | 10/2012 | Minato et al. | |
| 8,308,391 B2 | 11/2012 | Cheng | |
| 8,376,375 B2 | 2/2013 | Mival et al. | |
| 8,424,138 B1 | 4/2013 | Pinnell | |
| 8,505,958 B2 * | 8/2013 | Thomas | B62B 7/14 280/47.4 |

(56) References Cited

U.S. PATENT DOCUMENTS

| | | |
|---|---|---|
| 8,651,502 B2 * | 2/2014 | Winterhalter ........ B60N 2/2848 280/47.4 |
| 8,672,341 B2 * | 3/2014 | Offord .................... B62B 7/062 280/47.38 |
| 8,677,533 B2 | 3/2014 | Barron et al. |
| 8,870,214 B2 | 10/2014 | Kane et al. |
| 8,888,124 B2 | 11/2014 | Iftinca |
| 8,899,615 B2 | 12/2014 | Dijkstra |
| 9,216,755 B2 | 12/2015 | Eisinger |
| 2002/0092094 A1 | 7/2002 | Welsh, Jr. |
| 2002/0093179 A1 | 7/2002 | McKelvey |
| 2002/0117520 A1 | 8/2002 | Chen et al. |
| 2003/0034211 A1 | 2/2003 | Iwata |
| 2003/0046761 A1 | 3/2003 | Hsia |
| 2003/0070230 A1 | 4/2003 | Hsia |
| 2003/0071441 A1 | 4/2003 | Yeh |
| 2003/0094791 A1 | 5/2003 | Hartenstine et al. |
| 2003/0177575 A1 | 9/2003 | Cheng et al. |
| 2004/0090044 A1 | 5/2004 | Hsia |
| 2004/0090046 A1 | 5/2004 | Hartenstine et al. |
| 2004/0173997 A1 | 9/2004 | Voll |
| 2005/0011004 A1 | 1/2005 | Favorito et al. |
| 2005/0098983 A1 | 5/2005 | Cheng et al. |
| 2005/0127640 A1 | 6/2005 | Worth et al. |
| 2005/0278857 A1 | 12/2005 | Fairchild et al. |
| 2006/0131841 A1 | 6/2006 | Huang |
| 2006/0207023 A1 | 9/2006 | DeHart et al. |
| 2006/0218725 A1 | 10/2006 | Carpenter et al. |
| 2006/0253978 A1 | 11/2006 | Paesang et al. |
| 2007/0045975 A1 * | 3/2007 | Yang ........................ B62B 7/14 280/47.38 |
| 2007/0085304 A1 | 4/2007 | Yeh |
| 2007/0164538 A1 | 7/2007 | Yeh |
| 2008/0061533 A1 | 3/2008 | Li |
| 2008/0073879 A1 | 3/2008 | Chen et al. |
| 2008/0079239 A1 | 4/2008 | Li |
| 2008/0093825 A1 | 4/2008 | Yang |
| 2008/0231022 A1 | 9/2008 | Hu et al. |
| 2008/0231023 A1 * | 9/2008 | Yang ...................... B62B 9/102 280/650 |
| 2008/0271243 A1 | 11/2008 | Burkholder et al. |
| 2009/0033066 A1 | 2/2009 | Saville et al. |
| 2009/0077738 A1 | 3/2009 | Burns et al. |
| 2009/0077739 A1 | 3/2009 | Mendes et al. |
| 2009/0077740 A1 | 3/2009 | Jackson et al. |
| 2009/0077741 A1 | 3/2009 | Burns et al. |
| 2009/0160162 A1 | 6/2009 | Bizzell et al. |
| 2009/0206566 A1 | 8/2009 | Enserink et al. |
| 2009/0315299 A1 | 12/2009 | Barenbrug |
| 2010/0052277 A1 | 3/2010 | Zehfuss |
| 2010/0066138 A1 | 3/2010 | Rumack |
| 2010/0078916 A1 | 4/2010 | Chen |
| 2010/0244393 A1 * | 9/2010 | Thomas .................... B62B 7/14 280/33.993 |
| 2010/0255919 A1 | 10/2010 | Kelly et al. |
| 2010/0308550 A1 | 12/2010 | Li et al. |
| 2010/0308562 A1 | 12/2010 | Valdez et al. |
| 2011/0084467 A1 | 4/2011 | Liao |
| 2011/0142533 A1 | 6/2011 | Liu et al. |
| 2011/0148159 A1 | 6/2011 | Barron et al. |
| 2011/0156454 A1 * | 6/2011 | Yi ........................... B62B 7/004 297/183.1 |
| 2011/0175406 A1 * | 7/2011 | Zeng ...................... B62B 9/104 297/183.1 |
| 2011/0181024 A1 | 7/2011 | Chicca |
| 2011/0197358 A1 | 8/2011 | Bu et al. |
| 2011/0291388 A1 | 12/2011 | Sellers et al. |
| 2011/0291389 A1 * | 12/2011 | Offord .................... B62B 7/062 280/650 |
| 2012/0112435 A1 | 5/2012 | Kobayashi |
| 2012/0126512 A1 | 5/2012 | Kane et al. |
| 2012/0256397 A1 | 10/2012 | Blubaugh et al. |
| 2012/0261906 A1 | 10/2012 | Chicca |
| 2013/0009434 A1 * | 1/2013 | Rubinshteyn ........ A47C 31/113 297/220 |
| 2013/0168947 A1 * | 7/2013 | Offord .................... B62B 7/105 280/658 |
| 2013/0257019 A1 | 10/2013 | Eisinger |
| 2016/0009308 A1 | 1/2016 | Eisinger |

FOREIGN PATENT DOCUMENTS

| | | | |
|---|---|---|---|
| CN | 1274559 | 11/2000 | |
| CN | 101297726 | 11/2008 | |
| CN | 102256857 | 11/2011 | |
| FR | 2926774 A3 * | 7/2009 | ............... B62B 9/14 |
| GB | 2179897 | 3/1987 | |
| GB | 2193692 | 2/1988 | |
| WO | 2010040644 | 4/2010 | |

* cited by examiner

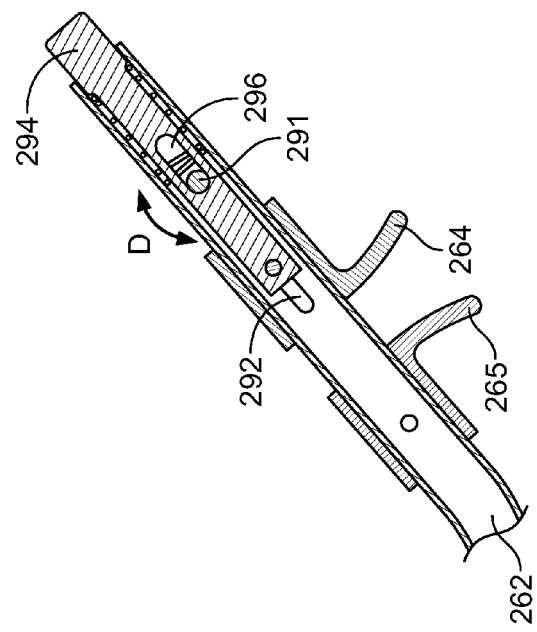
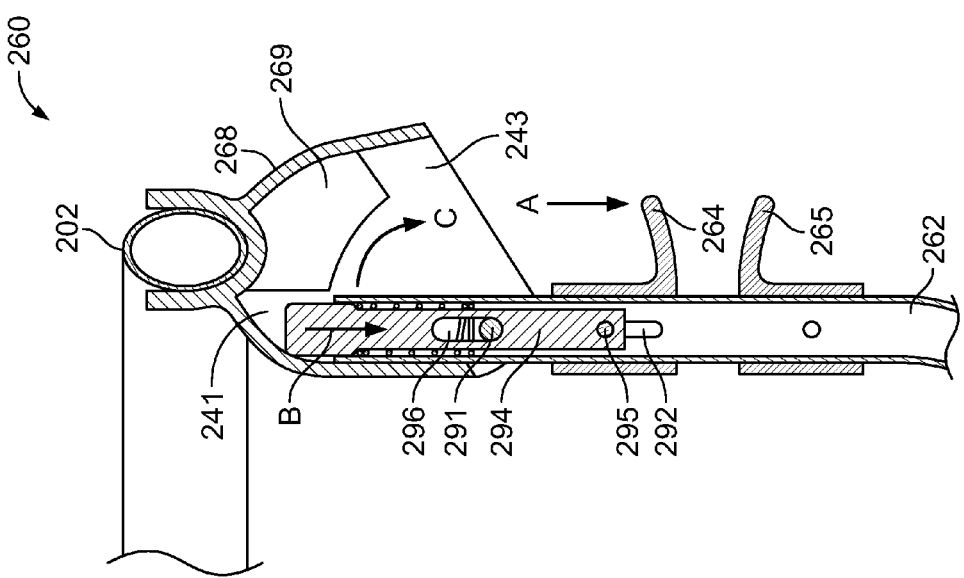
FIG. 20
FIG. 19

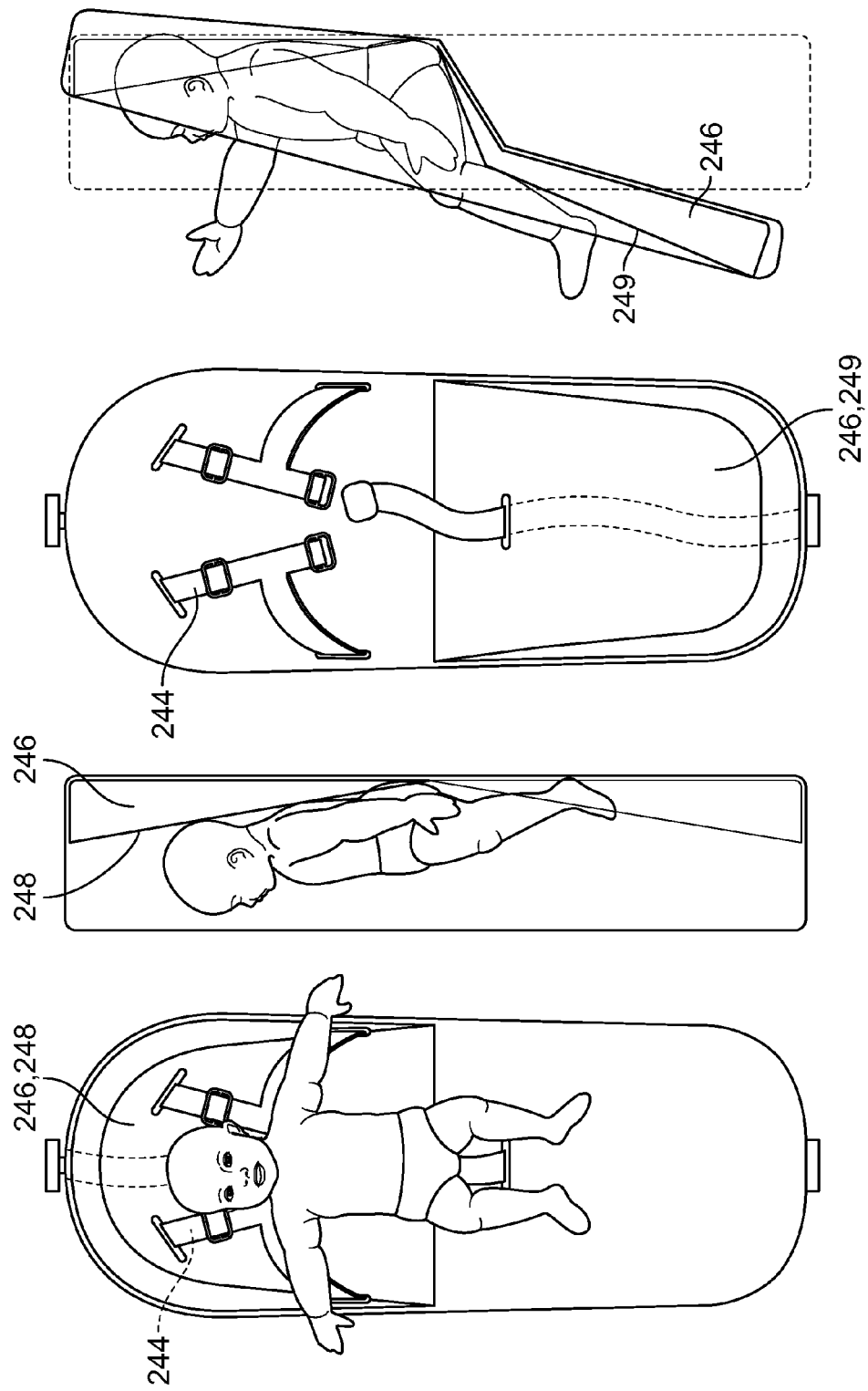

STROLLERS WITH REMOVABLE CHILD SUPPORTS AND RELATED METHODS

RELATED APPLICATION

This patent claims the benefit of U.S. Provisional Patent Application Ser. No. 61/746,494, which was filed on Dec. 27, 2012 and is hereby incorporated herein by reference in its entirety.

FIELD OF THE DISCLOSURE

This disclosure relates generally to child care products, and, more particularly, to strollers with removable child supports.

BACKGROUND

Child care products include, for example, strollers, infant carriers and car seats. Strollers are often used to carry and transport children. Strollers generally include a frame and a seat. Some strollers include seats which recline. Also, some strollers have car seats removably coupled to the frame to enable a child to be transported without the stroller frame.

BRIEF DESCRIPTION OF THE DRAWINGS

FIG. 19 is a partial cross-sectional view of an example front support and front hub taken along the line 19-19 of FIG. 3 but viewed from the opposite side.

FIG. 20 is a side view of the example front support of FIG. 19 shown in a rotated position.

FIG. 24b is a schematic illustration of the rear joint housing of FIG. 24a.

FIG. 46a is a top view of an example convertible child support and pivotable cushion in the recumbent position.

FIG. 46b is a side view of the example convertible child support and pivotable cushion of FIG. 46a in the recumbent position.

FIG. 47a is a top view of the example convertible child support and pivotable cushion in the upright or seat forming position.

FIG. 47b is a side view of the example convertible child support and pivotable cushion of FIG. 47a in the upright or seat forming position.

DETAILED DESCRIPTION

Figure 1:
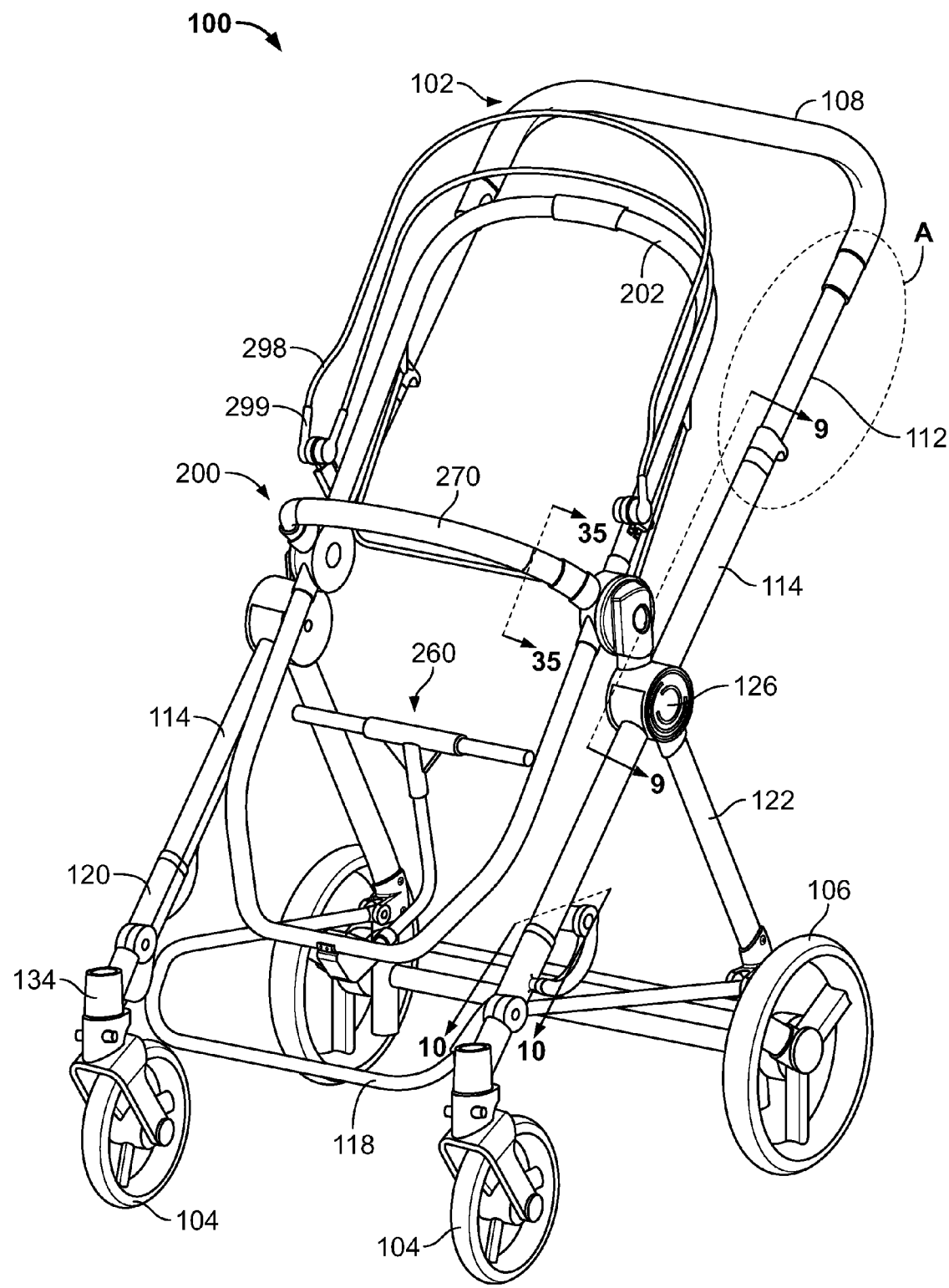
FIG. 1 is a perspective view of an example stroller constructed in accordance with the teachings of this disclosure and including a convertible child support, the child support being shown in an upright position.

Known strollers are used to hold, carry and/or transport children. Generally, strollers include a frame and a child seat. Often, the frame transitions between a collapsed (e.g., folded or closed) position for storage and an in-use (e.g., deployed or open) position.

Example strollers disclosed herein include a convertible and removable seat, carry cot, and/or carrier. Users such as, for example, parents or other caretakers may desire to position a child occupant in a seated or upright position for example, when the child is awake, or in a recumbent (e.g., laying down) position for example, when the child is sleeping or to induce the child to sleep.

In examples disclosed herein, the child seat, carry cot, and/or carrier is convertible between multiple positions to enable the user to support the child in the stroller in either the upright position or the recumbent position. In addition, the convertible child seat, carry cot, and/or carrier enables reclining the child seat, carry cot, and/or carrier while the child seat, carry cot, and/or carrier is attached to the frame. Examples disclosed herein enable adjusting the incline angle of the child seat, carry cot, and/or carrier between multiple incline angles. In some examples, the backrest support of the child seat, carry cot, and/or carrier can be positioned in a plurality of incline angles ranging from the upright position to a substantially (or close to) flat position (e.g., the recumbent position). Thus, the adjustable incline angle allows a parent or caregiver to appropriately place the child into the stroller based on whether the child is awake or active (e.g., in an upright position at one of the multiple incline angles) or sleeping or resting (e.g., in the recumbent position). Because the child seat, carry cot, and/or carrier can be used in a wide variety of positions, it is generally referred to herein as a "child support." In some disclosed examples, the child support may perform the function of a child seat, carry cot, and/or carrier.

Conversion between the upright position and the recumbent position, in some disclosed examples, includes reclining a backrest portion of the child support to the recumbent position. In some examples, the conversion includes releasing a front support, which forms part of a seat structure and includes a cross bar to provide support under the knees of a seated child, and thereafter locking the front support in an extended position. In some examples, a rear support, which forms a backrest support for the seat structure is released, and brought into an extended position. In some examples, the front and rear supports shape at least a portion of the child support perimeter into a carry cot form factor.

There are times when a user may wish to remove the child from the stroller without disturbing the child, for example, if the child is sleeping. In examples disclosed herein, the child support is removably coupled to the stroller frame. As a result, the child support may be removed and used as a child (e.g., an infant) carrier or carry cot. In some such examples, the child support is fully functional as a child carrier and/or carry cot independent from the stroller. In some such examples, the child support is able to be carried separately from the stroller frame and is placeable on a surface such as, for example, a table, a floor or a ground surface. In such examples when in the extended position, the front support functions as a first leg and the rear support (also in the extended position) functions as a second leg to securely rest the child support on the surface.

An example stroller and child support assembly disclosed herein includes a stroller frame comprising front legs, rear legs, and a handle. The example stroller and child support assembly also includes at least one front wheel coupled to the front legs and two or more rear wheels coupled to the rear legs. The example stroller frame also includes a first joint disposed on a first side of the stroller frame and a second joint disposed on a second side of the stroller frame. The example stroller and child support assembly also includes a child support with a first connector releasably coupled to the first joint, and a second connector releasably coupled to the second joint of the stroller frame. The child support is removable from the stroller frame and independently usable as a child carrier and/or carry cot.

In some examples, the first connector includes a first housing and a second housing and the second connector includes a third housing and a fourth housing. In some examples, the first housing is rotatably coupled to the second housing and the third housing is rotatably coupled to the fourth housing to rotate the child support between an upright position and a recumbent position.

In some examples, the child support includes a child support frame comprising a perimeter rail, a first support and a second support. In some examples, one or more of the first support and the second support are pivotable relative to the perimeter rail.

In some examples, the first support and the second support are in extended positions when the child support is usable as a child carrier and/or carry cot.

In some examples, the first support is in a retracted position when the child support is in the upright position to shape the softgoods of the child support into a seat structure. In some examples, the first support includes a foot and the foot is to form a knee support when the first support is in the retracted position.

In some examples, the second support is in a retracted position substantially aligned with the perimeter rail when a backrest of the child support is in the upright position. In some examples, the second support is to form a backrest support when the second support is in the retracted position.

In some examples, the first connector includes an aperture and the first joint includes a release button to engage the aperture to selectively couple the child support to the stroller frame. In some examples, the release button has an angled surface and the first connector is to engage the angled surface to depress the release button as the child support is coupled to the stroller frame.

In some examples, the child support frame includes a napper bar that is rotatably coupled to the child support frame. In some examples, the napper bar is bifurcated into a first handle and a second handle. In some examples, the first handle and the second handle are independently rotatable.

In some examples, the child support includes a cushion that is pivotable between a first position and a second position. In some examples, the cushion is to pivot to the first position when the child support is in the upright position to expose a first side of the cushion, the first side having a coarse surface. In some examples, the cushion is to pivot to the second position when the child support is in the recumbent position to expose a second side of the cushion, the second side having a soft surface. In some examples, the cushion is wedge shaped.

In some examples, the stroller and child support assembly also includes a harness to secure a child occupant. In some examples, the harness is exposed when the cushion is in the first position and the harness is hidden when the cushion is in the second position.

Example methods disclosed herein include reclining a child support coupled to a stroller frame to a recumbent position. The example method also includes extending a first support. The example method also includes extending a second support. The example method also includes removing the child support from the stroller frame.

Another example child support structure that is adjustable between an upright position and a recumbent position is disclosed herein. The example child support structure includes a perimeter rail to support a backrest and a footrest while in the upright position, and to form an upper rail while in the recumbent position. The example child support structure also includes a front support rotatably coupled to the perimeter rail, the front support to form a knee support when the child support structure is in the upright position and a first support to support the child support structure on a surface when the child support structure is in the recumbent position. The example child support structure also includes a rear support rotatably coupled to the perimeter rail, the rear support to form a backrest support when the child support structure is in the upright position and a second support to support the child support structure on the surface when the child support structure is in the recumbent position. The example child support structure also includes a joint to removably couple the child support structure to a stroller frame.

In some examples, while the child support structure is in the upright position, the front support is to rotate upward into the plane of the perimeter rail. In some examples, while the child support structure is in the upright position, the rear support is to rotate upward into the plane of the perimeter rail.

In some examples, while the child support structure is in the upright position, the front support is to secure under the child support structure by a first tab and a second tab. In some examples, the first tab is in an engaged position when pushed in the direction of the second tab. In some examples, the second tab is in an engaged position when pushed in the direction of the first tab.

In some examples, while the child support structure is in the upright position, the rear support is to be secured in line with the perimeter rail by a buckle.

In some examples, while the child support structure is in the recumbent position, the front support and the rear support are in extended positions.

Another example method disclosed herein includes adjusting a child support structure between an upright position and a recumbent position, the child support structure comprising a perimeter rail to support a backrest and a footrest while in the upright position, and to form an upper rail while in the recumbent position. The example method may also include rotating a front support relative to the perimeter rail between a first position corresponding to the upright position and a second position corresponding to the recumbent position, the front support to form a knee support in the first position and a first support to support the child support structure on a surface in the second position. The example method also includes rotating a rear support rotatably relative to the perimeter rail between a third position corresponding to the upright position and a fourth position corresponding to the recumbent position, the rear support to form a backrest support in the third position and a second support to support the child support structure on the surface in the fourth position. The example method also includes removing the child support structure from the stroller frame.

In some examples, the front support is in a retracted position when the child support structure is in the upright position. In some examples, the rear support is in a retracted position substantially aligned with the perimeter rail when the child support structure is in the upright position.

In some examples, while the child support structure is in the first position, the front support is secured under the child support structure by a first tab and a second tab. In some examples, the first tab is in an engaged position when moved in the direction of the second tab. In some examples, the second tab is in an engaged position when moved in the direction of the first tab. In some examples, the first tab and second tab are engaged at the same time.

In another example, a child support structure includes a base, an enclosure surrounding the base, a pivotal wedge coupled to the base, and a harness coupled to the base. In some examples, the wedge is to pivot between a first position to expose the harness and a second position to hide the harness. In some examples, the wedge has a first side having a coarse surface and a second side having a cushioned surface, and the coarse surface is exposed in the first position and the cushioned surface is exposed in the second position. In some examples, the wedge extends the width of the base.

In another example disclosed herein, a method includes pivoting a wedge coupled to a base to a first position to expose a harness coupled to the base. The example method also includes pivoting the wedge to a second position to hide the harness.

In another example, a child support structure includes a frame comprising a perimeter rail and an adjustable handle detachably coupled to the perimeter rail at a first end and a second end, and the handle rotates between a first position and a plurality of second positions. Also, in some examples, the handle extends across the width of the perimeter rail. In some examples, the handle is bifurcated into a first handle and a second handle. In some examples, the first handle and second handle are independently rotatable.

Figure 2:
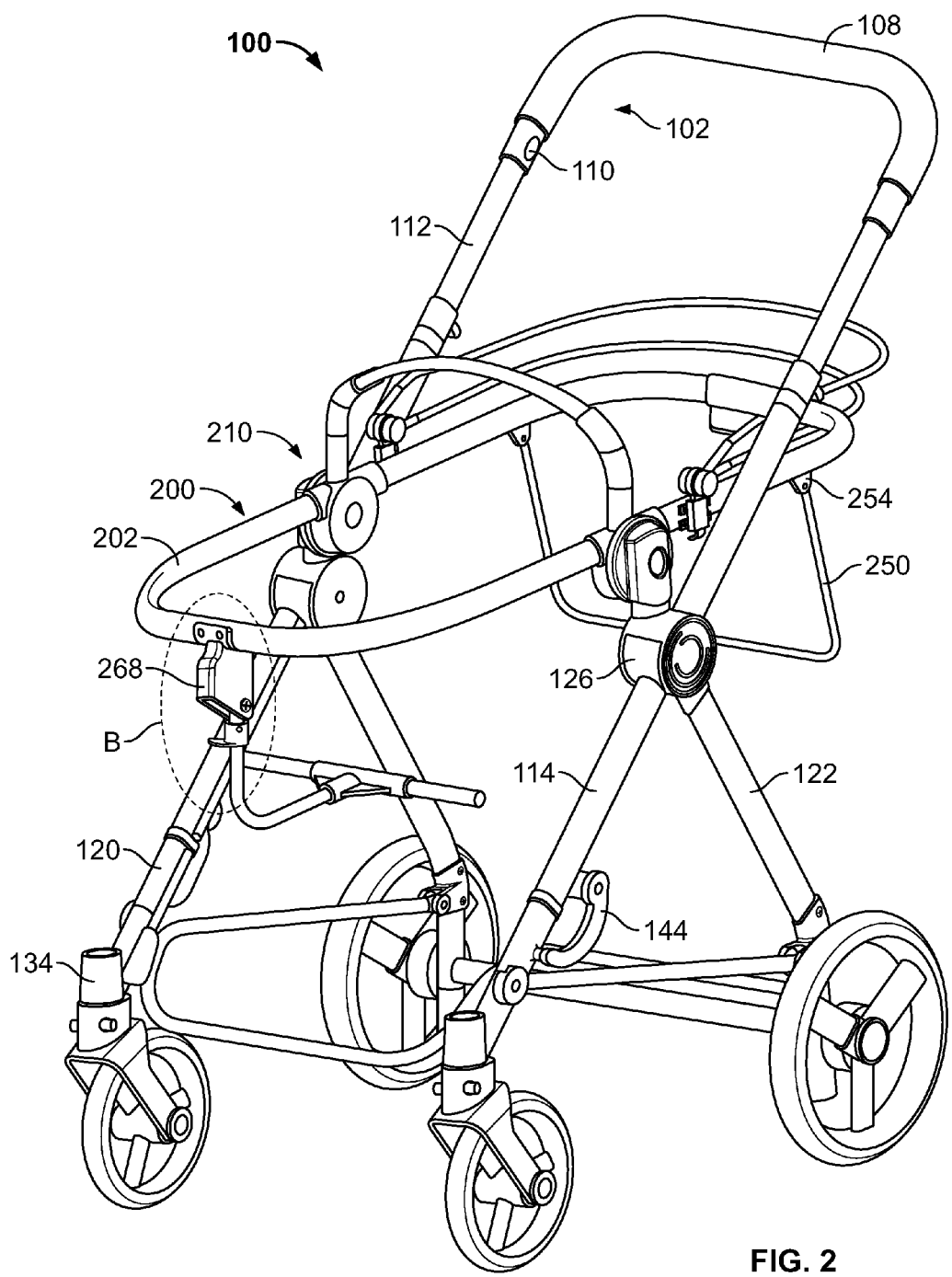
FIG. 2 is a perspective view of the example stroller of FIG. 1, with the child support in a recumbent position.

Turning now to the figures, FIGS. 1-7 show an example stroller and child support assembly 100 that includes a stroller frame 102 and a convertible child support 200 that converts between an upright or seat forming position as shown in FIG. 1 and a child carrier and/or carry cot when in a recumbent position as shown in FIG. 2. FIG. 8 shows an alternative stroller and child support assembly 101 that also has a convertible child support 200, but has an alternative child support frame as disclosed below. In some examples, the recumbent position is a substantially flat position such as, for example, similar to a carry cot, or may be relatively flat with, for example, a fifteen degree incline, such as in the child carrier. Other examples may include other degrees of incline that are greater or less than fifteen degrees.

Figure 7:
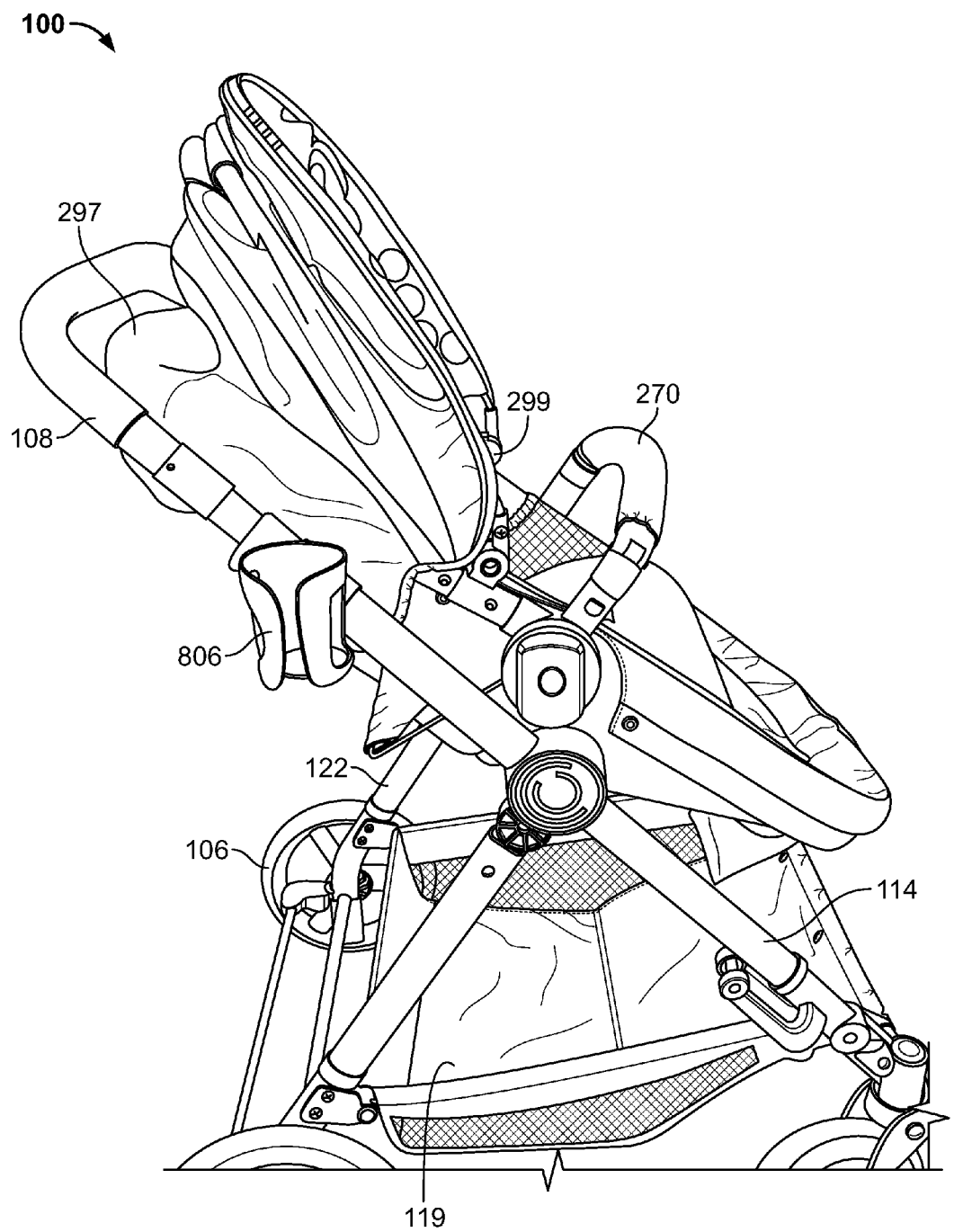
FIG. 7 is a side view of the example stroller of FIG. 1 including softgoods.
Figure 8:
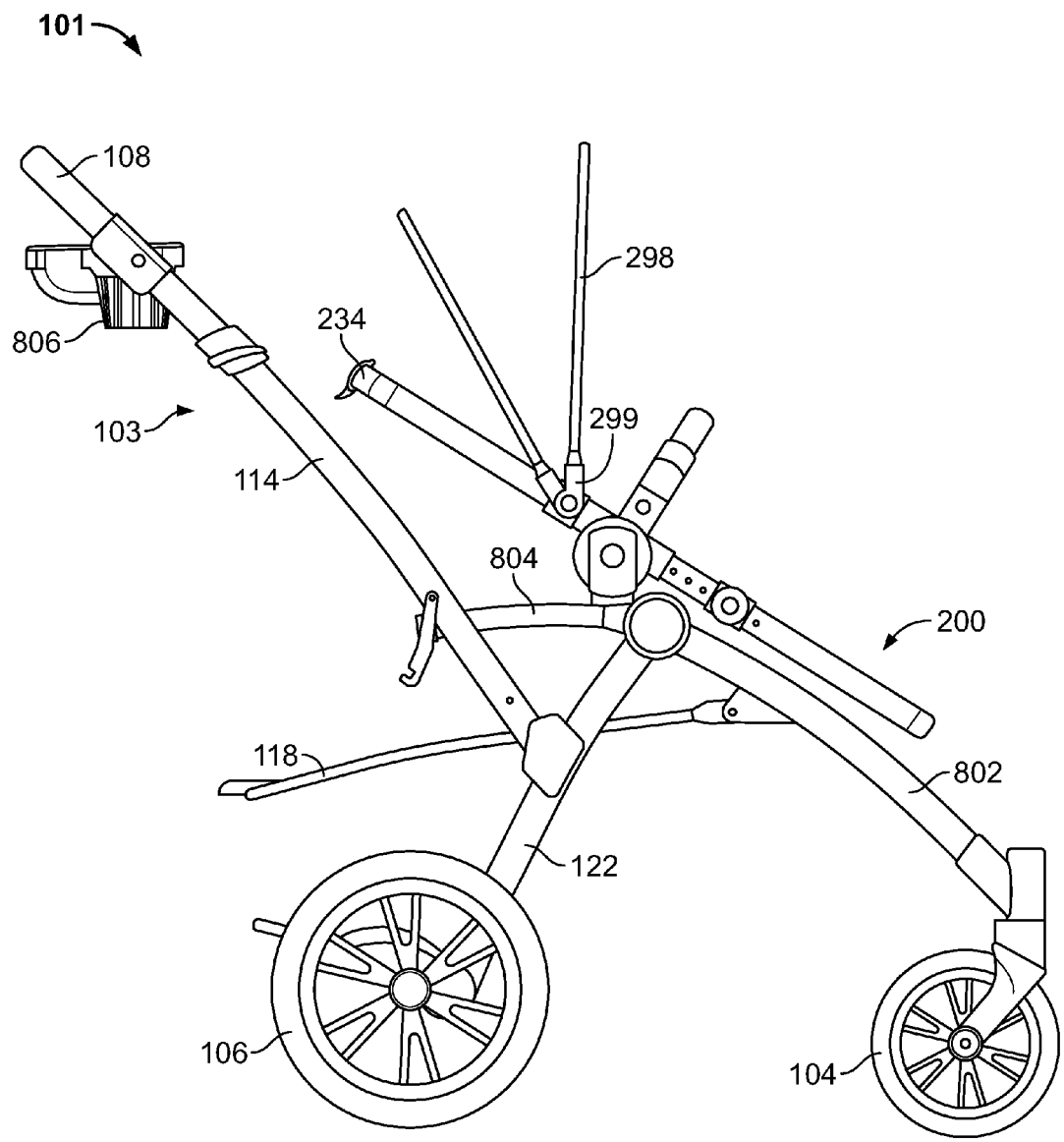
FIG. 8 is a side view of another example stroller constructed in accordance with the teachings of this disclosure and including a convertible child support (shown in an upright or seat forming position).

FIGS. 1-7 show an example stroller and child support assembly 100 having a first style stroller frame 102, with softgoods shown attached to the stroller frame 102 in FIG. 7. FIG. 8 shows the second example stroller and child support assembly 101 having a second style of stroller frame 103. There are similarities between the first stroller and child support assembly 100 and the second stroller and child support assembly 101 and, therefore, similar numbers will be used throughout the figures to describe similar structures. Additionally, the left side and the right side of the stroller and child support assembly 100 are substantially similar and the left side and the right side of the stroller and child support assembly 101 are substantially similar. Therefore, the description of one of the sides of one of the respective stroller and child support assemblies 100, 101 is applicable to the other side of that stroller and child support assembly 100, 101.

Figure 3:
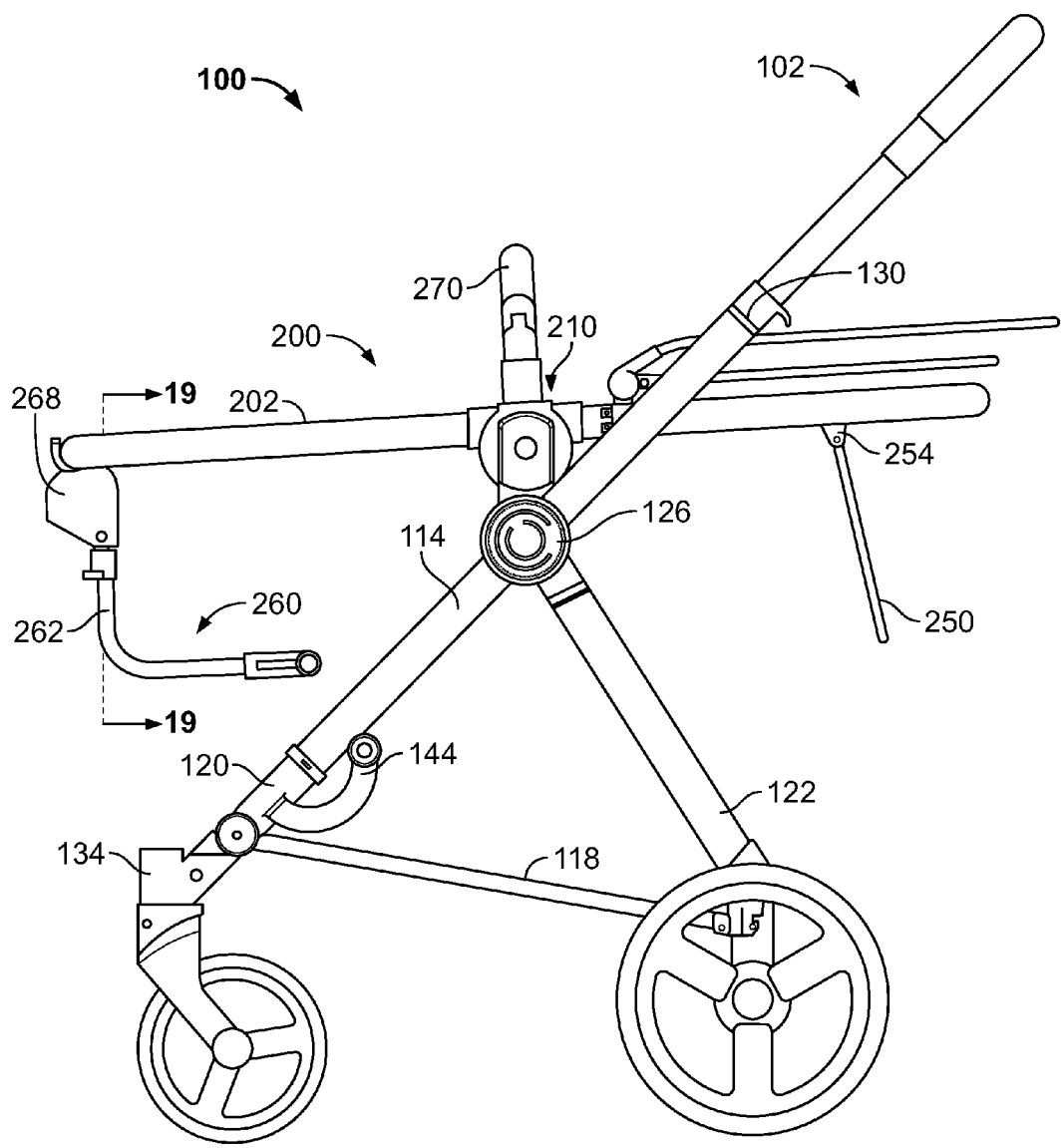
FIG. 3 is a side view of the example stroller of FIG. 2.
Figure 4:
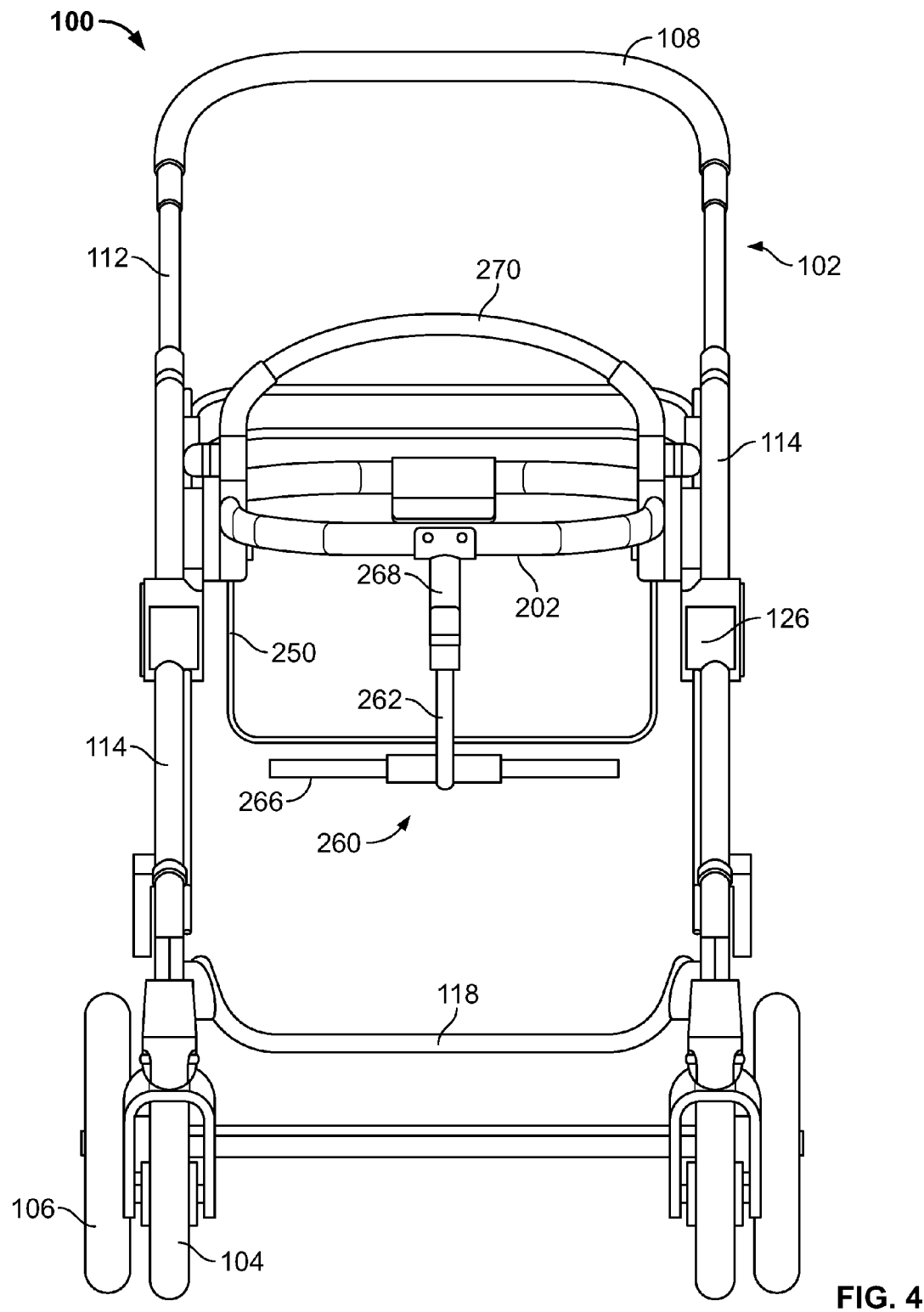
FIG. 4 is a front view of the example stroller of FIG. 2.
Figure 5:
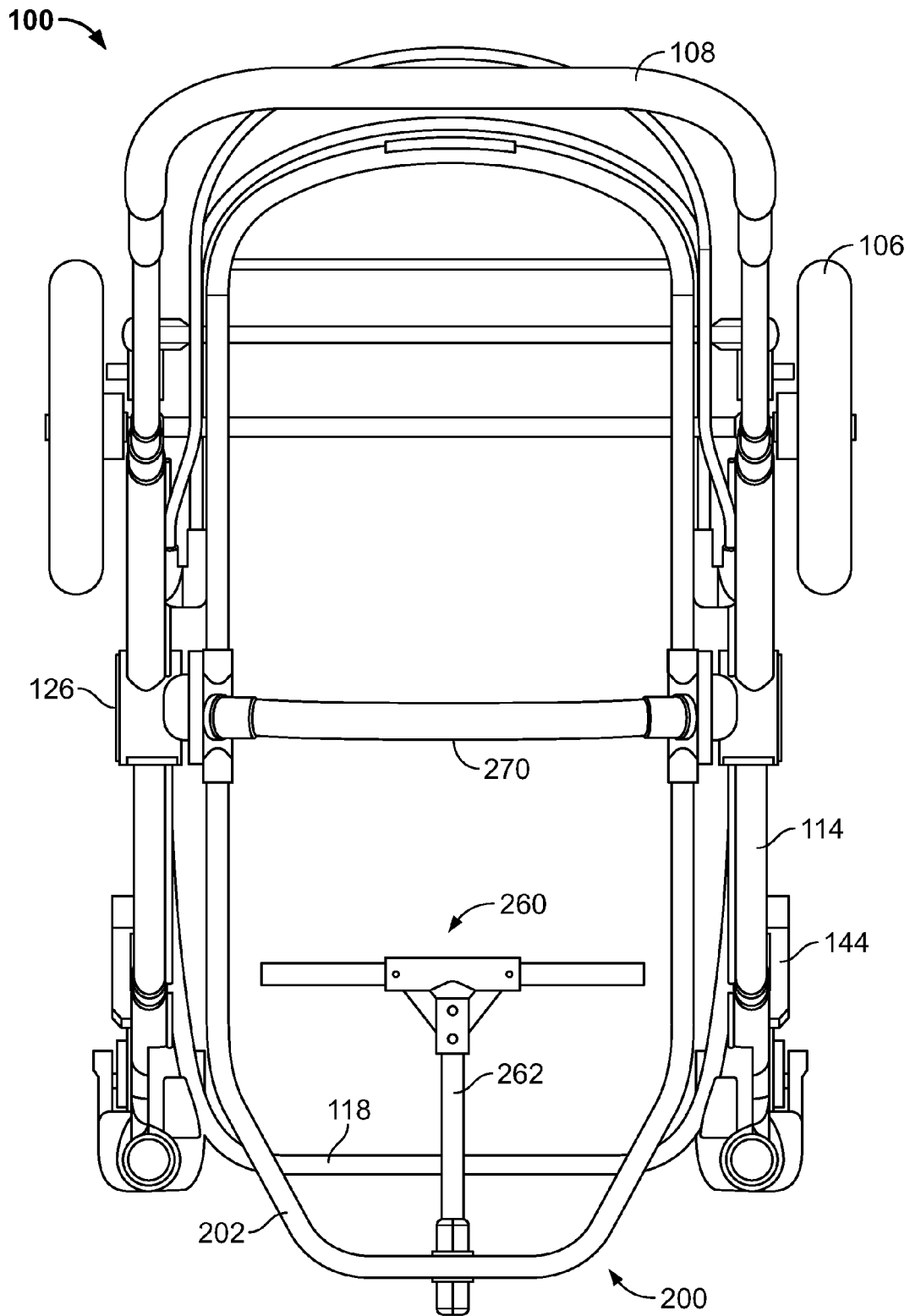
FIG. 5 is a top view of the example stroller of FIG. 2.
Figure 6:
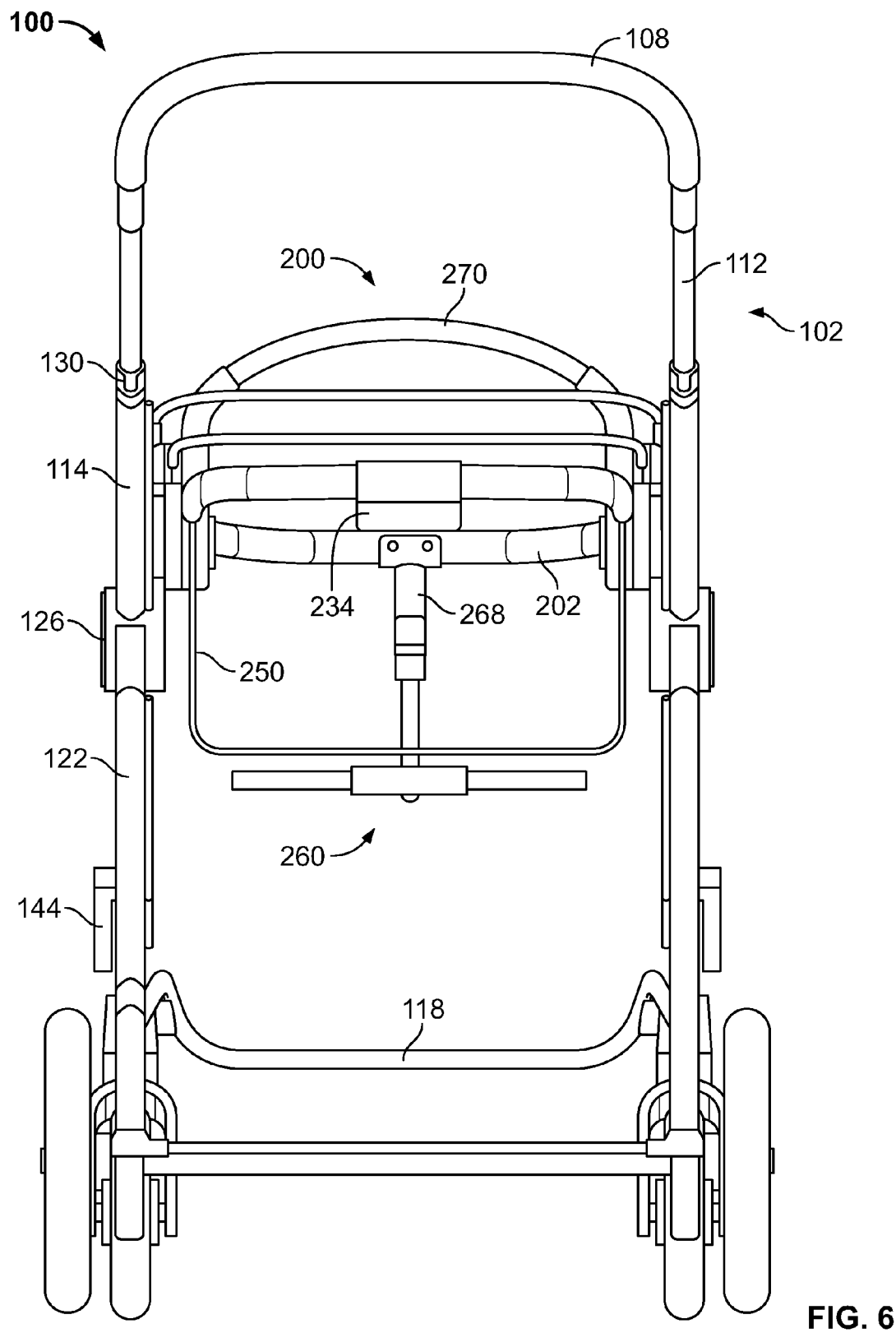
FIG. 6 is a rear view of the example stroller of FIG. 2.
Figure 15:
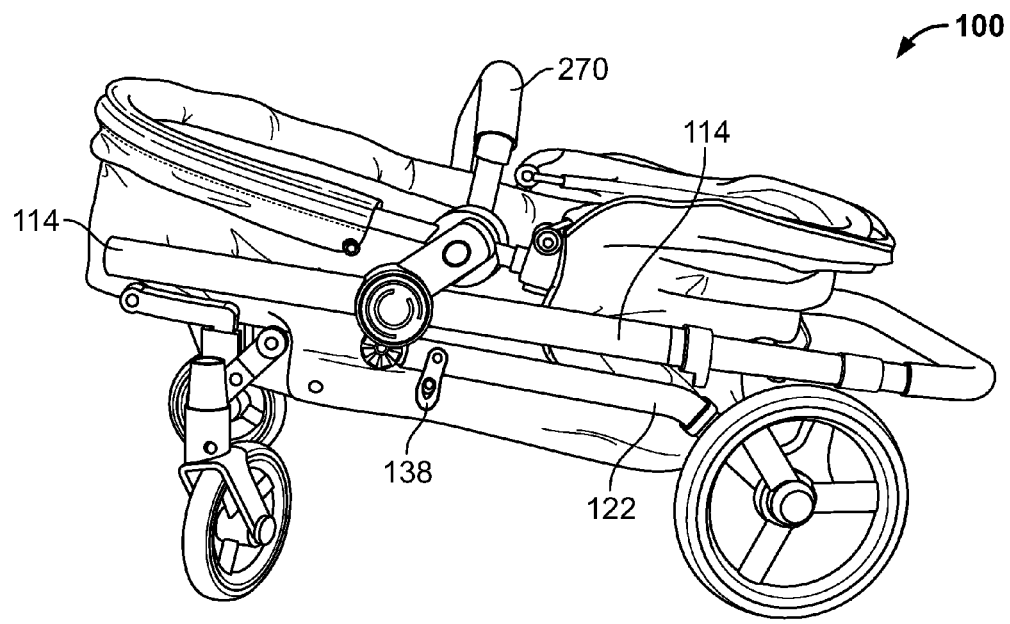
FIG. 15 is a side view of the example stroller of FIG. 1 in the collapsed position.
Figure 18:
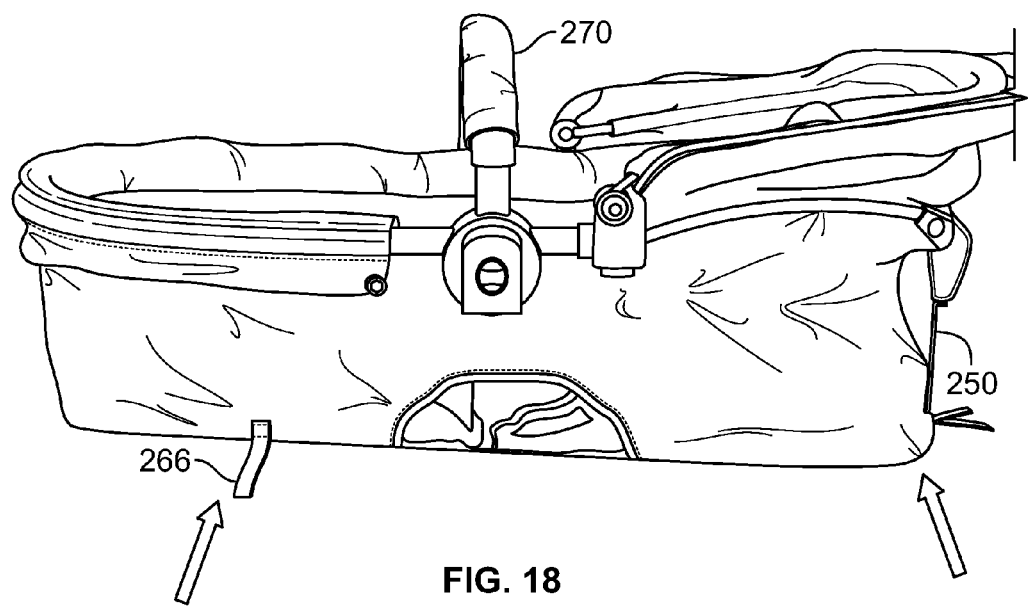
FIG. 18 is a side view of the example child support frame of FIG. 17 with softgoods.

The example stroller and child support assembly 100 of FIG. 1 includes an example stroller frame 102 and an example convertible child support 200. The example stroller frame 102 of FIGS. 1-7 includes many adjustable features such as, for example, left and right arms 112 that can be extended or retracted to adjust the height of the stroller frame 102. The example stroller frame 102 also includes a folding mechanism that enables moving the stroller frame 102 between an in-use position (FIGS. 1-7) and a collapsed position (FIG. 15). While in the in-use or deployed position, the convertible child support 200 can be oriented in a plurality of positions. For example, the convertible child support 200 may be in a seated or upright position (FIGS. 1 and 7) or may be in a substantially flat or recumbent (e.g., laying down) position (FIGS. 3 and 18). As described in greater detail below, the convertible child support 200 may be positioned at a plurality of incline angles.

With respect to the height adjustability, the stroller frame 102 of FIG. 1 includes a u-shaped handle or push arm 108 extending the width of the stroller and child support assembly 100. In some examples, the handle 108 includes two separate handles that are not coupled at the center. The handle 108 is coupled to upper arms 112 of the stroller frame 102 via any suitable mechanical fastener such as, for example, bolts, rivets or a weld. The upper arms 112 are slidably or telescopingly coupled to example lower arms 114. Example arm extending buttons 110 (FIGS. 2 and 11) are used to release the upper arms 112 for movement relative to the lower arms 114. In some examples, there is only one arm extending button 110, and in other examples, there is an arm extending button on each of the left and right sides. In the illustrated example, the arm extending button 110 is spring-loaded using, for example, a torsion spring 150.

To change the height of the stroller frame 102, the arm extending button 110 may be actuated (e.g., depressed) in a first direction (e.g., outward from the center of the stroller frame 102 or inward to the center of the upper arms 112) to compress the torsion spring 150 such that an extension 151 of the spring 150 is released from a handle engagement protrusion 160 of an interior guide 161 (FIG. 9), which releases the upper arms 112 from the position relative to the lower arms 114 to enable the upper arms 112 to move. To increase the height of the stroller frame 102, an upward force (e.g., away from the bottom of the stroller frame 102) is applied to the handle 108, which causes the upper arms 112 to telescope out of the lower arms 114. To decrease the height of the stroller frame 102, a downward force (e.g., towards the bottom of the stroller frame 102) is applied to the handle 108, which causes the upper arms 112 to telescope into the lower arms 114. To re-secure the handle 108 in position, the arm extending button 110 is released to cause the spring extension 151 to engage another handle engagement protrusion 160. In some examples, the arm extending button 110 is released as the height adjustment begins to occur, and the spring extension 151 automatically engages a handle engagement protrusion 160. Also, in some examples, the height of the stroller frame 102 is adjusted when both arm extending buttons 110 are actuated to provide added security against unintentional stroller height adjustment. In other examples, however, only one arm extending button 110 is actuated to allow adjustment of the height of the stroller frame 102, which enables one-handed height adjustment by the caregiver.

Another adjustable feature is that the stroller and child support assembly 100 may be folded for storage. As shown in FIG. 1, folding joints 126 pivotally couple the lower arms 114 with example rear arms 122. The rear arms 122 are coupled to rear wheels 106 via a pivotable connection. Example folding joints 126 also are shown in greater detail in FIGS. 13-16.

The lower arms 114 also are releasably coupled to front wheels 104 to enable the stroller frame 102 to fold. In the illustrated example, the lower arms 114 are coupled to the front wheels 104 via arm lock joints 120 and side links 144 (FIGS. 1-3 and 10). The arm lock joint 120 is an arm mechanically fastened to front wheel joint 134. For example, the arm lock joint 120 may be riveted to the upper caster of the front wheel joint 134. The example side link 144 is a link that extends from the arm lock joint 120 to the lower arm 114 and is pivotably coupled to the arm lock joint 120 and the lower arm 114. The side links 144 are coupled to the arm lock joints 120 and the lower arms 114 to support the lower arms 114 in position with the arm lock joint 120 whether the stroller frame 102 is in the extended position (FIG. 1) or the folded position (FIG. 15).

As mentioned above, the arm lock joints 120 are coupled to the front wheel joints 134. The front wheel joints 134 enable example front wheels 104 to rotate. In some examples, the front wheel joints 134 limit the degrees of rotation of the front wheels 104. For example, a fork coupled to the front wheel joints 134 may limit the degrees of rotation of the front wheels 104. In addition, though two front wheels and two rear wheels are shown in the illustrated example, in other examples, there may be other numbers of front wheels and/or rear wheels such as, for example, one, four, or any other suitable number.

Figure 9:
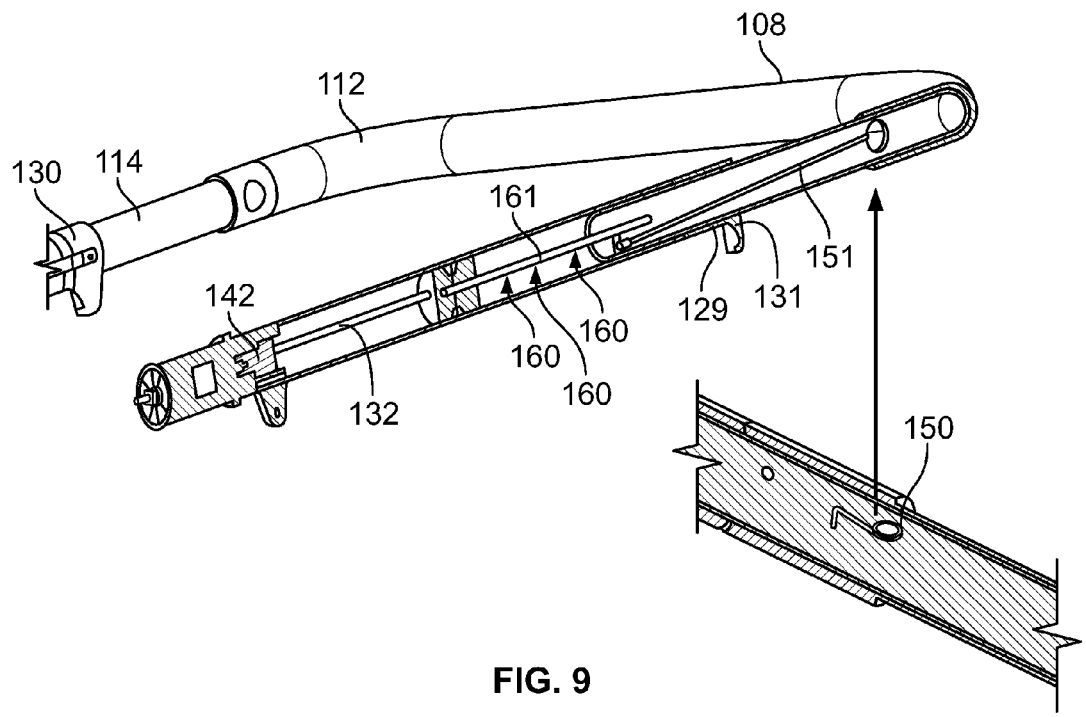
FIG. 9 is a partial cross-sectional view of a portion of the example stroller frame of FIG. 1, the cross-section portion being taken along line 9-9 of FIG. 1.
Figure 10:
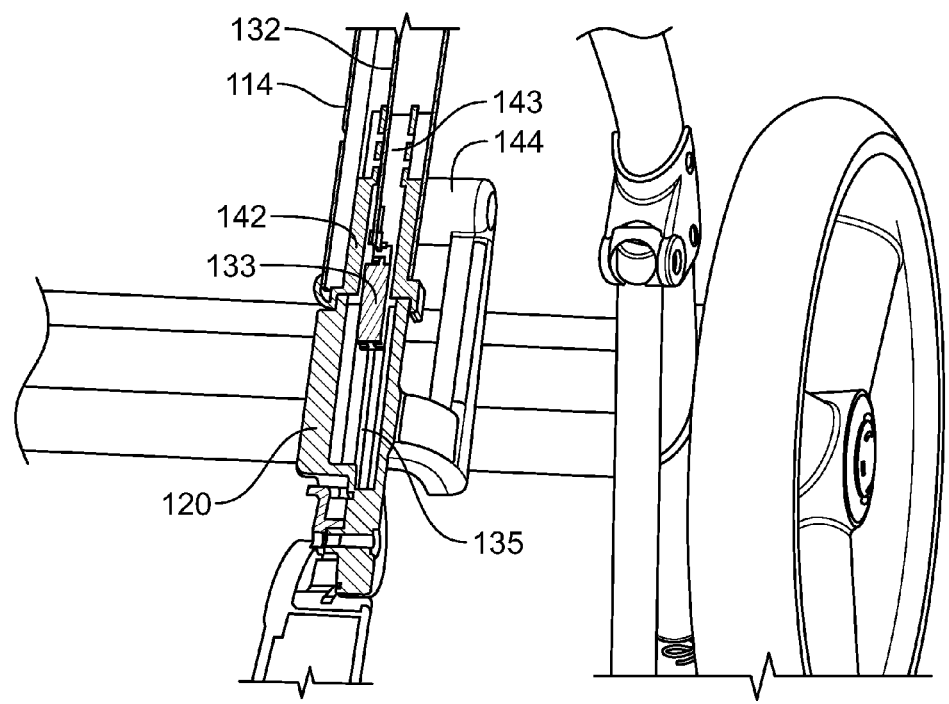
FIG. 10 is a partial cross-sectional view of a portion of the example stroller frame of FIG. 1, the cross-section portion being taken along the line 10-10 of FIG. 1.
Figure 11:
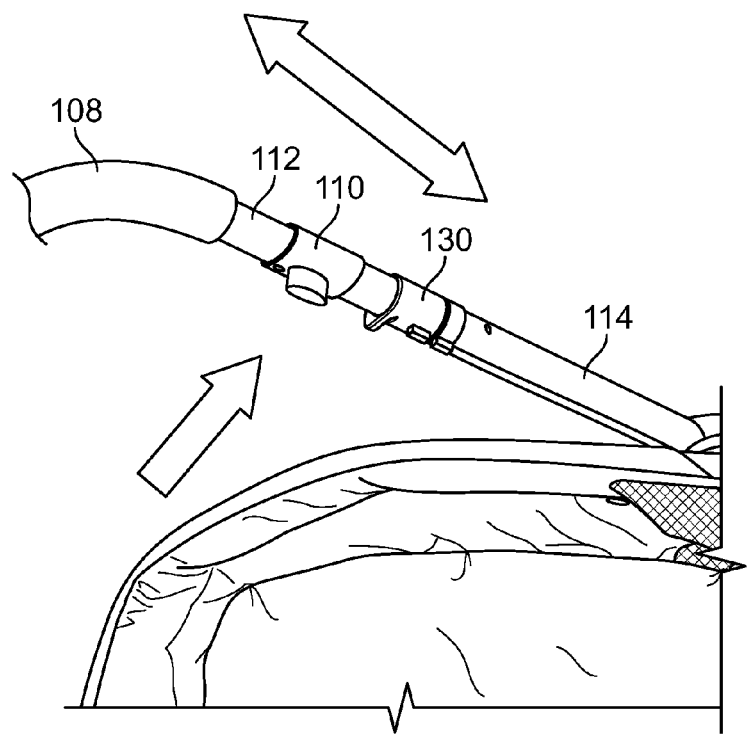
FIG. 11 is an enlarged view of the portion of the example stroller corresponding to circle A of FIG. 1 shown from the left in FIG. 1.
Figure 12:
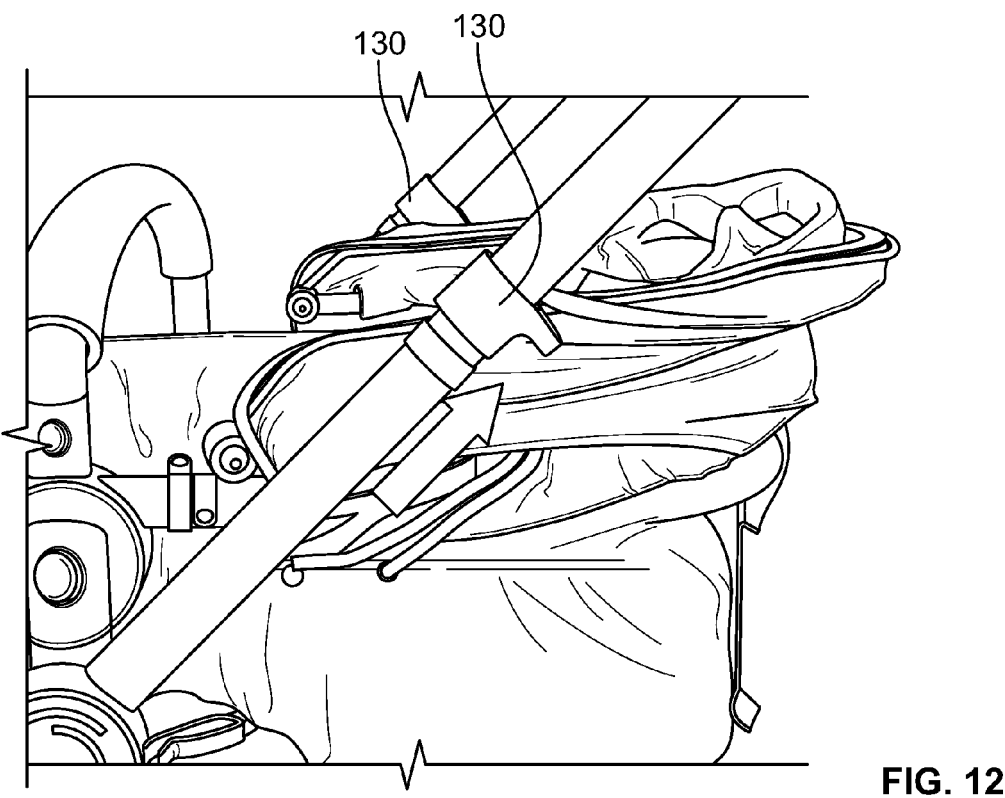
FIG. 12 is an enlarged view of an example collapsing trigger, which may be used in the example stroller of FIG. 1.

Returning to the folding feature, in the illustrated example, folding triggers 130 are coupled to upper portions of the lower arms 114 (FIGS. 3 and 12), which are actuated to enable the folding of the stroller frame 102. In this example, there is a folding trigger 130 at each of the left and right sides to require two-handed actuation of the folding feature. In other examples, there is one folding trigger to enable one-handed folding of the stroller frame 102. FIGS. 9-12 show the structure and operation of the stroller folding mechanism. FIG. 9 is a partial cross-sectional view of a portion of the example stroller frame 102 of the example stroller and child support assembly 100 taken along the line 9-9 of FIG. 1 to show the upper components of the folding mechanism. FIG. 10 is a partial cross-sectional view of a portion of the example stroller frame 102 of the example stroller and child support assembly 100 taken along the line 10-10 of FIG. 1 to show the lower components of the folding mechanism. FIG. 11 is an enlarged view of the portion of the example stroller and child support assembly 100 corresponding to the circle A of FIG. 1 shown from the left in FIG. 1, and FIG. 12 shows initiating collapsing of the example stroller frame 102 to a collapsed position.

In the illustrated example, the folding trigger 130 includes a sleeve 129 that at least partially surrounds one or more of the upper arm 112 and/or the lower arm 114. The example folding trigger 130 includes an extension grip 131 that a user (e.g., a caregiver) engages with his or her finger to actuate the folding trigger 130. In other examples, the folding trigger may be any other suitable device such as, for example, a lever extending from the upper arm 112 or the lower arm 114.

The folding trigger 130 is coupled to an arm cable 132 that runs through the lower arm 114 as shown in FIGS. 9 and 10. The arm cable 132 is coupled at an end opposite the folding trigger 130 to an example plunger 133. The plunger 133 is movable between an arm lock cavity 135 of the arm lock joint 120 and a guide housing cavity 143 of a guide housing 142 disposed at a lower end of the lower arm 114. In the illustrated example, the guide housing 142 is disposed in the interior of the lower arm 114.

When the folding trigger 130 is pulled (e.g., upward toward the handle 108), the arm cable 132 is pulled upward (e.g., in the direction of the arrow shown in FIG. 12), which pulls the plunger 133 from the arm lock cavity 135 and into the guide housing cavity 143 of the guide housing 142 to disengage the lower arm 114 from the arm lock joint 120. As a result, the lower arm 114 is able to rotate about the folding joint 126 to cause the upper arm 112 to move closer to the rear arms 122. Simultaneously, the side link 144 rotates about respective pivots with both the arm lock joint 120 and the lower arm 114. When the trigger 130 is released, the plunger 133 extends outward from the guide housing cavity 143 and is exposed when the stroller frame 102 is in the stored position or is extended into the arm lock cavity 135 when the stroller frame 102 is in the deployed position.

Figure 13:
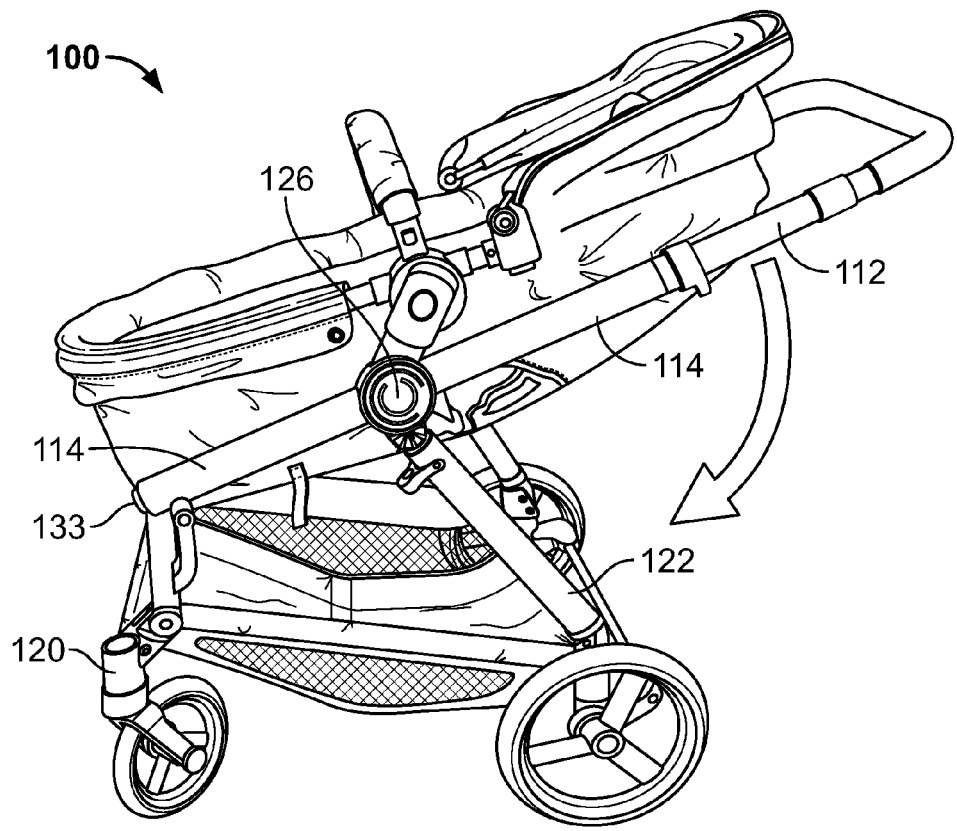
FIG. 13 is a side view of the example stroller of FIG. 1 in a semi-collapsed position.
Figure 14:
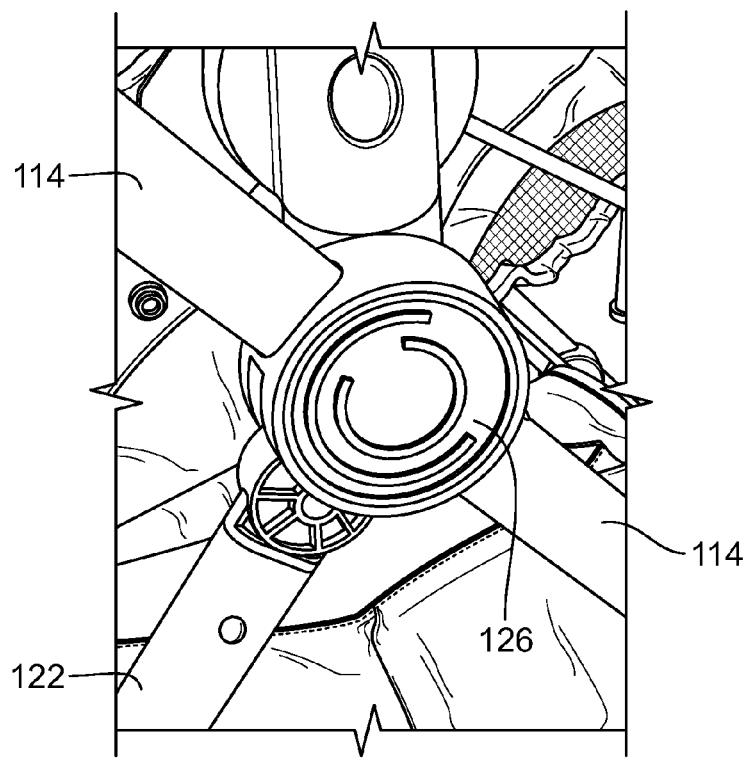
FIG. 14 is an enlarged view of an example hub and portion of the example stroller frame of FIG. 1 shown with the example stroller frame in an erected position.
Figure 16:
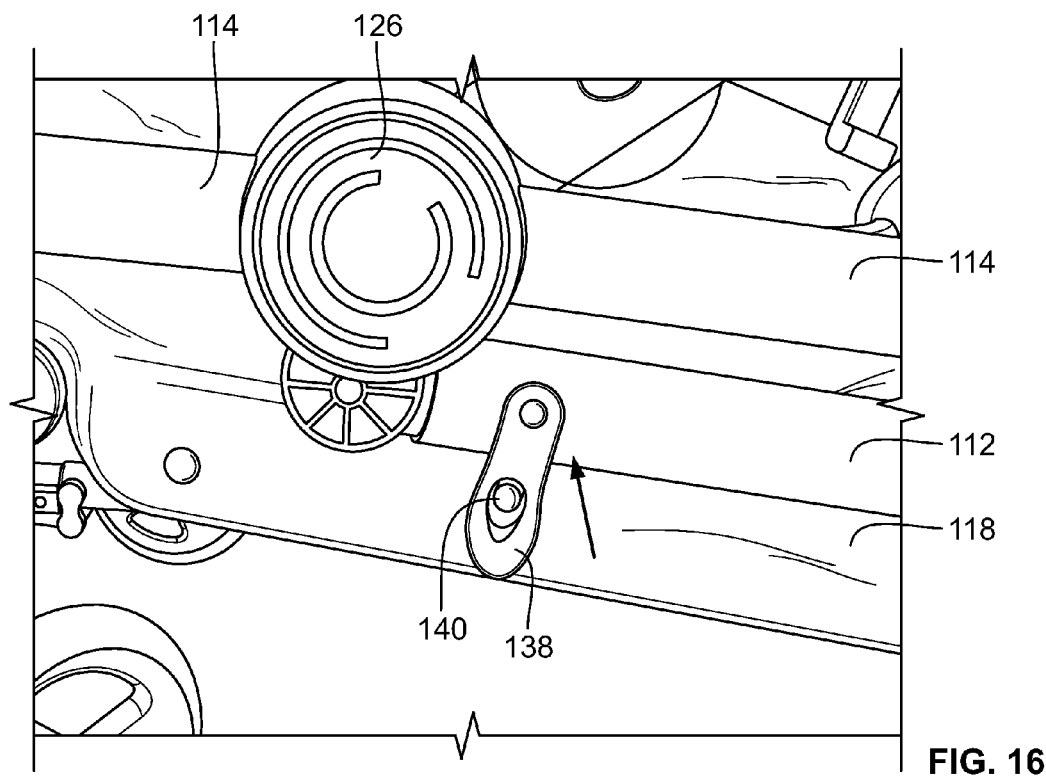
FIG. 16 is an enlarged view similar to FIG. 14, but showing the example stroller frame in a collapsed position.

FIGS. 13-16 illustrate converting the stroller and child support assembly 100 from the in-use or deployed position to the folded or collapsed position. FIG. 13 is a side view of the example stroller and child support assembly 100 of FIG. 1 in a semi-collapsed position, and FIG. 14 is an enlarged side view of an example folding joint 126 and portion of the example stroller frame 102 of FIG. 1 shown with the stroller frame 102 in the in-use or erected position. FIG. 15 is a side view of the example stroller and child support assembly 100 in a collapsed position, and FIG. 16 is an enlarged side view of the folding joint 126 and portion of the stroller frame 102 of FIG. 15 shown with the stroller frame 102 in the collapsed or folded position.

When the trigger 130 is activated and the lower arm 114 is disengaged from the arm lock joint 120 (FIG. 13), a downward force applied to the handle 108 or stroller frame 102 causes the upper arms 112, the lower arms 114 and the rear arms 122 to rotate about the folding joints 126. FIG. 13 shows the upper arms 112, the lower arms 114 and the rear arms 122 in a semi-folded position. As shown in the FIG. 13, the trigger 130 is no longer activated, so the plunger 133 is extended from the guide housing cavity 143 and exposed. The fully rotated and stored position of the upper arms 112, the lower arms 114 and the rear arms 122 is shown in FIGS. 15 and 16.

To lock the stroller frame 102 in the folded position (FIG. 15), a folding lock tab 138 engages with a folding lock button 140 (FIG. 16) to prevent the upper arms 112, the lower arms 114 and the rear arms 122 from moving. In this example, the lock tab 138 is pivotably coupled to one of the rear arms 122, and the folding lock button 140 is disposed on a basket frame 118. To release the stroller frame 102 from the folded position or to transition the stroller and child support assembly 100 from the closed or collapsed position to the open or in-use position, an outward force (e.g., outward from the center of the stroller frame 102) applied to the folding lock tab 138 disengages the folding lock tab 138 from the folding lock button 140. As a result, an upward force applied to the stroller frame 102 or handle 108 causes the upper arms 112, the lower arms 114 and the rear arms 122 to rotate about the folding joints 126 until the lower arms 114 are aligned with the arm lock joints 120 and the plunger 133 is extended into the arm lock cavity 135 to releasably couple the lower arms 114 with the arm lock joints 120.

As noted above, an alternative stroller and child support assembly 101 is shown in FIG. 8. The stroller and child support assembly 101 has an alternative stroller frame 103. In the stroller frame 103, the lower arms 114 are releasably coupled to the rear arms 122, which are coupled to rear wheels 106. Also, the stroller and child support assembly 101 includes example front arms 802 that are coupled to the front wheels 104. Additionally, the stroller and child support assembly 101 includes folding arms 804 that facilitate conversion of the stroller and child support assembly 101 between the in-use position and the folded position.

The example stroller and child support assemblies 100, 101 also include other features such as, for example, the example basket frame 118 to support a basket 119 (FIG. 7) for additional storage. In the example stroller and child support assembly 100 of FIGS. 1-7, the basket frame 118 is coupled to the arm lock joints 120 and example rear arms 122. In some examples, the basket frame 118 is u-shaped and may not include a rear component connected between the two rear arms 122. In some examples, the basket 119 may be attached to the basket frame 118, as shown in FIG. 7. In the example stroller and child support assembly 101 of FIG. 8, the basket frame 118 is coupled to the lower arms 114, the rear arms 122 and the front arms 802.

The example stroller and child support assemblies 100, 101 may also include accessory features such as, for example, an example beverage holder 806 (FIGS. 7 and 8). The example convertible child support 200 of FIGS. 7 and 8 also includes an example canopy support 298. The canopy support 298 is pivotally coupled to joint 299. In some examples, joint 299 is coupled to child support frame 202 of the convertible child support 200. While in a closed or retracted position, the canopy support 298 is rotated downward near the child support frame 202. When the canopy support 298 is in an open or expanded position, the canopy support 298 opens like a clam shell and rotates along joint 299 pulling a canopy 297 into an open position to shade the child occupant.

In the illustrated examples of FIGS. 1-7, the convertible child support 200 includes an example front support 260 (FIGS. 1 and 3) and an example rear support 250 (FIGS. 2 and 3). As described in greater detail below, the front support 260 is transitionable between a retracted position (FIGS. 1 and 23) when the convertible child support 200 is in the upright position, and an extended position (FIGS. 2 and 18) when the convertible child support 200 is in the recumbent position. Additionally, the rear support 250 is transitionable between a retracted position (FIG. 25) and an extended position (FIGS. 3 and 28) when the convertible child support 200 converts between the upright position and the recumbent position. When the convertible child support 200 is in the recumbent position, the child support 200 is usable as a child (e.g., an infant) carrier when removed from the stroller frame 102.

Figure 17:
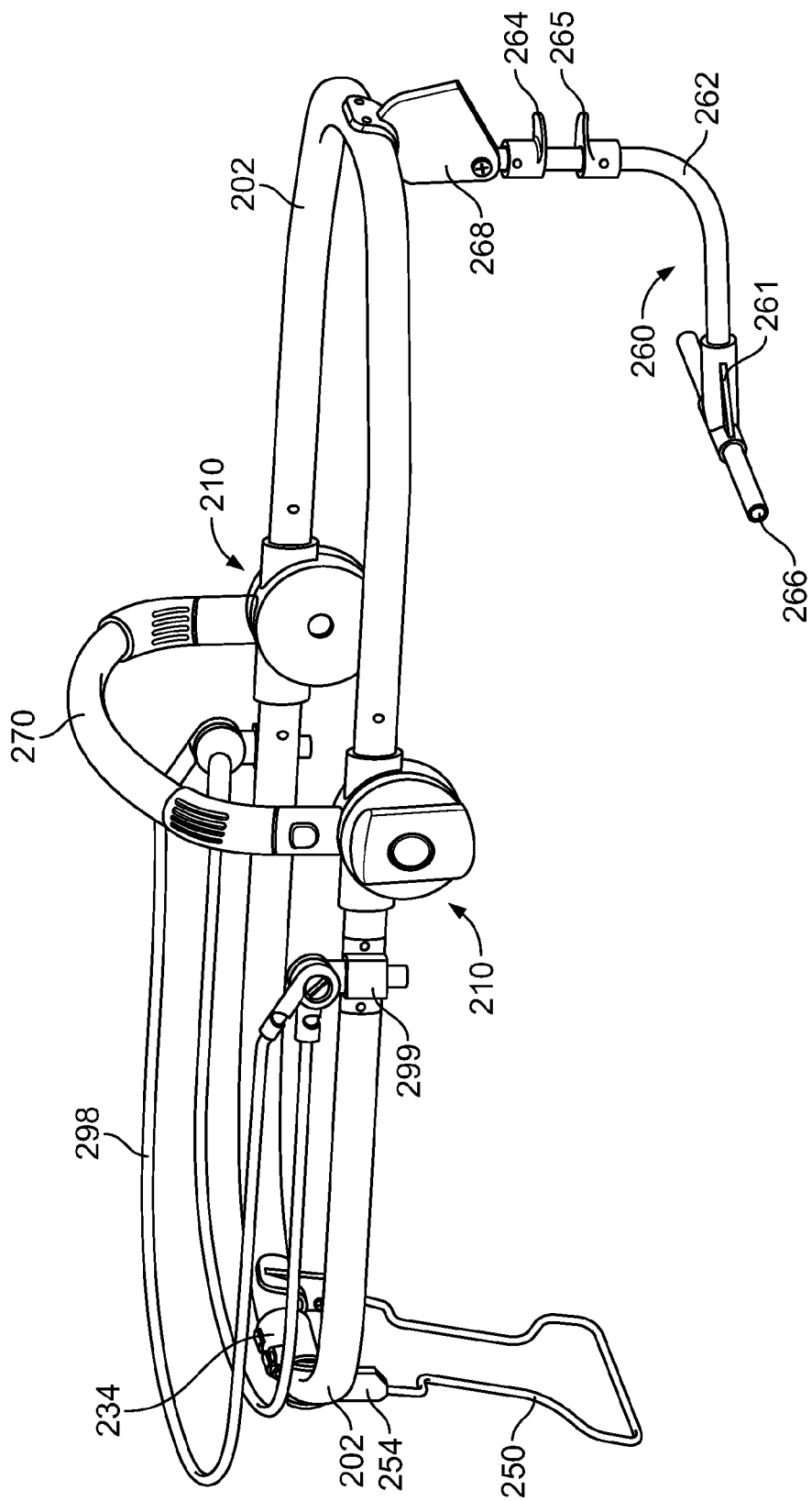
FIG. 17 is a perspective view of the example child support frame of FIG. 1 in the stand alone position.

FIGS. 17 and 18 illustrate the child support frame 202 removed from the stroller and child support assembly 100. FIG. 17 is a perspective view of the example child support frame 202 of FIG. 1 in the stand alone position. FIG. 18 is a side view of the example child support frame 202 of FIG. 17 with softgoods coupled to the child support frame 202.

The convertible child support 200 includes the child support frame 202, which forms the perimeter of the convertible child support 200. The child support frame 202 is coupled to a front support 260 and a rear support 250. The child support frame 202 is further coupled to the canopy support 298 and joint 299 and a napper bar 270. In the illustrated example, the napper bar 270 is a curved structure that is used as a handle to carry the child support 200 when used as a child carrier. The napper bar 270 may also be used as a bar to secure a child occupant in the stroller and child support assembly 100 when the child support 200 is used in the upright position. In some examples, the napper bar 270 is removably coupled to the support frame 202.

The child support frame 202 is a hollow tube with a perimeter cable 235 (FIG. 37) running through the inside of the child support frame 202. The perimeter cable 235 couples an example release latch 234 (FIGS. 17 and 30) to a gear hub 210. As described in greater detail below (e.g., in connection with FIGS. 35-39), the gear hub 210 enables reclining the convertible child support 200 in a plurality of incline angles or positions.

The child support frame 202 is coupled to the front support 260 via an example front hub 268. In the illustrated example, the front hub 268 is coupled to the child support frame 202 via a rivet. In other examples, any suitable mechanical fastener may be used. The front hub 268 enables transitioning the front support 260 from an extended or opened position (FIG. 17) (e.g., when the convertible child support 200 is in the recumbent position) to a closed or collapsed or retracted position (FIGS. 1 and 23) (e.g., when the convertible child support 200 is in the upright position). Further details of the front hub 268 are shown in greater detail in FIGS. 19-23. The front support 260 includes an L-shaped support 262. The L-shaped support 262 is coupled to an example foot 266 via any suitable mechanical fastener 261 including, for example, a molding. The front support 260 also includes an upper tab 264 and a lower tab 265, which, as described below, are actuated to release the front support 260 for movement between the extended and retracted positions.

Figure 21:
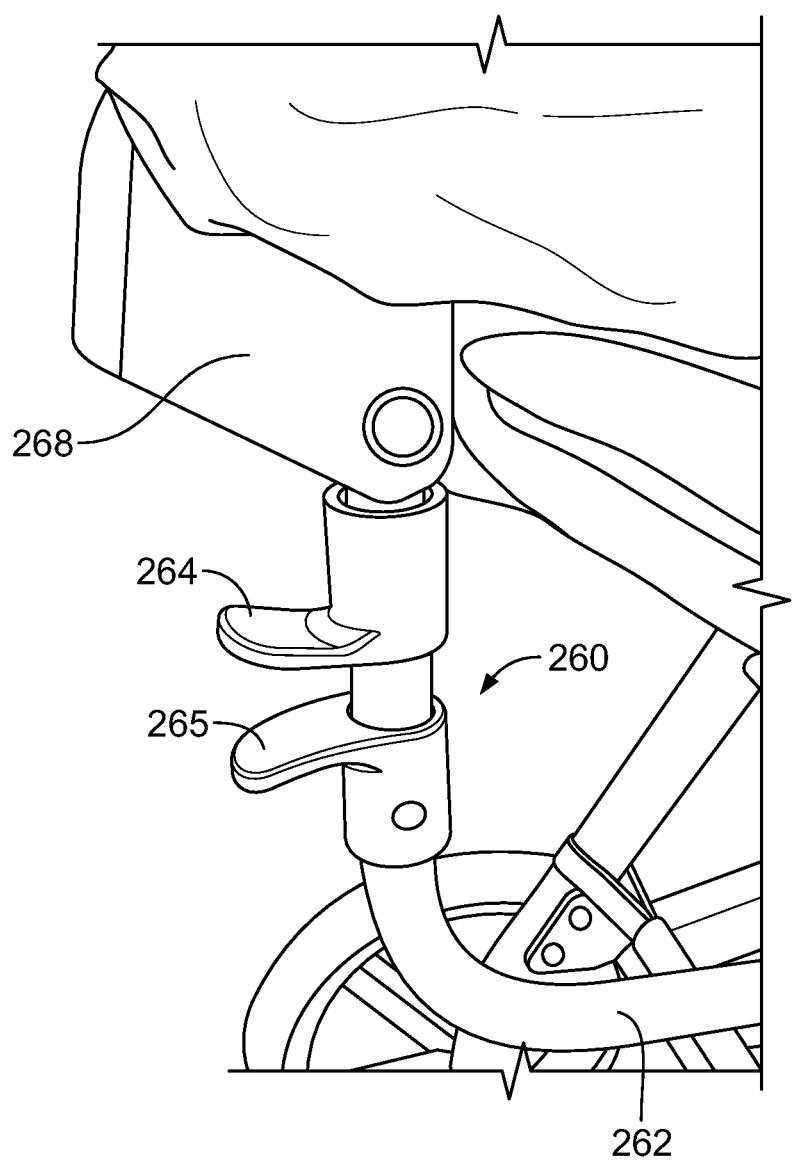
FIG. 21 is an enlarged view of the portion of the example child support frame corresponding to circle B of FIG. 2.
Figure 22:
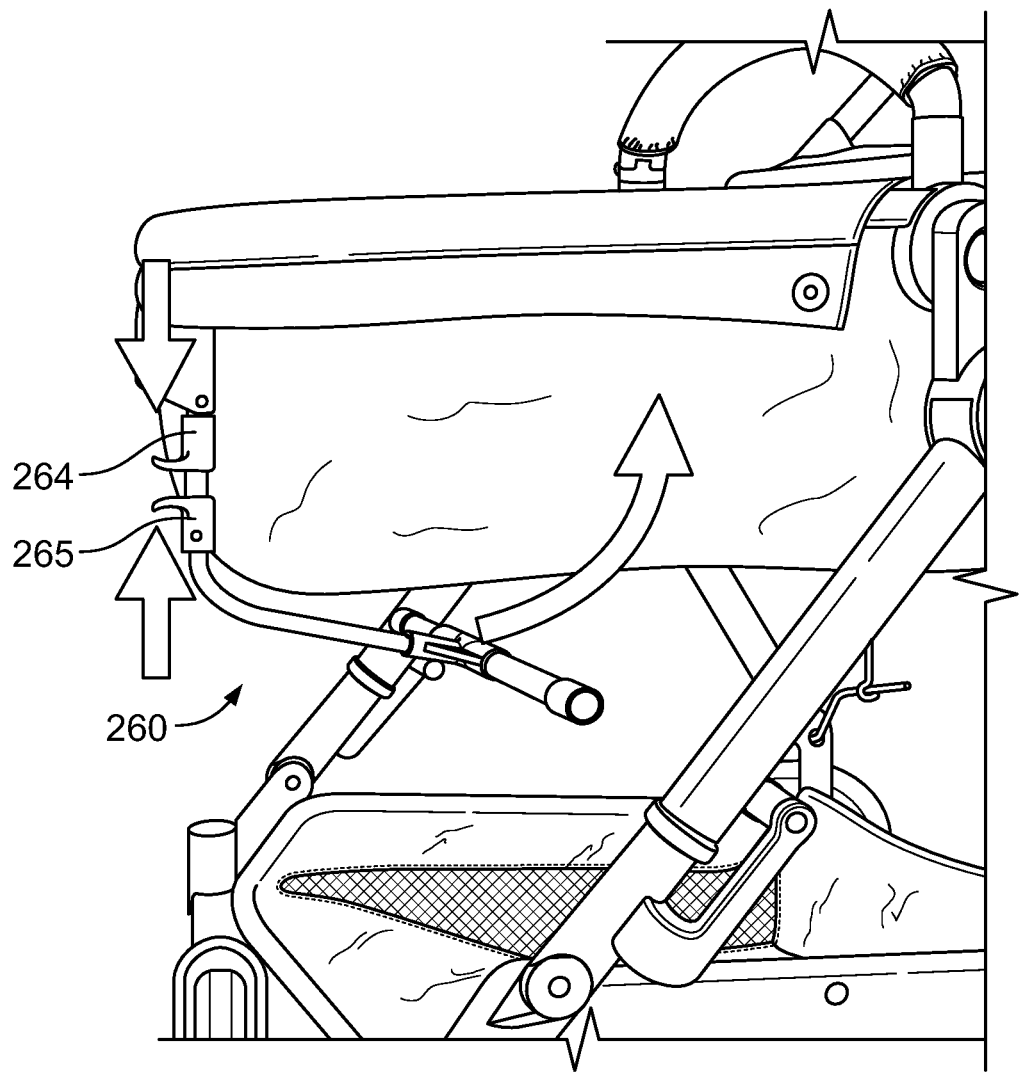
FIG. 22 is a partial front, side perspective view of the example child support frame of FIG. 1 and shown mounted on the example stroller of FIG. 1.
Figure 23:
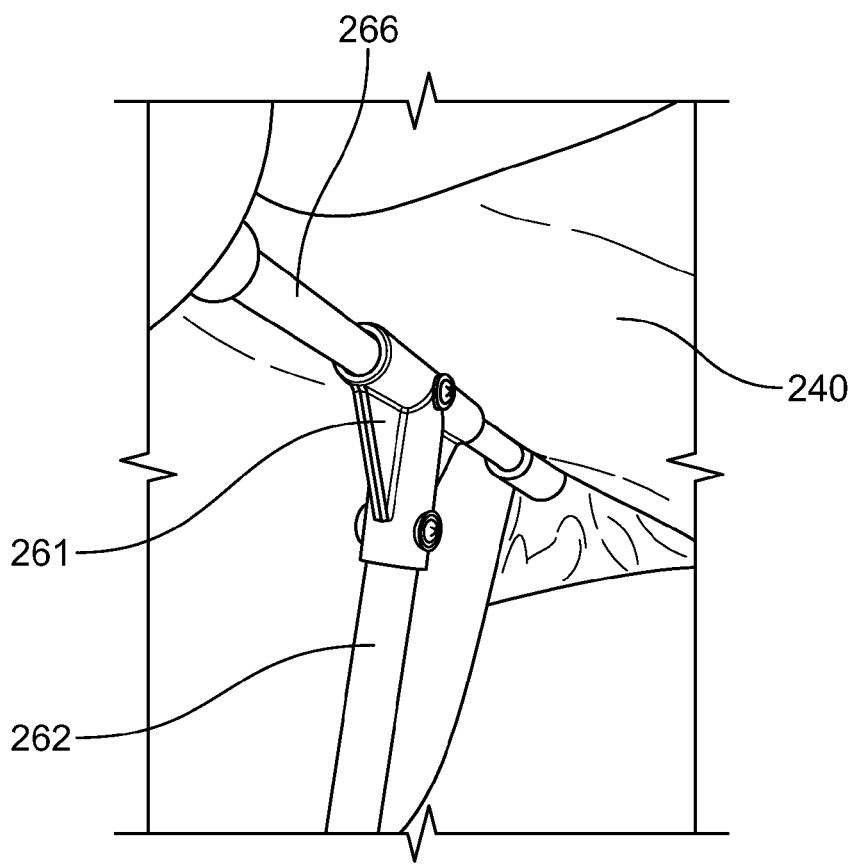
FIG. 23 is an enlarged view of an example foot of the example front support of the example child support frame of FIG. 1 shown in the upright and/or seat forming position.

FIGS. 19-23 illustrate transitioning the front support 260 from the open or extended position to a closed or retracted position, or vice versa. FIG. 19 is a cross-sectional view of the example front support 260 and the front hub 268 taken along the line 19-19 of FIG. 3 but viewed from the opposite side. FIG. 20 is a side view of the example front support 260 of FIG. 19 shown in the rotated position. FIG. 21 is an enlarged view of the portion of the example child support frame 202 corresponding to the circle B of FIG. 2. FIGS. 22 and 23 are views of an example position transition for the front support 260 of the example child support 200 of FIG. 1 to move the convertible child support 200 from the recumbent position (FIG. 22) to the upright or seat forming position (FIG. 23).

As shown in FIG. 19, the lower tab 265 is coupled to the L-shaped support 262. In the illustrated example, the lower tab 265 is immovably coupled to the L-shaped support 262. The upper tab 264 is slidably coupled to the L-shaped support 262. In the illustrated example, each of the lower tab 265 and upper tab 264 include sleeves that extend at least partially around the support and extensions that extend from the sleeves for engagement by the user. The upper tab 264 is operably coupled to a locking bar 294 via a suitable mechanical fastener such as, for example a pin 295. The locking bar 294 is slidably coupled to the L-shaped support 262. In the illustrated example, the locking bar 294 is slidably or telescopingly received in the L-shaped support 262. The L-shaped support 262 includes a slot 292 through which the pin 295 travels. The slot 292 defines the path of motion for the pin 295 and, thus, the locking bar 294 and the upper tab 264.

The L-shaped support 262 is pivotally coupled to the front hub 268 via pivot 291. The front hub 268 of the front support 260 also includes a first cavity 241 and a second cavity 243. The first cavity 241 and the second cavity 243 are separated by a stop 269. The locking bar 294 engages either the first cavity 241 when the child support 200 is in the recumbent position (FIG. 19) or the second cavity 243 when the child support 200 is in the upright position (FIG. 20). The upper tab 264 and the locking bar 294 are spring-loaded via an example spring 296. In the illustrated example, the spring 296 is located inside the locking bar 294 and biases the locking bar 294 to an extended position in which the locking bar 294 engages one of the two cavities 241, 243.

To move the front support 260 between the recumbent position and the upright position, a user squeezes the upper tab 264 and the lower tab 265. Because the lower tab 265 is fixed relative to the L-shaped support 262, the squeezing motion imparts a downward force in the direction of Arrow A to the upper tab 264 (and an accordingly upward force applied to lower tab 265, but the lower tab 265 does not move). The upper tab 264 moves toward the lower tab 265, which pulls the locking bar 294 downward in the direction of Arrow B and disengages the locking bar 294 from the first cavity 241. Once the locking bar 294 is disengaged from the first cavity 241, the L-shaped support 262 clears the stop 269 and may pivot about the pivot 291 inside the front hub 268 between either of the two engaged positions, i.e., between the two cavities 241, 243. In the illustrated example, Arrows C and D illustrate the pivot motions of the L-shaped support 262. To secure the locking bar 294 in the second cavity 243, the upper tab 264 is released, and the spring 296 extends the locking bar 294 from the L-shaped support 262 into the second cavity 243 so that the locking bar 294 does not clear the stop 269. To move the child support 200 back to the recumbent position of FIG. 19, the process is repeated with the L-shaped support 262 pivoted in the direction opposite the arrow C. The activation of the upper tab 264 and the lower tab 265 and the pivoting of the L-shaped support 262 are shown relative to the stroller and child support assembly 100 in FIG. 22. FIG. 23 shows an enlarged view of the L-shaped support 262 in the upright position in which the foot 266 forms the support under the knees of a child occupant.

As shown in FIG. 17, the child support frame 202 is also coupled to the rear support 250 via an example rear joint housing 254. The rear joint housing 254 (FIGS. 24a, 24b and 25) enables the rear support 250 to transition from an extended position (FIGS. 17 and 28) to a retracted position (FIG. 25).

Figure 24A:
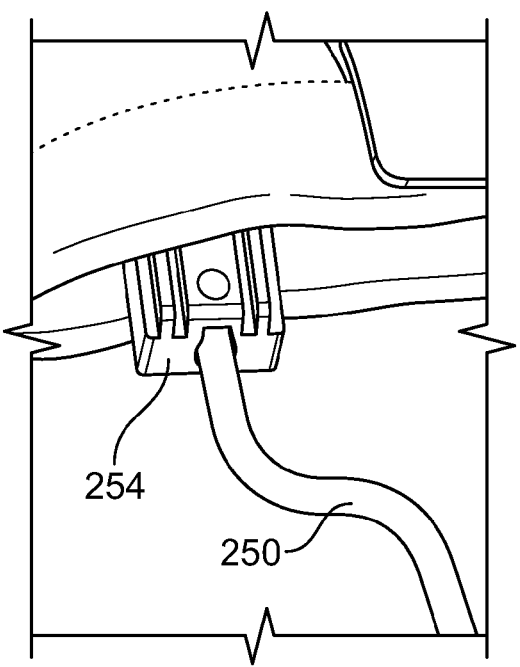
FIG. 24a is an enlarged view of a rear joint housing of the example child support frame of FIG. 1 shown in the recumbent position.
Figure 24B:
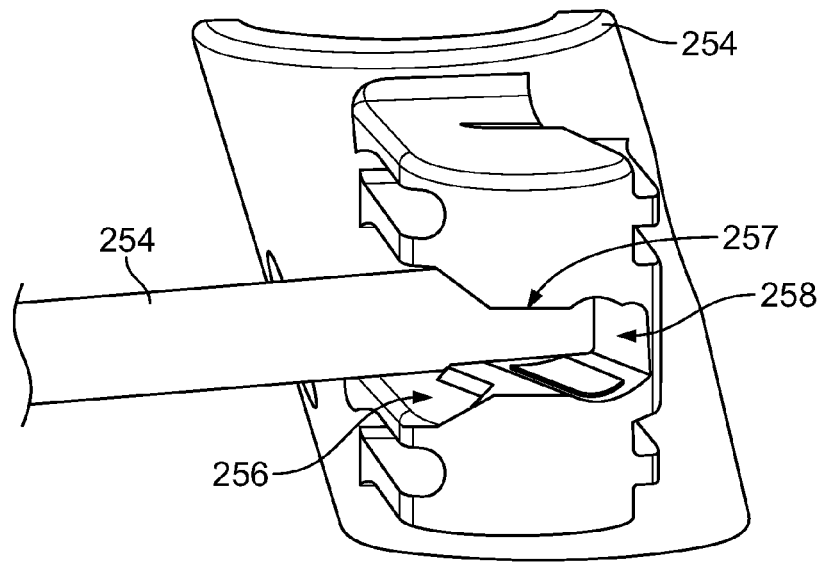

FIG. 24a shows the rear joint housing 254 and the rear support 250 in the extended position. The rear joint housing 254 includes a first rear cavity 256 and a second rear cavity 258 connected via a rear neck 257. The cavities 256, 258 are shown in greater clarity in FIG. 24b. The rear support 250 engages the first rear cavity 256 when the child support 200 is in the recumbent position (FIGS. 24a, 24b and 28), and the rear support 250 is extended. In addition, the rear support 250 engages the second rear cavity 258 when the child support 200 is in the upright position (FIG. 25), and the rear support 250 is in the retracted position. In the example, the rear neck 257 is a relatively narrow channel compared to the two rear cavities 256, 258. As a result, the rear neck 257 biases the rear support 250 into either one of the two rear cavities 256, 258. To move the rear support 250 between the extended position and the retracted position, a user applies a force to the rear support 250 sufficient to overcome the friction force due to the narrower rear neck 257. Thus, the rear support 250 engages either one of the two rear cavities 256, 258 until a sufficient force is applied to move the rear support 250 into the other rear cavity.

Figure 25:
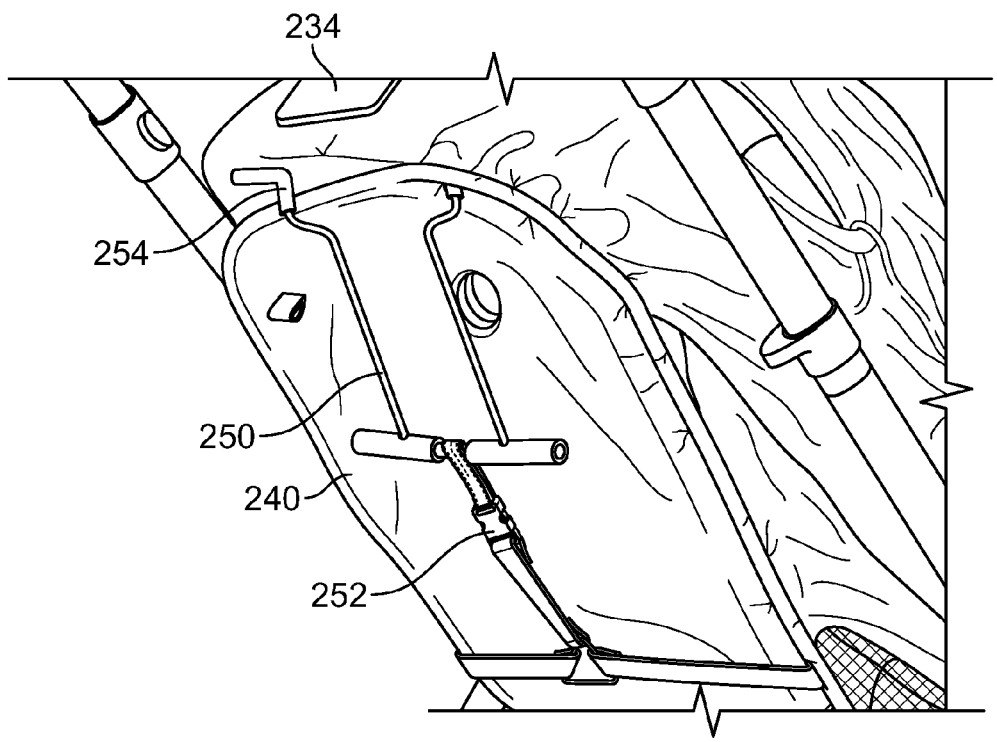
FIG. 25 is a rear view of a rear support of the example child support frame of FIG. 1 shown in the upright position.

FIG. 25 shows the rear support 250 in the retracted position when the child support 200 is in the upright position. In the upright position, the rear support 250 is further supported at the underside of the child support 200 via a fastener 252 such as, for example, a buckle. In other examples, other mechanical fasteners may be used including, for example, straps that include loop and hook fasteners, D-rings or any other suitable fastener. One portion of the fastener 252 is coupled to the rear support 250 and another portion of the fastener 252 is coupled to an underside of the back/floor of the child support 200. In the illustrated example, the female component of buckle 252 is coupled to the rear support 250 and the male component of buckle 252 is coupled to the underside of the child support 200. When the buckle 252 is engaged, the rear support 250 is locked in the retracted position, which is the upright position.

Figure 26:
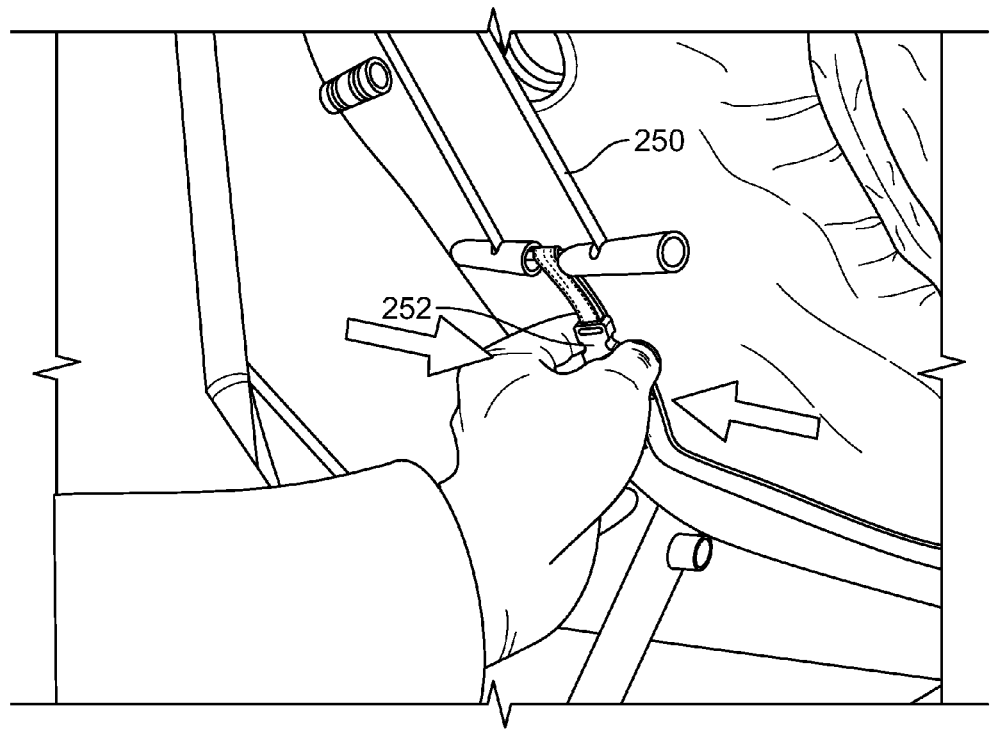
FIGS. 26 and 27 show a position transition process for the rear support of the example child support frame of FIG. 1 as the rear support transitions from an upright or seat forming position to a recumbent position.
Figure 27:
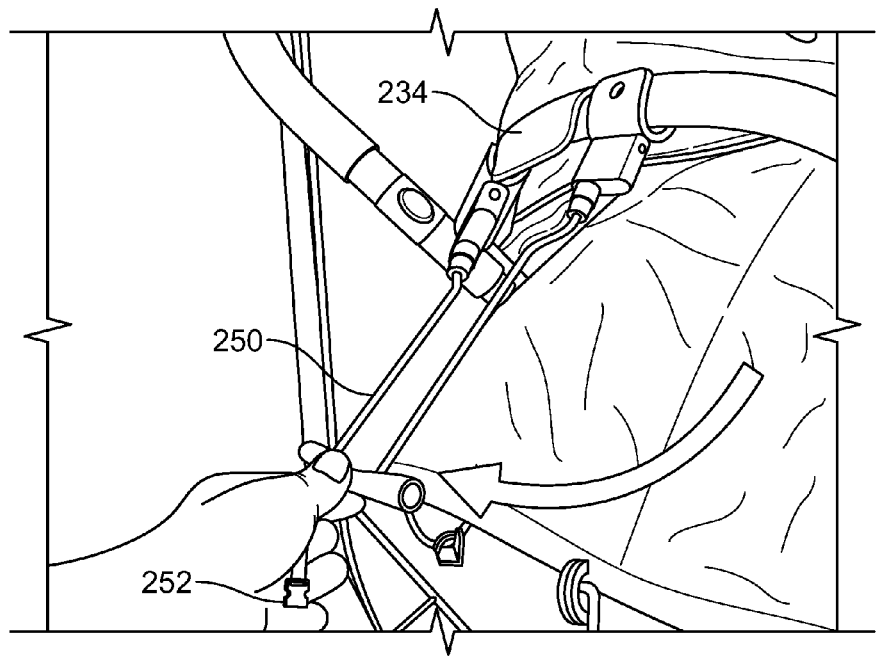
Figure 28:
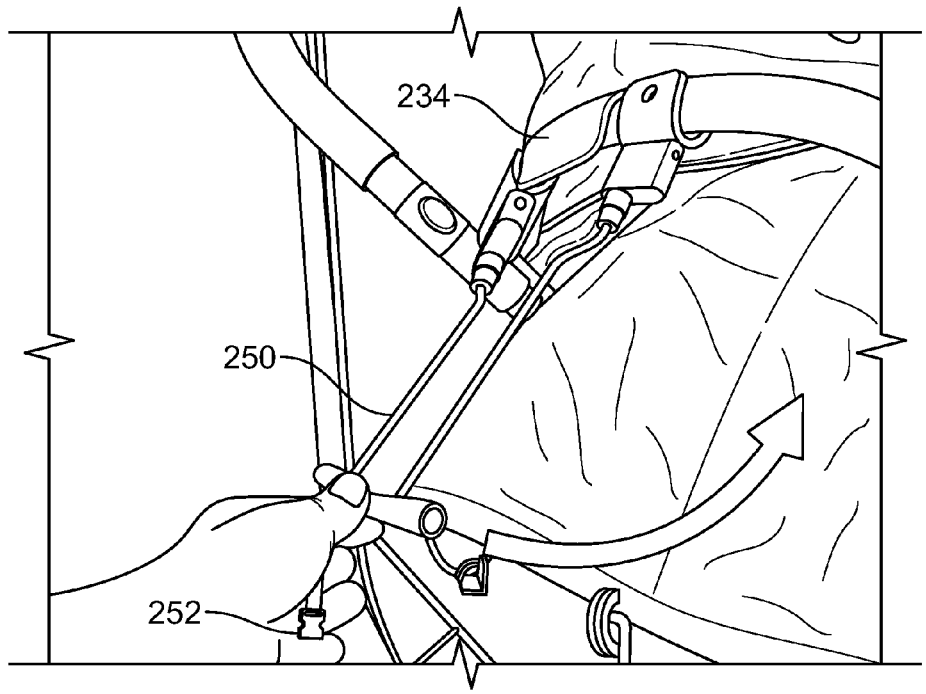
FIGS. 28 and 29 show a position transition process for the rear support of the example child support frame of FIG. 1 as the rear support transitions from the recumbent position to the upright position.
Figure 29:
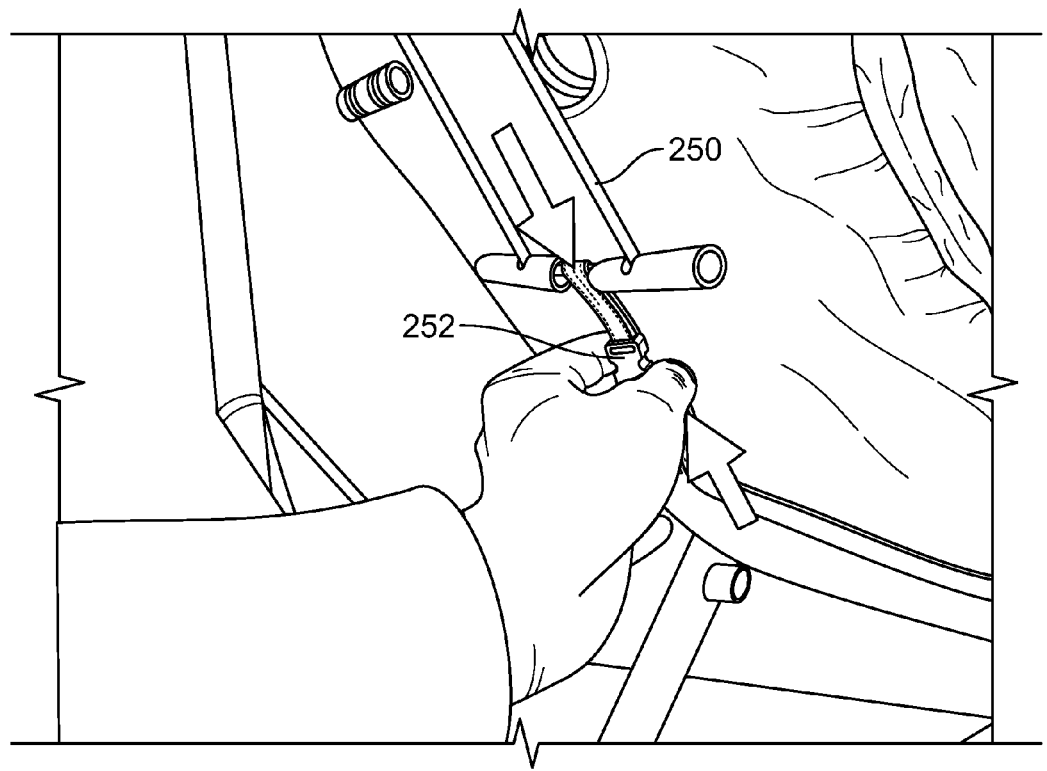

FIGS. 26-29 illustrate an example transitioning of the rear support 250 of the child support 200 between the retracted position and the extended position. An inward force applied to the buckle 252 (FIG. 26) disengages the male and female components of the buckle 252 and enables the rear support 250 to move. Applying an outward (e.g., pulling) force (in the direction of the arrow of FIG. 27) to the rear support 250 moves the rear support 250 from the second rear cavity 258 to the first rear cavity 256 once the applied outward force is sufficient to overcome the friction forces due to the rear neck 257 of the rear joint housing 254. When a sufficient outward force is applied, the rear support 250 transitions from the retracted position to the extended position (FIG. 27). Likewise, applying an inward (e.g., pushing) force (in the direction of the arrow of FIG. 28) to the rear support 250 moves the rear support 250 from the first rear cavity 256 to the second rear cavity 258 once the applied inward force is sufficient to overcome the friction forces due to the rear neck 257. When a sufficient inward force is applied, the rear support 250 transitions from the extended position to the retracted position (FIG. 28). The rear support 250 is locked in the retracted position by securing the male component and the female component of the buckle 252 (FIG. 29).

FIGS. 30-33 show the example child support frame 202 with an alternative example napper bar 271a, 271b and an alternative rear support 251. The rear support 251 is shaped differently, as shown in the figures and is coupled at two sides of the child support frame 202. Operation of the rear support 251 is similar as described above with the rear support 250 of the prior examples in that the rear support 251 extends and retracts to change the child support frame 202 between a recumbent and an upright position. In this example, the rear support 251 depends from rear support arms 249. To move the rear support 251 from the shown recumbent position to the upright position, the rear support 251 are pivoted about first pivots 253 to rotate the rear support 251 relative to the rear support arms 249. Additionally or alternatively, the rear support 251 and the rear support arms 249 are pivotable about second pivots 255 to rotate the rear support 251 and the rear support arms 249 relative to the child support frame 202.

Figure 30:
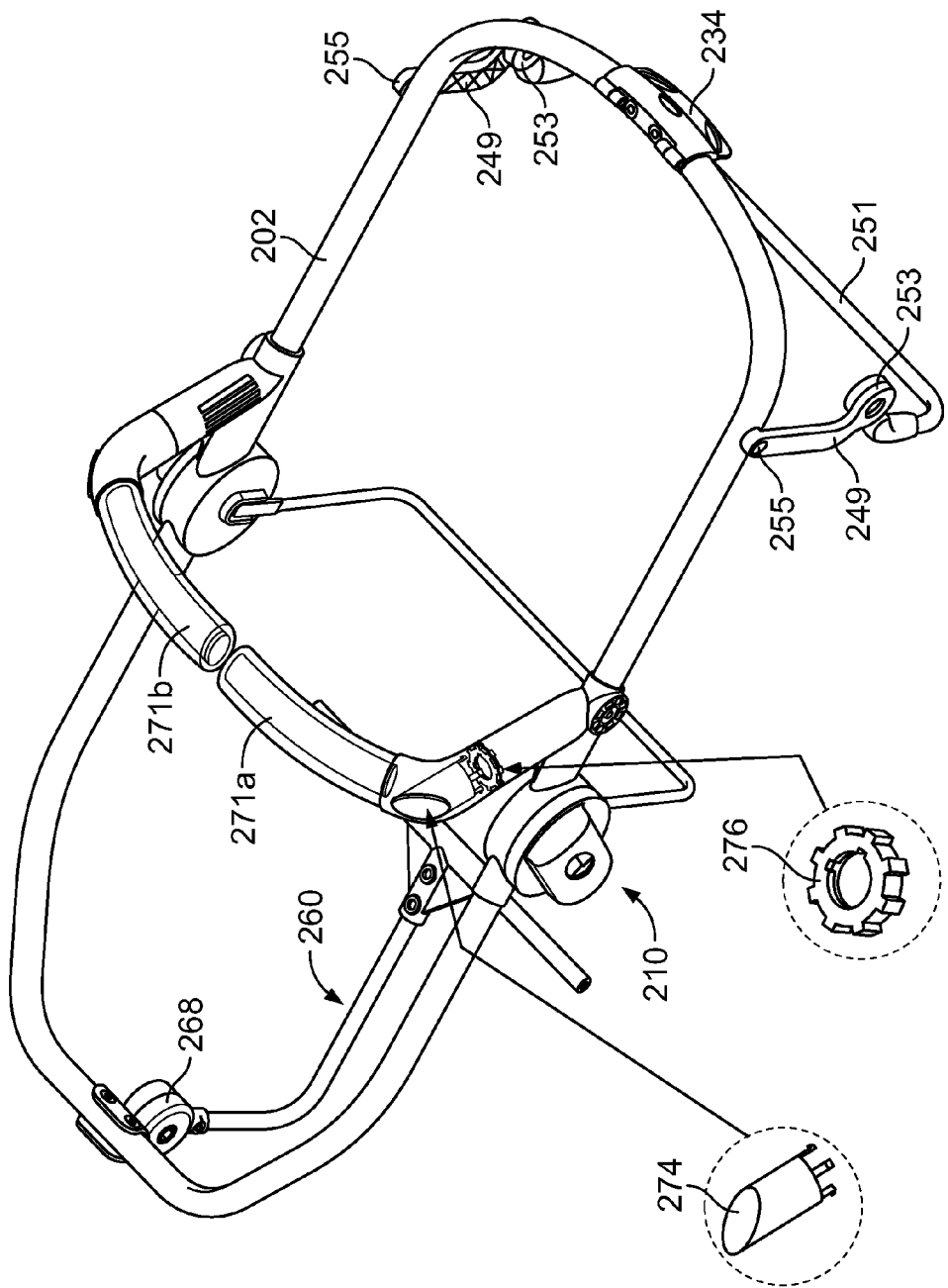
FIG. 30 is a perspective view of an alternative example child support frame with an example napper bar located in a first position.
Figure 31:
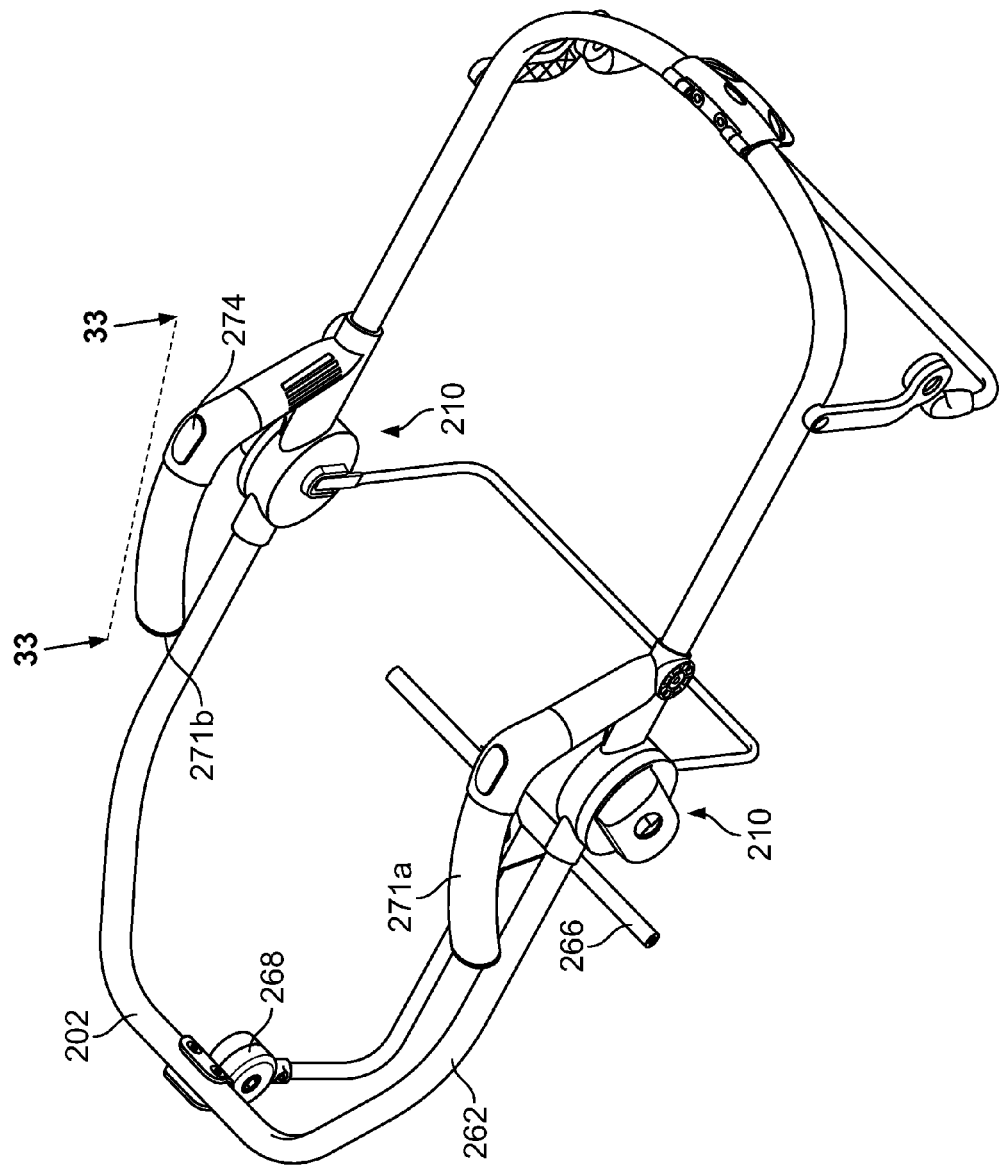
FIG. 31 is a perspective view of the example child support frame of FIG. 30 with the example napper bar in a second position.
Figure 33:
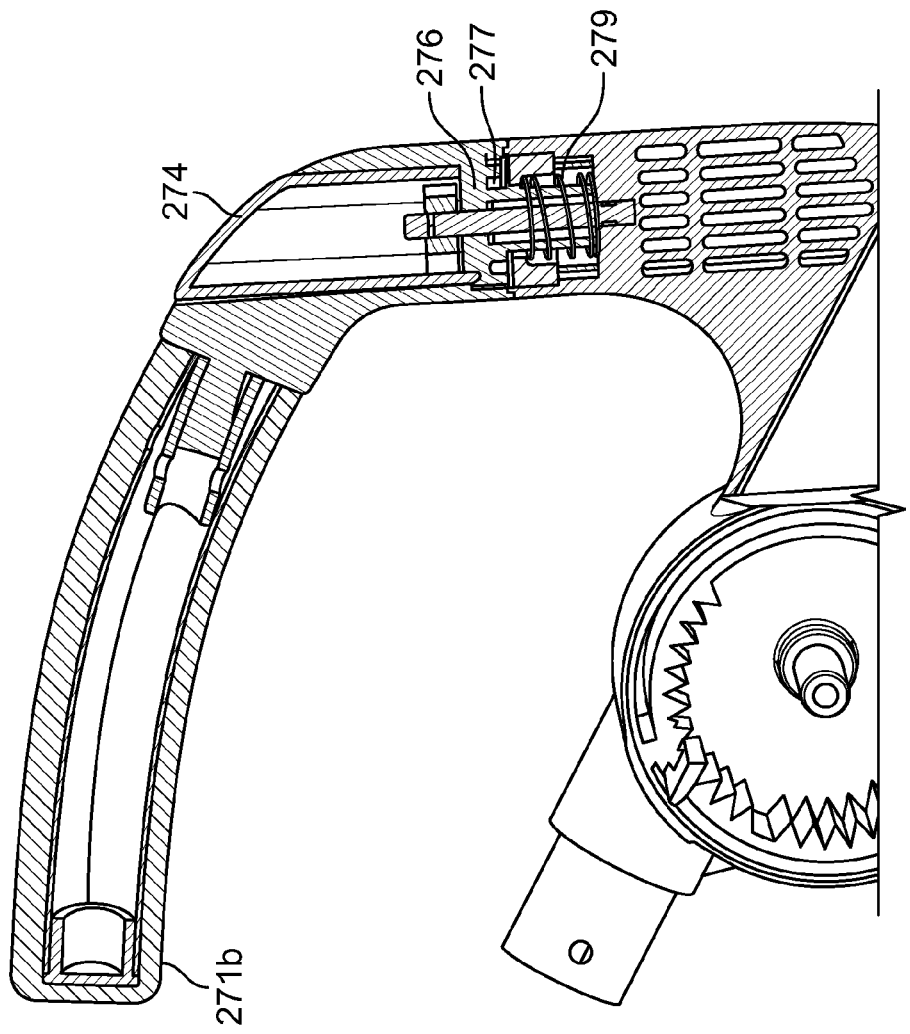
FIG. 33 is a cross-sectional view of the example napper bars of FIG. 30 taken along the line 33-33 of FIG. 31.
Figure 32:
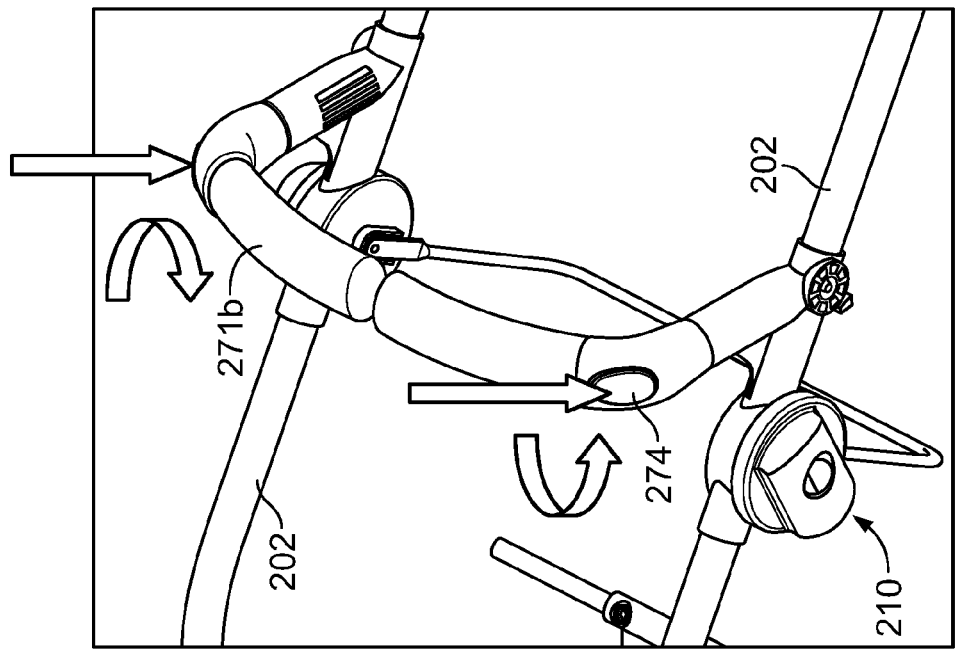
FIG. 32 shows an example release and rotation actuator of the example napper bars of FIG. 30.

FIG. 31 is a perspective view of the example child support frame 202 of FIG. 30 with the example napper bar 271a, 217b in a second position. FIG. 32 shows an example rotation of the napper bars 271a, 271b of FIG. 30. FIG. 33 is a cross-sectional view of the napper bars 271a, 271b of FIG. 30 taken along the line 33-33 of FIG. 31. As shown in FIGS. 30-33, the napper bar 271a, 271b includes two separate napper bar portions on each of the left and rights sides of the child support frame 202 that are not directly connected to each other across the middle opening of the child support frame 202. In this example, the first portion of the napper bar 271a and the second portion of the napper bar 271b are each pivotally coupled to the child support frame 202. The first portion of the napper bar 271a and the second portion of the napper bar 271b may be pivoted away from the center of the child support 200 and aligned with the child support frame 202 to facilitate access to the center of the child support 200 such as, for example, to place a child into or remove a child from the child support 200.

To pivot the first portion of the napper bar 271a and the second portion of the napper bar 271b, a spring-loaded button 274 is depressed (FIG. 32), which disengages a sprocket 276 from one or more engagement projections 277 (FIG. 33). When the sprocket 276 is disengaged, the sprocket 276 and the first portion of the napper bar 271a or the second portion of the napper bar 271b are rotatable. Release of the button 274 allows a spring 279 to bias the sprocket 276 back into engagement with the projections 277, which locks the first portion of the napper bar 271a or the second portion of the napper bar 271b in position.

Figure 34:
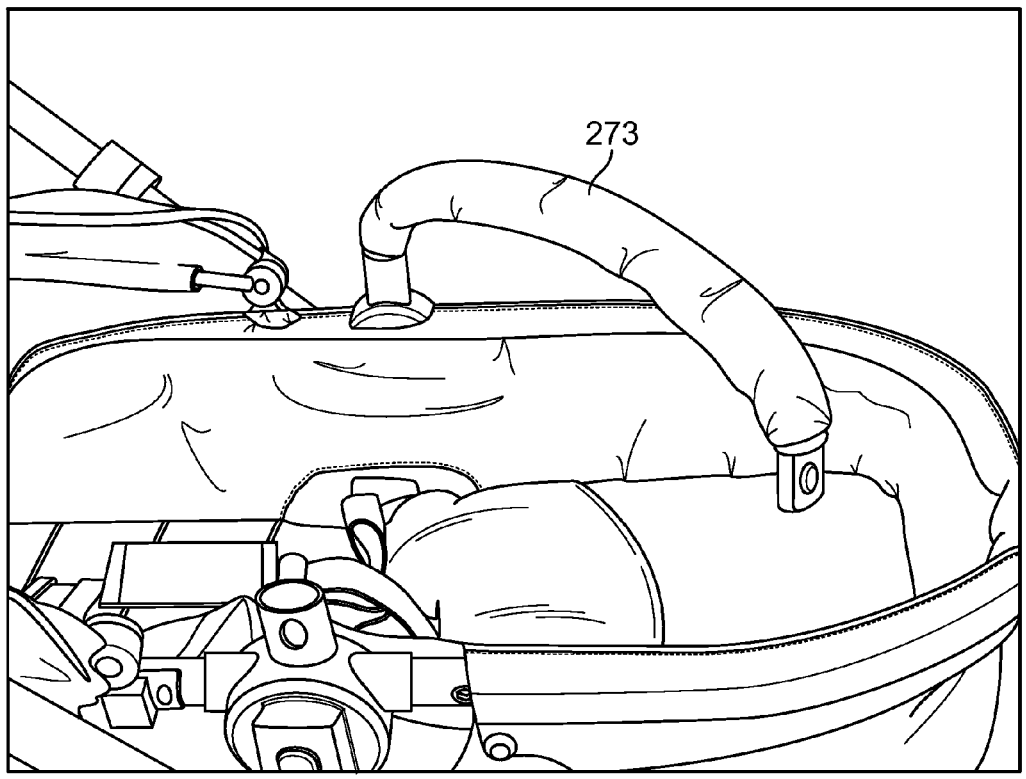
FIG. 34 shows an alternative example napper bar in a rotated position.

FIG. 34 shows an alternative napper bar 273 in a rotated position. In this example, the napper bar 273 is a single bar that is releasable at one end and rotatable about the other end. In some examples, both ends may be releasable and rotatable so that a parent or other user can rotate the napper bar 273 to either the left or the right or remove it from the child support frame 202.

Figure 36:
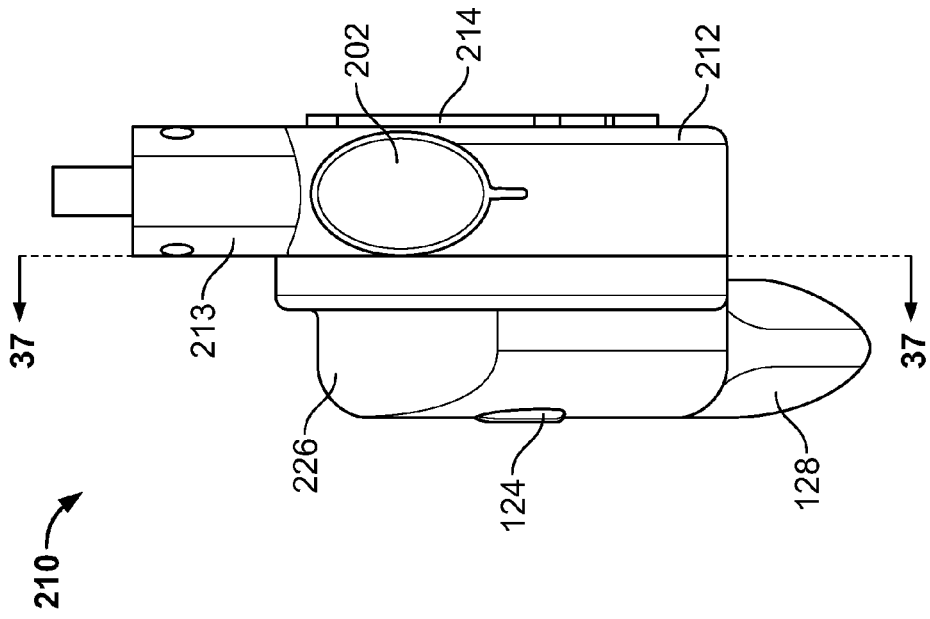
FIG. 36 is a front view of the example gear hub taken along line 36-36 of FIG. 35.
Figure 35:
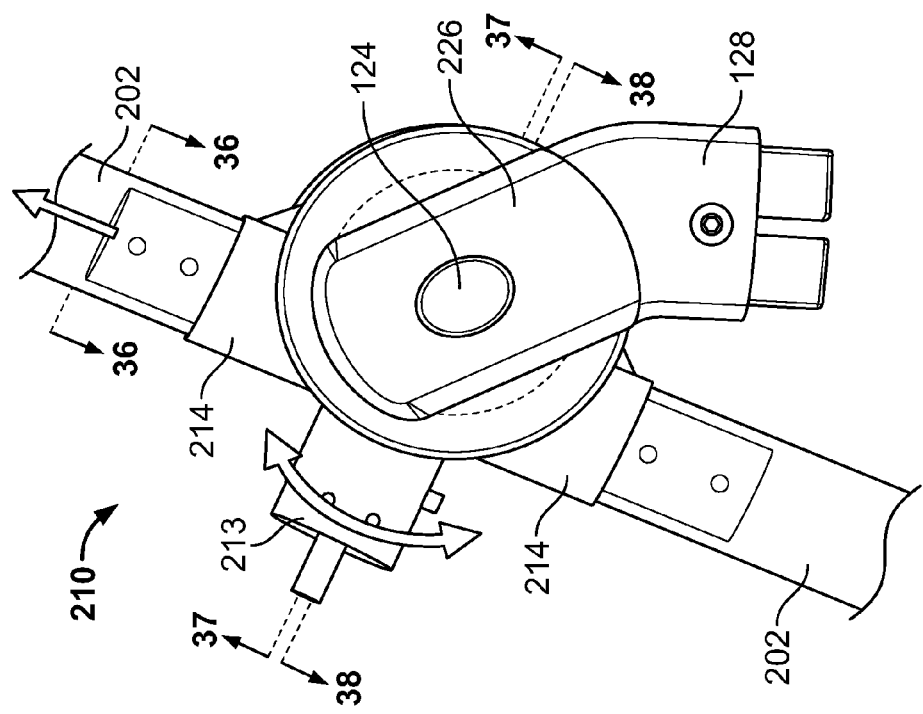
FIG. 35 is an enlarged side view of an example gear hub of the example child support frame taken along the line 35-35 of FIG. 1.
Figure 37:
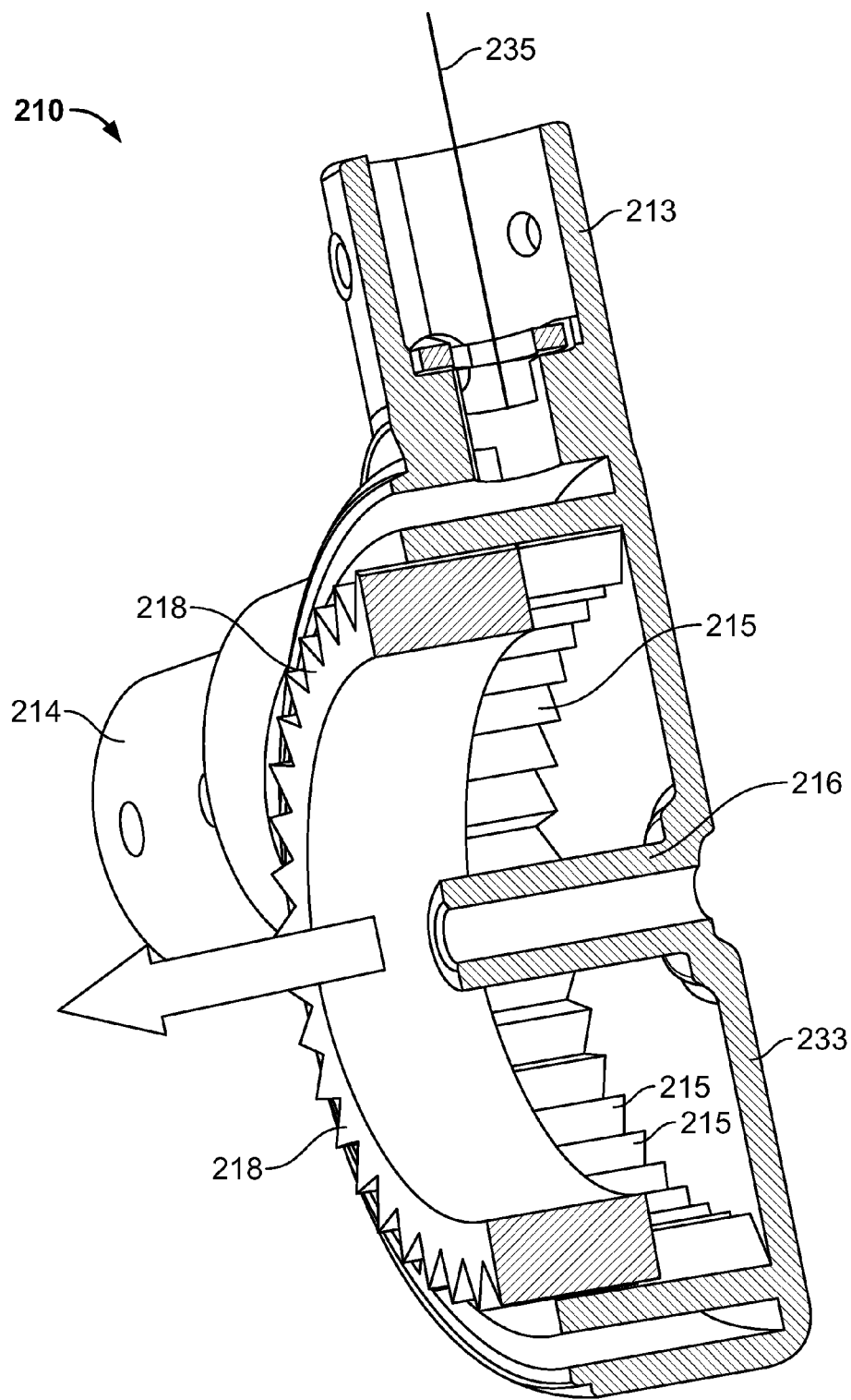
FIG. 37 is a cross-sectional view of the example gear hub of FIG. 35 taken along the line 37-37 of FIGS. 35 and 36.
Figure 38:
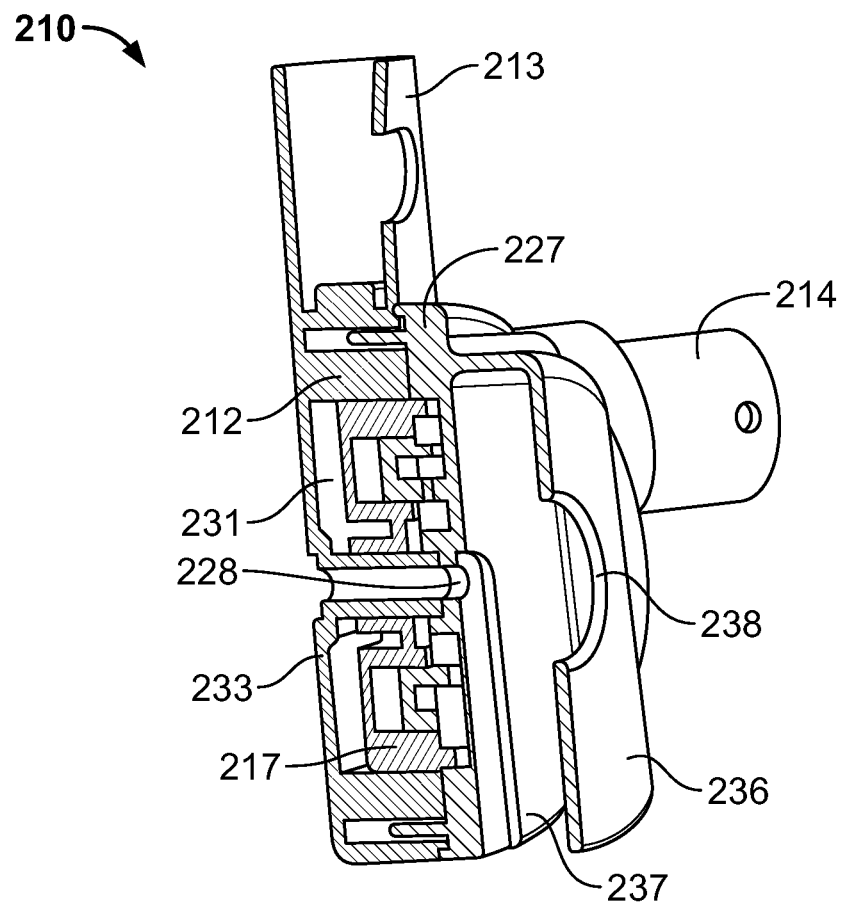
FIG. 38 is a cross-sectional view of the example gear hub of FIG. 35 taken along the 38-38 line of FIG. 35.
Figure 39A:
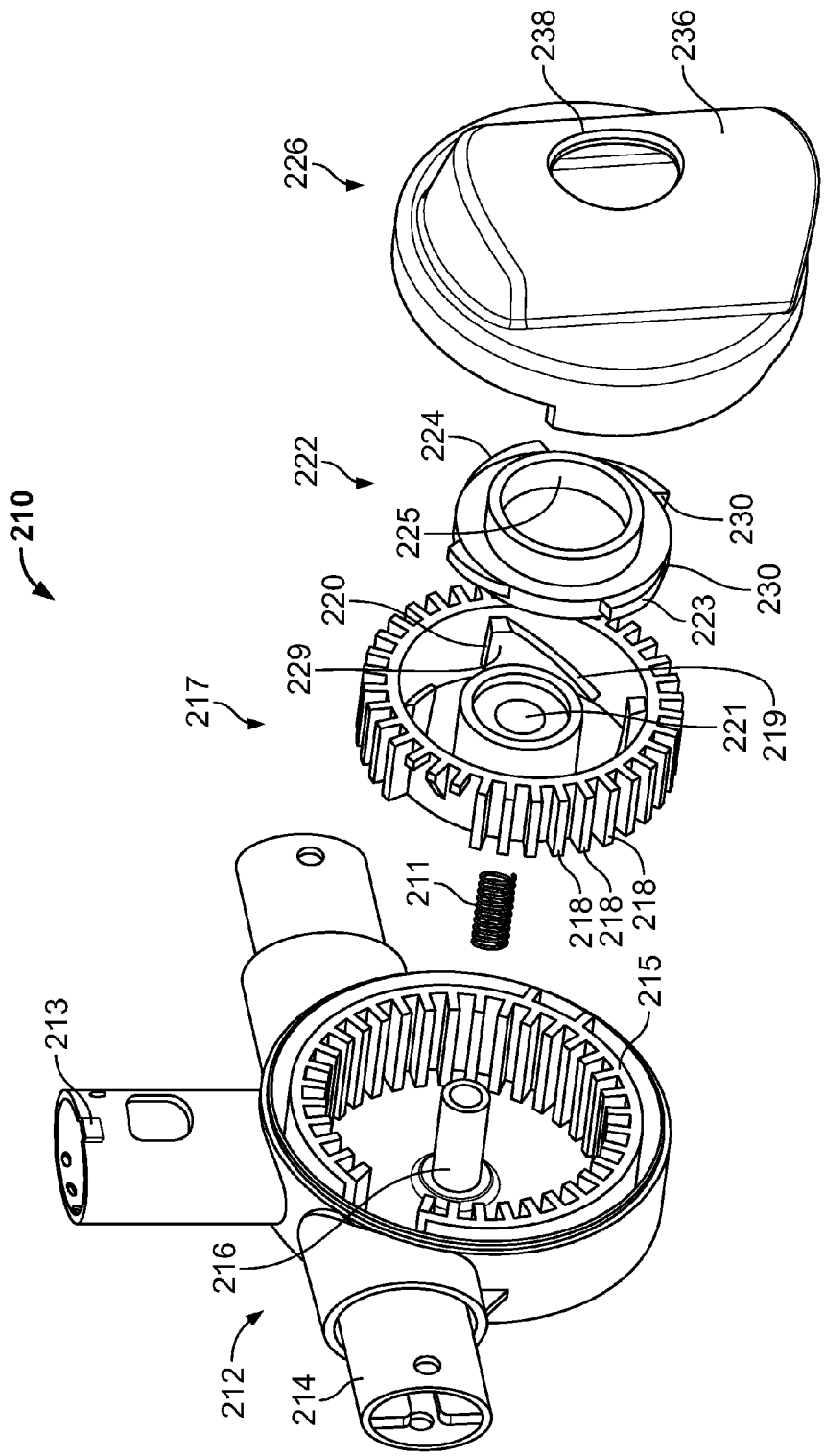
FIG. 39a is an exploded view of the example gear hub of FIG. 35.
Figure 39B:
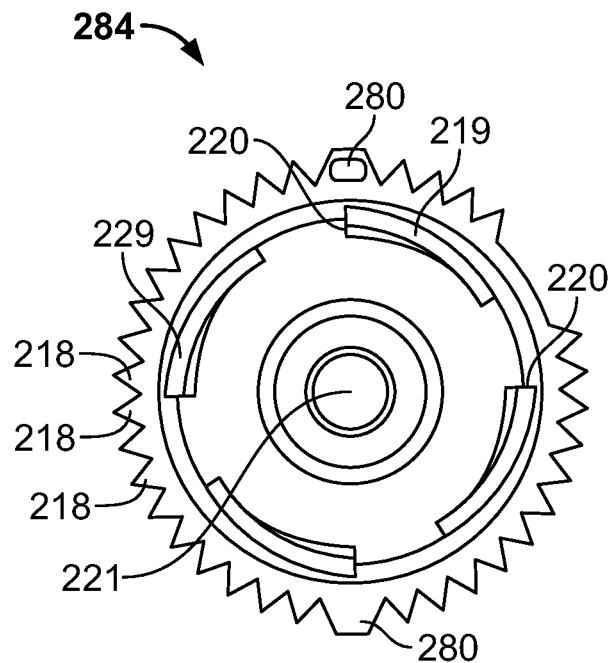
FIG. 39b is a plan view of a first example gear used in the example gear hub.

When coupled to the stroller frame 102, the example convertible child support 200 may be positioned in a plurality of incline angles relative to the stroller frame 102. The gear hub 210 houses the mechanisms that enable the reclining of the child support 200, as shown in FIGS. 35-39a, 39b. FIG. 35 is an enlarged side view of the example gear hub 210. FIG. 36 is a front view of the example gear hub 210 taken along the line 36-36 of FIG. 35. FIG. 37 is a cross-sectional view of the example gear hub 210 taken along the line 37-37 of FIGS. 35 and 36. FIG. 38 is a cross-sectional view of the example gear hub 210 taken along the line 38-38. FIG. 39a is an exploded view of the example gear hub 210 of FIG. 35. FIG. 39b shows an alternative example gear 284.

The example gear hub 210 includes an inner housing 212, a first gear 217, a second gear 222 and an outer housing 226. In the illustrated example, the inner housing 212 includes an inner housing receptor 213, inner housing arms 214, a plurality of inner housing teeth 215 and an inner housing axle 216. The napper bar 270 is coupled to the inner housing receptor 213. The inner housing arms 214 are coupled to the child support frame 202. The inner housing teeth 215 include a plurality of teeth arranged in a circular manner about a circumference of an inside edge of the inner housing 212. The teeth 215 define the angles of inclination of the child support 200 relative to the stroller frame 102. The inner housing axle 216 extends from an inner face of the inner housing 212. The inner housing axle 216 couples and aligns the components of the gear hub 210 (e.g., the inner housing 212, the first gear 217, the second gear 222 and the outer housing 226).

In the illustrated example, the first gear 217 includes a plurality of outer teeth 218 arranged in a circular manner about the outside edge of the first gear 217. The first gear 217 also includes example inner ramps 229. The inner ramps 229 are arranged along the inner edge of the first gear 217 and include a camming surface 219 and a locking surface 220. In the illustrated example, the camming surface 219 is angled at a first angle relative to the second gear 222 and the locking surface 220 is angled at a second angle relative to the second gear 222. In some examples, the first angle is less than the second angle and the second angle is substantially parallel to the outer teeth 218. In addition, the example first gear 217 includes an example first gear center aperture 221 through which the inner housing axle 216 passes to align the first gear 217 and the inner housing 212.

In the illustrated example, the second gear 222 includes example complementary ramps 230 that include a complementary camming surface 223 at a first angle relative to the first gear 217 and a complementary locking surface 224 angled at a second angle and substantially parallel to the locking surface 220. The second gear 222 also includes a second gear center aperture 225 through which the inner housing axle 216 passes to align the second gear 222 with the first gear 217 and the inner housing 212.

In the illustrated example, the outer housing 226 includes example outer housing teeth 227 (FIG. 38). The outer housing teeth 227 are positioned along the inside surface of the outer housing 226 in a circular pattern. The outer housing teeth 227 engage the outer teeth 218 of the first gear 217 as described in more detail below. The outer housing 226 also includes an outer housing center aperture 228 (FIG. 38) that is mechanically coupled to a distal end of the inner housing axle 216, opposite the inner housing 212 via any suitable fastener. For example, a rivet may pass through the outer housing center aperture 228 to the inner housing 212. As a result, the inner housing 212 is coupled to the outer housing 226.

Figure 40:
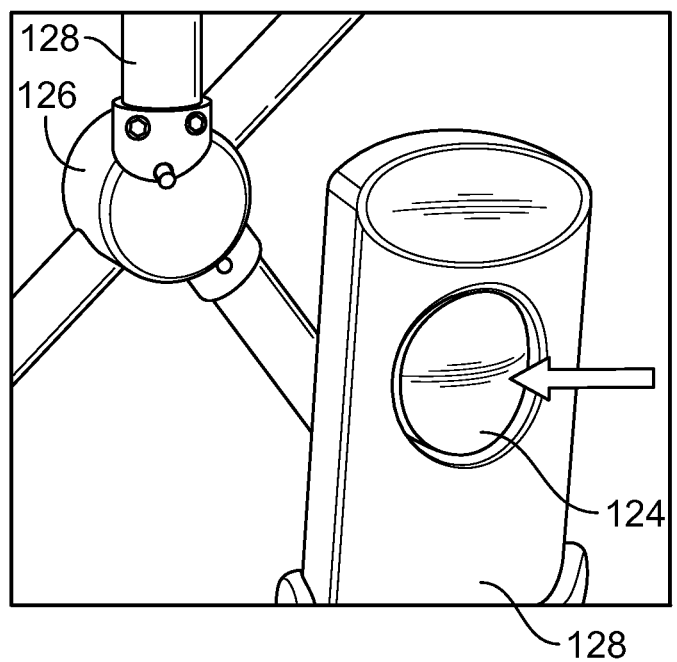
FIG. 40 is an enlarged view of an example release arm to which the example gear hub of FIG. 35 may be coupled.
Figure 41:
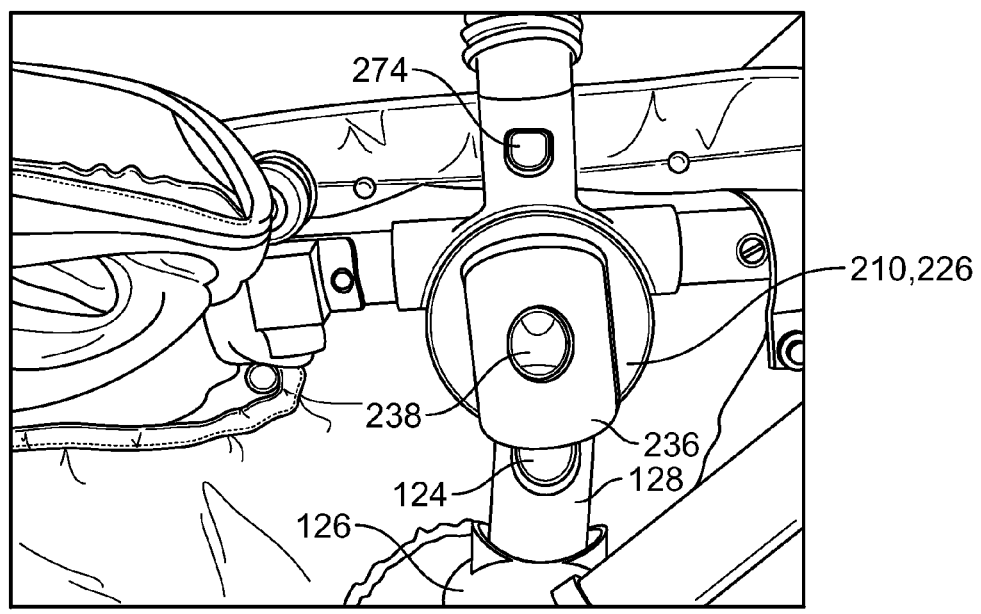
FIG. 41 shows the example release arm of FIG. 40 as the gear hub is being coupled thereto.

The outer housing 226 includes a stroller receptor 236, which is an extension that couples the gear hub 210 to the stroller frame 102 via, for example, release arms 128 (FIGS. 40, 41). The stroller receptor 236 includes an example release arm aperture 237 to receive a release arm 128 when the child support frame 202 is coupled to the stroller frame 102. The stroller receptor 236 also includes an example release button aperture 238 to receive a release button 124 (FIGS. 35 and 40) coupled to the release arm 128 when the child support frame 202 is coupled to the stroller frame 102, as described herein.

In the illustrated example, the first gear 217 is movably positioned within the gear hub 210. When the first gear 217 is in a locked position, as shown in FIG. 38, there is a first cavity 231 between the first gear 217 and an end wall 233 of the inner housing 212. Additionally, in the locked position, the first gear teeth 218 engage the inner housing teeth 215 and the outer housing teeth 227, which lock the convertible child support 200 against rotation in any direction. In some examples, a spring 211 is positioned between the end wall 233 of the inner housing 212 and the first gear 217 to urge the first gear 217 into locking engagement with the second gear 222 and the outer housing teeth 227. When the first gear 217 engages the second gear 222 (e.g., the gear hub 210 is in a locked position), the inner ramps 229 engage the complementary ramps 230. The first gear 217 and the second gear 222 may include any number of ramps 229 and 230 of any suitable size. The number and the size of the teeth and/or ridges 215, 218 and 227 correspond to a number of discrete locked positions of the convertible child support 200.

FIG. 39b illustrates an alternative example first gear 284 that may be used in the gear hub 210. In the example, the first gear 284 includes first gear teeth 218 and a plurality of positioning teeth 280 positioned around the outer circumference of the first gear 284. The positioning teeth 280 align with positioning ridges in the inner housing 212 and the outer housing 226. As a result, the convertible child support 200 may be locked at incline angles corresponding to the discrete positions of the positioning teeth 280 and the corresponding positioning gaps. In the illustrated example, the positioning teeth 280 are of a different size than the first gear teeth 218. For example, the positioning teeth 280 are relatively wider. In addition, there are two positioning teeth 280 shown in FIG. 39b. In other examples, there may be other suitable numbers of positioning teeth such as, for example, three, four, etc.

When the first gear 217 and the second gear 222 are in the locked position, the locking surface 220 and the complementary locking surface 224 engage to prevent the first gear 217 from rotating relative to the second gear 222. Additionally, adjusting the incline angle of the child support 200 is prevented because the first gear teeth 218 are engaged with the inner housing teeth 217 and the outer housing teeth 227. To release the gears to enable adjustment of the child support 200, there is a release latch 234 (FIGS. 6 and 17) disposed on the child support frame 202 that is operably coupled to the gear hub 210 in such a way that activating (e.g. via a pulling force) the release latch 234 applies a force to the second gear 222 via the perimeter cable 235 (FIG. 37) to cause the second gear 222 to rotate. As the second gear 222 rotates, the complementary camming surface 223 slides along the first gear camming surface 219 of the first gear 217. This creates a force between the first and second gears 217 and 222 that attempts to push the first and second gears 217 and 222 apart. However, as the second gear 222 is coupled to the perimeter cable 235, the second gear 222 is prevented from translationally moving along the inner housing axle 216. As a result, the second gear complementary ramps 230 cause the first gear 217 to translate along the inner housing axle 216, compress the spring 211 disposed in the first cavity 231 and recede into the first cavity 231.

When the first gear 217 recedes into the first cavity 231, the first gear teeth 218 no longer engage the outer housing teeth 227. As a result, while the caregiver is pulling the release latch 234, the caregiver is able to rotate the convertible child support 200 into a desired position relative to the stroller frame 102.

When the release latch 234 is released (e.g., is no longer being pulled), the first and second gear ramps 229 and 230 slide along the camming surface 219 and the complementary camming surface 223, respectively, until the first gear locking surface 220 and the complementary locking surface 224, respectively, engage each other. As a result, the spring 211 disposed in the first cavity 231 translationally moves the first gear 217 along the inner housing axle 216, which causes the first gear teeth 218 to engage the outer housing teeth 227 and, thereby, lock the convertible child support 200 against rotation.

FIGS. 40 and 41 illustrate removing the convertible child support 200 from the stroller frame 102. Extending from the folding joints 126 are example release arms 128 (FIGS. 40 and 41). The release arm 128 includes an example spring-loaded release button 124, which may be actuated (or depressed) inward towards the center of the convertible child support 200. In the example, the release button 124 includes an angled surface. In the illustrated example, to remove the convertible child support 200 from the stroller frame 102, both release buttons 124 are actuated. Actuating the spring-loaded release button 124 compresses a spring, which causes the release button 124 to recede into the release arm 128. As a result, the convertible child support 200 can be slidably removed from the stroller frame 102. Once the release button 124 is released, the spring pushes the release button 124 out of the release arm 128. In some examples, the release button 124 remains in the receded position until the convertible child support 200 is reattached to the stroller frame 102.

In some examples, reattaching the convertible child support 200 to the stroller frame 102 includes positioning the convertible child support 200 atop the release arm 128. The outer housing receptor 236 guides the release arm 128 into position so that the release button 124 aligns with the release button aperture 238 and locks the convertible child support 200 to the stroller frame 102. In examples in which the release button 124 has an angled surface, the bottom of the stroller receptor 236 engages the angled surface of the release button 124 and moves the release button 124 inward as the convertible child support 200 is lowered onto the release arms 128. In examples in which the release button 124 remains in the receded position, the stroller receptor 236 engages the receded release button 124 when lowered onto the release arms 128. Once the release button 128 is engaged, the spring pushes the release button 124 out of the release arm 128. This enables the caregiver to secure the convertible child support 200 on the stroller frame 102 without need to use a separate hand to actuate the release button 124.

Figure 43:
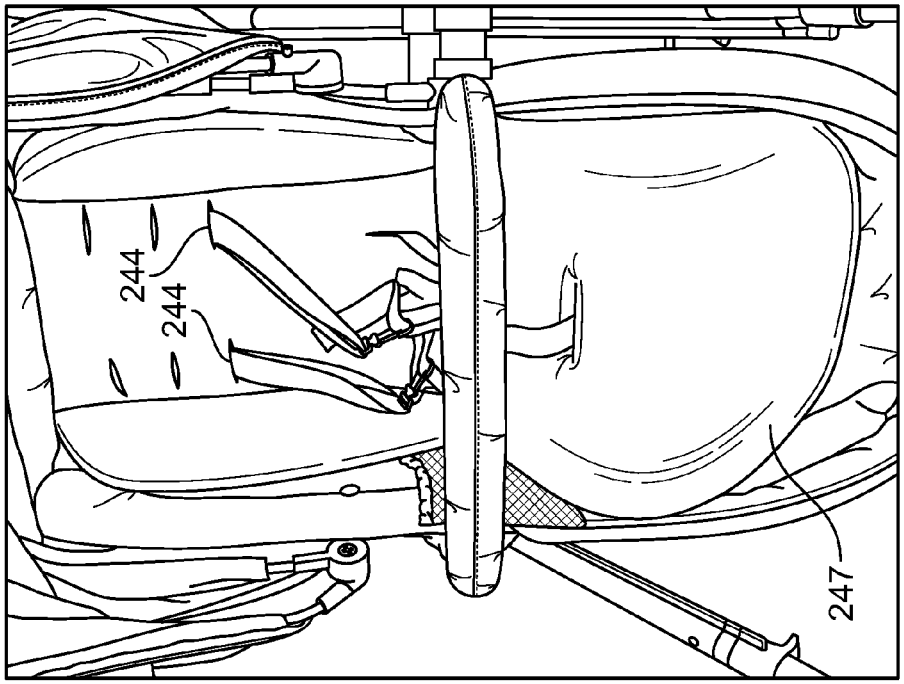
FIG. 43 is a view similar to FIG. 42, but showing the child support in the upright or seat forming position.
Figure 42:
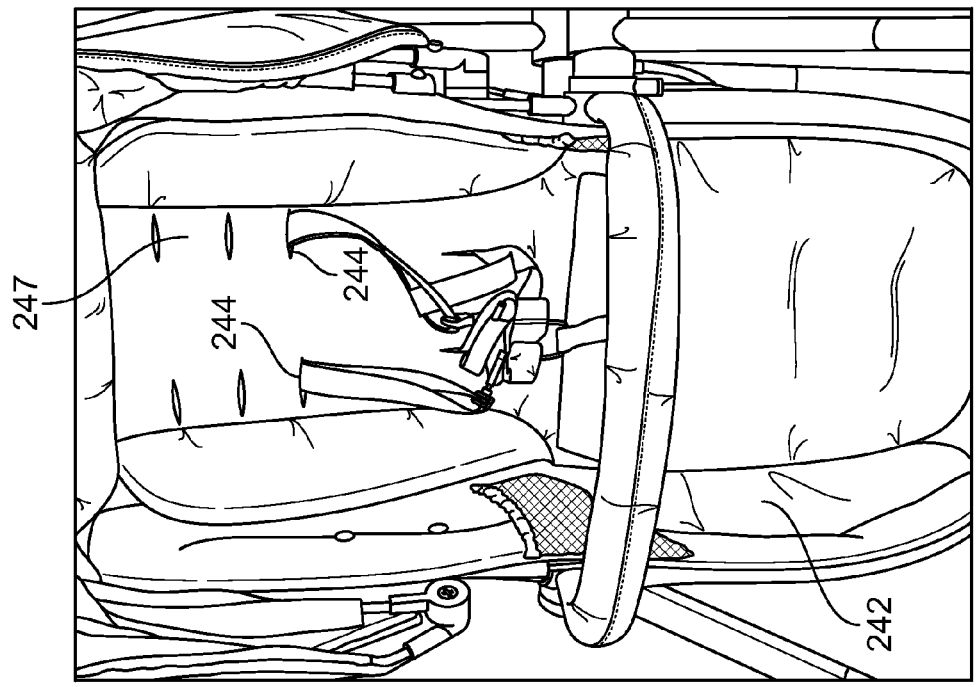
FIG. 42 is a top view of the example child support of the example stroller of FIG. 7 shown in the recumbent position.
Figure 44:
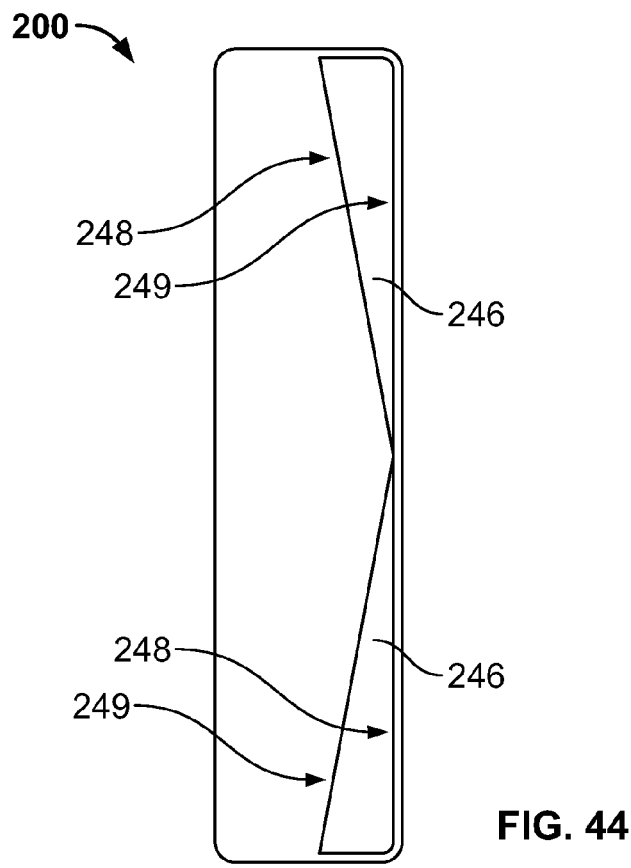
FIG. 44 is a cross-sectional view of an example pivotable cushion.
Figure 45:
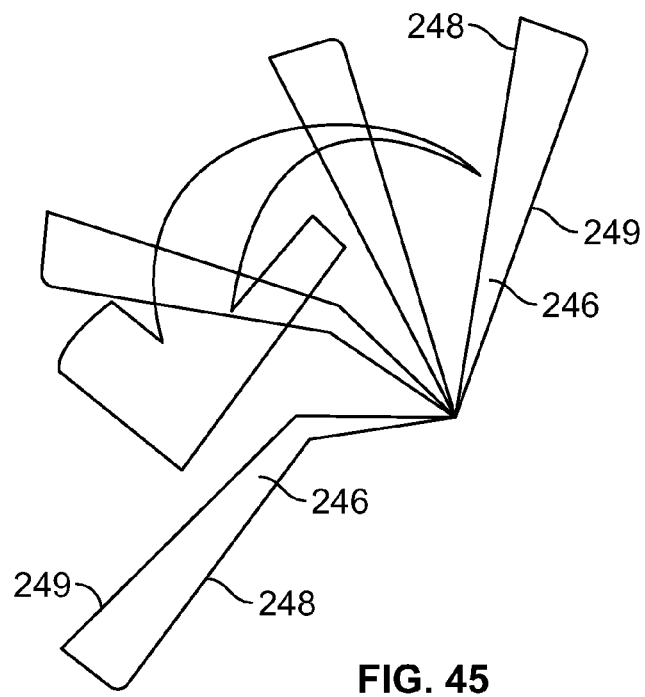
FIG. 45 is a schematic view of the example pivotable cushion of FIG. 44 in a plurality of positions.
Figure 48:
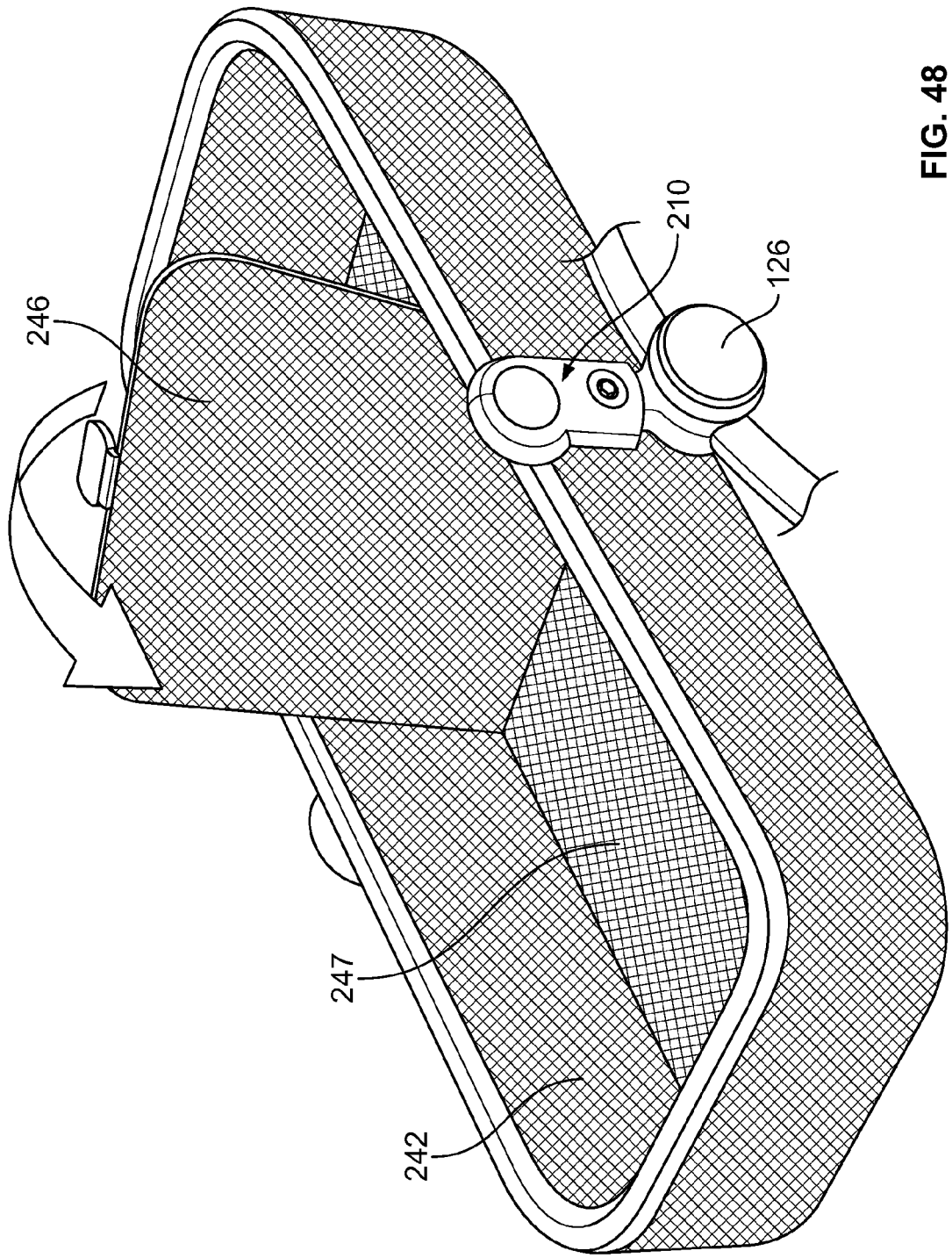
FIG. 48 is a front, side perspective view of another example convertible child support and pivotable cushion.

FIGS. 42 and 43 illustrate top views of the convertible child support 200. Extending along the perimeter of the convertible child support 200 is a sidewall 242. In some examples, the sidewall 242 is permanently affixed to the child support frame 202, and in other examples, the sidewall 242 is removably coupled to the child support frame 202 by, for example, releasable fasteners such as snap buttons. The sidewall 242 is coupled to an example support liner 240 (FIGS. 23 and 25) to form the bottom of the convertible child support 200, as shown in the illustrated examples. In some examples, the sidewall 242 extends to form the bottom of the convertible child support 200. The sidewall 242 and the support liner 240 may be made of a fabric, flexible plastic, a mesh, or any other flexible and breathable material or combination thereof.

Disposed on the support liner 240 is a convertible cushion 247. In some examples, the support liner 240 and the convertible cushion 247 are in an extended or recumbent position as shown in FIG. 42. This is the flat, near-flat or reclined position described above in which the front support 260 and the rear support 250 are releasably secured in the respective extended positions. In other examples, the support liner 240 and the convertible cushion 247 are in an upright or seat forming position as shown in FIG. 43. In the upright position, the front support 260 is releasably secured in the retracted position such that the foot 266 of the front support 260 is moved upward toward the child support frame 202 and forms a cross-bar to support the underside of a child's knees (the underside of the knee-supporting structure of FIG. 43 is shown in FIG. 23).

FIGS. 44-48 illustrate the convertible cushion 247 including an example pivotal cushion 246. The pivotable cushion 246, in the illustrated example, is a wedge-shaped cushion that is pivotably coupled to the convertible cushion 247. In the illustrated example, the pivotable cushion 246 pivots near the middle of the convertible child support 200. The pivotable cushion 246 is movable between two positions. The two positions are shown in FIGS. 44, 46a, 46b, 47a and 47b, and movement between these positions in shown in FIGS. 45 and 48. In a first position, the pivotable cushion 246 covers the top half of the convertible cushion 247 (FIGS. 46a and 46b). In the first position, a head of a child occupant would rest on the pivotable cushion 246. The first position would be used with the child support 200 in the recumbent or laying down position disclosed above. In addition, in the first position, the pivotable cushion 246 would cover a harness 244 that may be used to secure a child in the upright position. In the recumbent position, the harness 244 is covered to prevent the child from becoming entangled in the harness 244 while sleeping. In addition, in the first position, a first surface 248 of the pivotable cushion 246 is exposed. In the illustrated example, the first surface 248 is a soft surface that supports the head of the child and provides comfort for the child.

The pivotable cushion 246 is also rotatable into a second position in which the pivotable cushion 246 covers a bottom portion of the convertible cushion 247 (FIGS. 47a and 47b). In the second position, feet of the child occupant would rest on the pivotable cushion 246. The second position would be used with the child support 200 in the upright position disclosed above. In addition, in the second position, the pivotable cushion 246 is positioned such that the harness 244 is exposed and may be used to secure a child in the upright position. In addition, in the second position, a second surface 249 of the pivotable cushion 246 is exposed. In the illustrated example, the second surface 249 includes a coarse material that provides durability from contact with the feet and shoes of the child.

Figure 49:
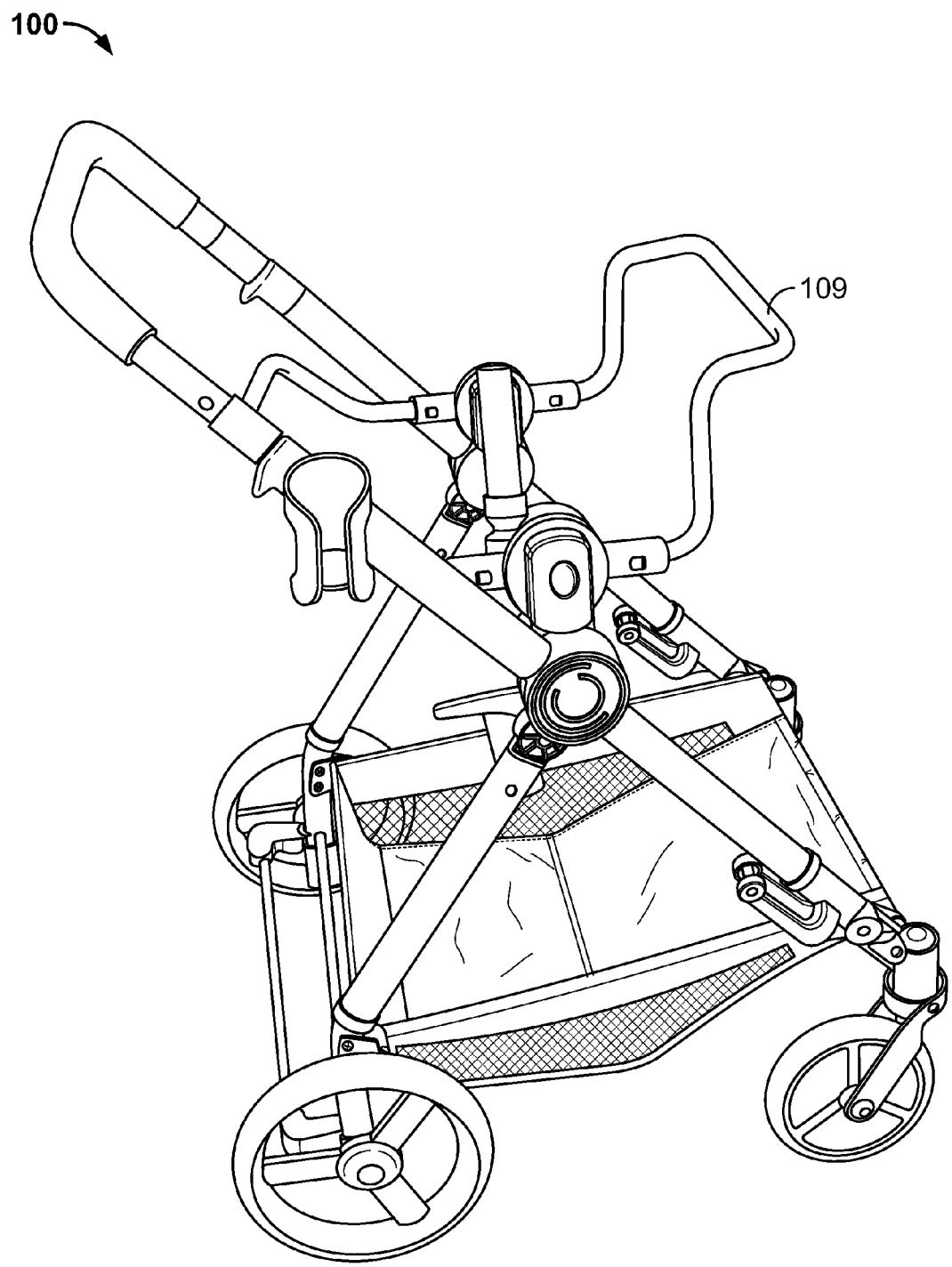
FIGS. 49 and 50 are perspective views of the example stroller of FIG. 1 with alternative example accessories.
Figure 50:
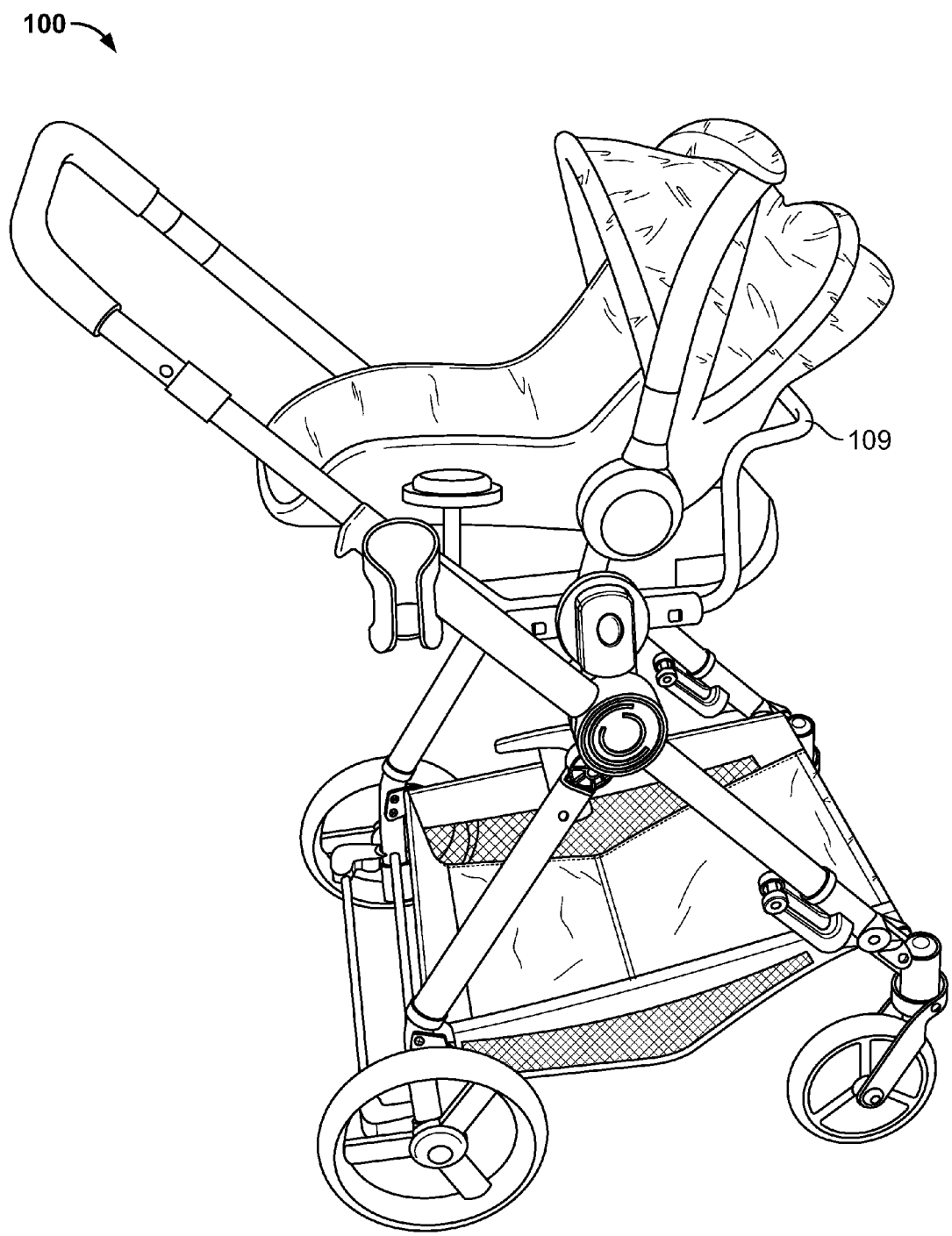

FIGS. 49 and 50 show perspective views of the example stroller frame 102 of FIG. 1 with alternative example accessories. Thus, the example stroller frame 102 disclosed herein is also usable with other child care accessories including, for example, a universal car seat adapter 109 (FIG. 49) that can support a car seat (FIG. 50). The car seat adapter 109 enables different types of seats or child supports to be securely used with the stroller and child support assembly 100.

Figure 51:
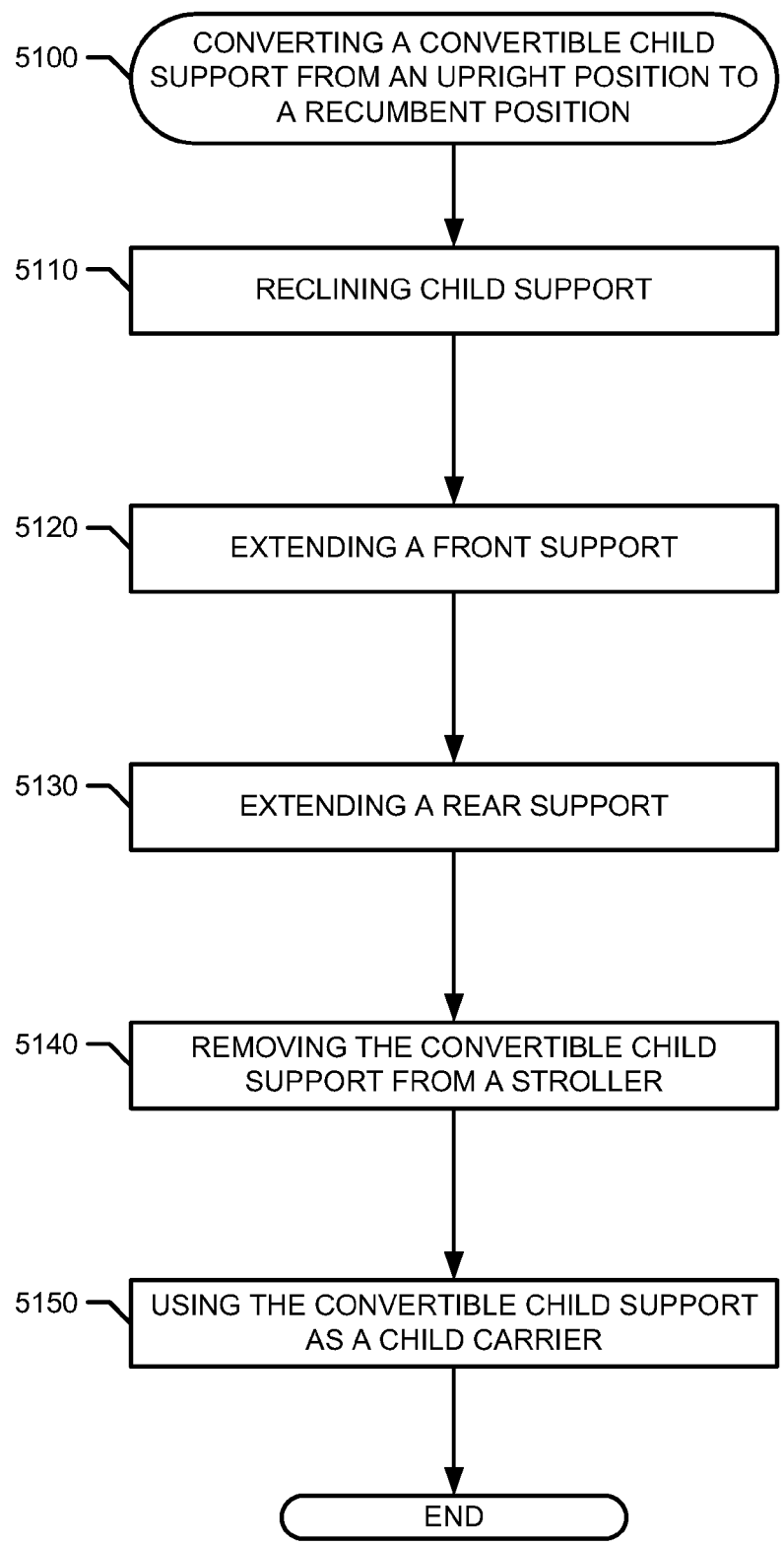
FIG. 51 is a flowchart representative of an example method of transitioning a convertible child support from the upright or seat forming position in a stroller to the recumbent position as a child carrier.

FIG. 51 is a flowchart representative of an example method 5100 of converting an example convertible child support 200 from the upright or seat forming position (FIG. 1) coupled to the stroller frame 102 to the recumbent position as a child carrier and/or carry cot (FIG. 18). Although the example method of transitioning is described with reference to the flowchart illustrated in FIG. 51, many other methods of converting the example convertible child support 200 may alternatively be used. For example, the order of execution of the blocks may be changed and/or some of the blocks described may be changed, eliminated or combined.

The example method 5100 of converting a convertible child support from an upright position (e.g., the convertible child support 200 of FIG. 1) to a recumbent position (e.g., FIG. 3) includes reclining the child support (block 5110). For example, as described in connection to the gear hub 210, the convertible child support 200 may be locked in a plurality of incline angles or positions. Adjusting the angle of incline of the convertible child support 200 includes applying a downward force to the convertible child support frame 202 while pulling on the release latch 234. When the convertible child support 200 is in the recumbent position, the release latch 234 is released and the components of the gear hub 210 prevent the convertible child support 200 from rotation.

The example method 5100 of FIG. 51 also includes extending a front support (block 5120). For example, extending the front support 260 includes disengaging the locking bar 294 (FIGS. 19 and 20). In some examples, disengaging the locking bar 294 includes applying an inward force to the upper tab 264 and the lower tab 265 to slide the upper tab 264 in the direction of the lower tab 265 (FIG. 22). When the locking bar 294 is disengaged, the front support 260 is pivotable about the pin 295 from the retracted position and locks in the extended position when the locking bar 294 clears the stop 269 (FIG. 21). When the front support 260 is locked in the extended position, the front support 260 forms a first contact surface for the convertible child support 200 to be used as a child carrier and/or carry cot (FIG. 18).

The example method 5100 of FIG. 51 also includes extending a rear support (block 5130). For example, extending the rear support 250 from the retracted position to the extended position includes disengaging the buckle 252 (FIG. 26). When the buckle 252 is disengaged (e.g., the male component of the buckle is released from the female component of the buckle), a force applied to the rear support 250 transitions the rear support 250 into the extended position (FIG. 27). In some examples, a pulling force is applied to the foot 266 until the rear support 250 moves from the second rear cavity 258 to the first rear cavity 256. In some examples, locking the rear support 250 in the extended portion forms a second contact surface for the convertible child support 200 to be used as a child carrier and/or carry cot (FIG. 18).

The example method 5100 of FIG. 51 also includes removing the convertible child support from a stroller (block 5140). For example, removing the convertible child support 200 includes actuating the spring-loaded release button 124 (FIG. 40). Actuating the release button 124 causes the release button 124 to compress the spring receding the release button 124 into the release arm 128. As a result, the path of the stroller receptor 236 is unobstructed and the convertible child support 200 is slidably removed from the stroller frame 102 (FIG. 41). Additionally, the release button 124 can be released, which causes the spring to extend the release button 124 out of the release arm 128 (FIG. 40).

The example method 5100 of FIG. 51 also includes using the removed convertible child support as a child carrier and/or carry cot (block 5150). For example, when the convertible child support 200 is adjusted to the recumbent position, a backrest support is provided for the child by the convertible cushion 247. Additionally, extending the front support 260 and the rear support 250 provide a stable and rigid support to the convertible child support 200 (FIG. 18). As a result, the convertible child support 200 is usable as a child carrier and/or carry cot that can be rested on a surface independent from the stroller frame 102.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A stroller and child support assembly comprising:
   a stroller frame including a front support, a rear support, and a handle;
   a front wheel coupled to the front support;
   a rear wheel coupled to the rear support;
   a first joint disposed on a first side of the stroller frame;
   a second joint disposed on a second side of the stroller frame; and
   a child support including:
      a first connector releasably coupled to the first joint, the first connector including a first housing and a second housing;
      a second connector releasably coupled to the second joint, the second connector including a third housing and a fourth housing, wherein the first housing is rotatably coupled to the second housing and the third housing is rotatably coupled to the fourth housing to rotate the child support between an upright position and a recumbent position
      a first support pivotably coupled to the child support; and
      a second support pivotably coupled to the child support, the first support and the second support respectively moveable between an extended position and a retracted position such that in the respective extended positions, a child occupant may be supported in the recumbent position by the first support and the second support, the child support being removable from the frame and independently usable as a child carrier.

2. The stroller and child support assembly of claim 1, wherein the first connector includes an aperture and the first joint includes a release button to engage the aperture to selectively couple the child support to the stroller frame.

3. The stroller and child support assembly of claim 2, wherein the release button has an angled surface and the first connector is to engage the angled surface to depress the release button as the child support is coupled to the stroller frame.

4. The stroller and child support assembly of claim 1, wherein the first support is in the extended position when the child support is usable as a child carrier.

5. The stroller and child support assembly of claim 1, wherein in the respective extended positions, the first support and the second support intersect a transverse plane relative to a perimeter rail of the child support.

6. The stroller and child support assembly of claim 1, further including a third support, the third support disposed between the first support and the second support, a first end of the third support coupled to the first joint and a second end of the third support coupled to the second joint, and the first support, the second support, and third support oriented in substantially the same direction relative to a perimeter rail of the child support.

7. A stroller and child support assembly comprising:
   a stroller frame including a front support, a rear support, and a handle;
   a front wheel coupled to the front support;
   a rear wheel coupled to the rear support;
   a first joint disposed on a first side of the stroller frame;
   a second joint disposed on a second side of the stroller frame; and
   a child support including:
      a first connector releasably coupled to the first joint;
      a second connector releasably coupled to the second joint;
      a perimeter rail;
      a first support pivotably coupled to the perimeter rail; and
      a second support pivotably coupled to the child support, the first support and the second support respectively moveable between an extended position and a retracted position such that in the respective extended positions, a child occupant may be supported in a recumbent position by the first support and the second support, the child support being removable from the frame and independently usable as a child carrier.

8. The stroller and child support assembly of claim 7, wherein the first support is in the extended position when the child support is usable as a child carrier.

9. The stroller and child support assembly of claim 7, wherein when the first support is in the retracted position, the first support is substantially aligned with the perimeter rail when the child support is in an upright position.

10. The stroller and child support assembly of claim 9, wherein the first support is to form a backrest support.

11. The stroller and child support assembly of claim 7, wherein the child support includes a napper bar that is rotatably coupled to the child support.

12. The stroller and child support assembly of claim 11, wherein the napper bar is bifurcated into a first handle and a second handle, wherein the first handle and the second handle are independently rotatable.

13. The stroller and child support assembly of claim 7, wherein the child support includes a cushion that is pivotable between a first position and a second position.

14. The stroller and child support assembly of claim 13, wherein the cushion is to pivot to the first position when the child support is in an upright position to expose a first side of the cushion, the first side having a coarse surface.

15. The stroller and child support assembly of claim 13, wherein the cushion is to pivot to the second position when the child support is in the recumbent position to expose a second side of the cushion, the second side having a soft surface.

16. The stroller and child support assembly of claim 13, wherein the cushion is wedge shaped.

17. The stroller and child support assembly of claim 13, further including a harness to secure a child occupant, wherein the harness is exposed when the cushion is in the first position and the harness is hidden when the cushion is in the second position.

18. The stroller and support assembly of claim 7, wherein a first end of the first support is to couple to a first side of the perimeter rail and a second end of the first support is to couple to a second side of the perimeter rail opposite the first side.

19. The stroller and support assembly of claim 7, wherein the first support is coupled to the perimeter rail via a joint housing.

20. The stroller and support assembly of claim 7, wherein the second support is coupled to the perimeter rail opposite the first support.

21. The stroller and support assembly of claim 20, wherein in the retracted position, the second support is to form a knee support and in the extended position, the second support is to support the child support on a surface when the child support is usable as a child carrier.

22. The stroller and support assembly of claim 21, further including a locking bar slidably coupled to the second support, wherein the locking bar is to slide between a first position and a second position when the second support moves between the extended position and the retracted position.

23. The stroller and child assembly of claim 22, wherein the locking bar is telescopingly disposed in the second support.

24. The stroller and child assembly of claim 22, further including a first actuator and a second actuator coupled to the second support to move the locking bar between the first position and the second position, wherein the first actuator is slidable and the second actuator is stationary relative to the second support.

25. The stroller and child assembly of claim 24, wherein the second support is coupled to the child support via a housing, the housing including a first cavity and a second cavity, and wherein the locking bar is to move between the first cavity and the second cavity when the locking bar moves between the first position and the second position.

26. The stroller and child assembly of claim 7, wherein in the retracted position, the first support is to rotate upward into a plane of the perimeter rail.

27. The stroller and child assembly of claim 7, wherein in the retracted position, the first support is to be secured in line with the perimeter rail by a mechanical fastener.

28. The stroller and child assembly of claim 27, wherein the mechanical fastener is a buckle.

29. The stroller and child support assembly of claim 7, wherein the first connector includes an aperture and the first joint includes a release button to engage the aperture to selectively couple the child support to the stroller frame.

30. A stroller and child support assembly comprising:
a stroller frame including a front support, a rear support, and a handle;
a front wheel coupled to the front support;
a rear wheel coupled to the rear support;
a first joint disposed on a first side of the stroller frame;
a second joint disposed on a second side of the stroller frame; and
a child support including:
    a first connector releasably coupled to the first joint;
    a second connector releasably coupled to the second joint;
    a first support pivotably coupled to the child support; and
    a second support pivotably coupled to the child support, the first support and the second support respectively moveable between an extended position and a retracted position such that in the respective extended positions, a child occupant may be supported in a recumbent position by the first support and the second support, the child support being removable from the frame and independently usable as a child carrier, wherein in the respective extended positions, the first support and the second support intersect a transverse plane relative to a perimeter rail of the child support.

31. A stroller and child support assembly comprising:
a stroller frame including a front support, a rear support, and a handle;
a front wheel coupled to the front support;
a rear wheel coupled to the rear support;
a first joint disposed on a first side of the stroller frame;
a second joint disposed on a second side of the stroller frame; and
a child support including:
    a first connector releasably coupled to the first joint;
    a second connector releasably coupled to the second joint;
    a first support pivotably coupled to the child support;
    a second support pivotably coupled to the child support, the first support and the second support respectively moveable between an extended position and a retracted position such that in the respective extended positions, a child occupant may be supported in a recumbent position by the first support and the second support, the child support being removable from the frame and independently usable as a child carrier; and
    a third support, the third support disposed between the first support and the second support, wherein a first end of the third support is coupled to the first joint and a second end of the third support is coupled to the second joint, and wherein the first support, the second support, and third support are oriented in substantially the same direction relative to a perimeter rail of the child support.

* * * * *